United States Patent
Ando et al.

[11] Patent Number: 6,063,422
[45] Date of Patent: May 16, 2000

[54] METHOD OF MANUFACTURING MOLDED BAKED SNACKS

[75] Inventors: Sadamasa Ando, Minoo; Taizo Karasawa, Ibaraki; Toshitaka Haruta, Hirakata; Akio Ozasa, Kyoto; Takayuki Kurisaka, Yawata; Tsutomu Oowada; Shinji Tanaka, both of Takatsuki, all of Japan

[73] Assignee: Nissei Kabushiki Kaisha, Osaka, Japan

[21] Appl. No.: 09/101,399

[22] PCT Filed: Nov. 14, 1997

[86] PCT No.: PCT/JP97/04167

§ 371 Date: Jul. 15, 1998

§ 102(e) Date: Jul. 15, 1998

[87] PCT Pub. No.: WO98/21969

PCT Pub. Date: May 28, 1998

[30] Foreign Application Priority Data

Nov. 21, 1996 [JP] Japan .................................. 8-311118
Nov. 11, 1997 [JP] Japan .................................. 9-309046

[51] Int. Cl.$^7$ .................................................. A21D 6/00
[52] U.S. Cl. .................. 426/244; 426/245; 426/440; 426/447; 426/448; 426/512; 426/559
[58] Field of Search .................................... 426/244, 245, 426/559, 440, 447, 448, 512; 99/451

[56] References Cited

U.S. PATENT DOCUMENTS

| | | |
|---|---|---|
| 5,015,489 | 5/1991 | Van Lengerich et al. ............ 426/549 |
| 5,334,402 | 8/1994 | Ovadia .................................. 426/241 |
| 5,476,600 | 12/1995 | Petelle et al. ........................ 426/237 |
| 5,591,491 | 1/1997 | Ando et al. ........................... 427/544 |
| 5,639,518 | 6/1997 | Ando et al. ........................... 427/544 |

FOREIGN PATENT DOCUMENTS

| | | |
|---|---|---|
| 60-74582 | 5/1985 | Japan . |
| 5-33938 | 2/1993 | Japan . |
| 5-33941 | 2/1993 | Japan . |

*Primary Examiner*—Nina Bhat
*Attorney, Agent, or Firm*—Jordan and Hamburg LLP

[57] ABSTRACT

Using a metal mold (8) having an insulating section provided with vapor release sections, pressure outside the metal mold (8) is reduced, and heating is performed while releasing vapor produced thereby through the vapor release sections. This can prevent insulation breakdown caused by condensation of large amounts of vapor produced by ingredients during molding and heating of molded baked snacks by means of resistance heating, dielectric heating, etc.

10 Claims, 25 Drawing Sheets

METHOD OF MANUFACTURING MOLDED BAKED SNACKS

TECHNICAL FIELD

The present invention relates to a method of manufacturing edible molded objects made of flour, etc.

BACKGROUND ART

An example of edible molded objects made of flour and other ingredients are molded baked snacks such as ice cream cones, monaka, wafers, etc. One method of manufacturing this kind of molded baked snack is the external heating method, in which the ingredients are placed into a mold previously heated to a predetermined temperature, and the snack is molded by heat conductivity.

However, with methods of this kind, slow molding leads to low productivity, and unevenness in the temperature of the mold causes uneven baking, thus making it impossible to obtain a uniform consistency when eaten, which varies from part to part.

For this reason, in another method, alternating current is supplied to a metal mold, and internal heating is induced in the ingredients in the mold by electromagnetic wave heating, such as resistance heating or dielectric heating, thereby baking and molding the ingredients. In this case, the metal mold is divided into two mold halves, which are insulated from each other by an insulating material provided therebetween, and an alternating current electrode is connected to each mold half. Then alternating current is applied to the metal mold through these electrodes, and the ingredients in the mold are baked and molded by resistance heating or dielectric heating.

However, with the foregoing method using resistance heating or dielectric heating, during molding, liquid contained in the ingredients evaporates, producing a large amount of vapor, which condenses, causing insulation breakdown, and thus resistance heating or dielectric heating does not go well.

DISCLOSURE OF THE INVENTION

The object of the present invention is to provide a method of manufacturing molded baked snacks capable of preventing insulation breakdown due to condensation of a large amount of vapor evaporating from the ingredients during heating and molding of the molded baked snacks by resistance heating or dielectric heating.

In order to attain the foregoing object, a first method of manufacturing molded baked snacks according to the present invention is a method of manufacturing molded baked snacks by placing ingredients in a mold made up of first and second conductive mold halves and an insulating section therebetween, and applying across both mold halves alternating current from an alternating current power source, thus heating and expanding the ingredients by means of resistance heating and/or dielectric heating, in which the insulating section of the mold is provided with a vapor release section, pressure is reduced outside the mold, and the heating is performed while releasing vapor produced thereby through the vapor release section.

During heating and molding of the molded baked snacks, a large amount of vapor is produced, and this vapor condenses in the vapor release section provided in the insulating section, causing insulation breakdown. However, with the foregoing method, by reducing pressure, condensation of the vapor is prevented. Consequently, insulation breakdown can be prevented.

A second method of manufacturing molded baked snacks is a method of manufacturing molded baked snacks by placing ingredients in a mold made up of first and second conductive mold halves and an insulating section therebetween, and applying across both mold halves alternating current from an alternating current power source, thus heating and expanding the ingredients by means of resistance heating and/or dielectric heating, in which the insulating section of the mold is provided with a vapor release section, the vapor release section is heated, and the heating of the ingredients is performed while releasing vapor produced thereby through the vapor release section.

During heating and molding of the molded baked snacks, a large amount of vapor is produced, and this vapor condenses in the vapor release section provided in the insulating section, causing insulation breakdown. However, with the foregoing method, by heating the vapor release section, condensation of the vapor is prevented. Consequently, insulation breakdown can be prevented.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 6(a) is a horizontal sectional view, FIG. 6(b) a side view, and FIG. 6(c) a cross-sectional view taken along line F—F of FIG. 6(a).

FIG. 7(a) is a horizontal sectional view, FIG. 7(b) a side view, and FIG. 7(c) a cross-sectional view taken along line G—G of FIG. 7(a).

FIG. 12(a) is a plan view, and FIG. 12(b) a cross-sectional view taken along line J—J of FIG. 12(a).

FIG. 13(a) is a plan view, and FIG. 13(b) a cross-sectional view taken along line K—K of FIG. 13(a).

FIG. 14(a) is a plan view, and FIG. 14(b) a cross-sectional view taken along line L—L of FIG. 14(a).

FIG. 15(a) is a plan view, and FIG. 15(b) a cross-sectional view taken along line M—M of FIG. 15(a).

FIG. 21(a) is a cross-sectional view, and FIG. 21(b) a plan view.

BEST MODE FOR CARRYING OUT THE INVENTION

Figure 1:
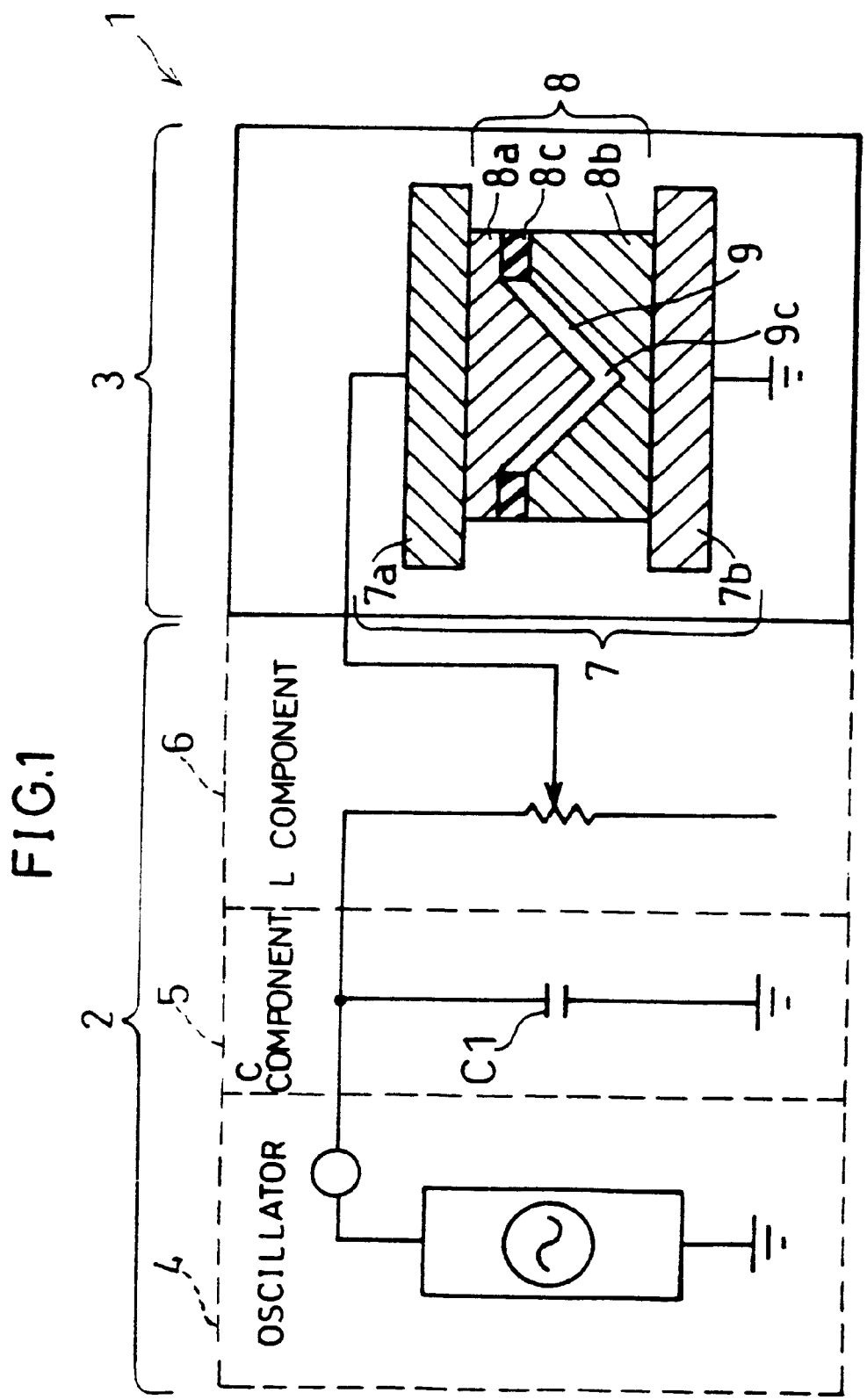
FIG. 1 is an explanatory drawing showing one structural example of a heating device for a method of manufacturing molded baked snacks according to the present invention.

The following will explain embodiments of the present invention with reference to FIGS. 1 through 35. First, structures common to all of the embodiments will be discussed.

INGREDIENTS

The ingredients used in the present invention are shown in Tables 1 through 6.

TABLE 1

| INGREDIENT MIXTURE NO. | 1 | 2 | 3 | 4 | 5 | 6 | 7 |
|---|---|---|---|---|---|---|---|
| FLOUR | 100 | 100 | 100 | 100 | 100 | 100 | 100 |
| STARCH | 20 | 20 | 20 | 20 | 20 | 20 | 20 |
| SALT | 0 | 0.2 | 0.5 | 1 | 2 | 5 | 10 |
| SUGAR | 5 | 5 | 5 | 5 | 5 | 5 | 5 |
| FLAVORING | 0 | 0 | 0 | 0 | 0 | 0 | 0 |
| LEAVENING | 0.5 | 0.5 | 0.5 | 0.5 | 0.5 | 0.5 | 0.5 |
| COLORING | 1 | 1 | 1 | 1 | 1 | 1 | 1 |
| AROMATIC | 1 | 1 | 1 | 1 | 1 | 1 | 1 |
| OIL/EMULSIFIER | 2 | 2 | 2 | 2 | 2 | 2 | 2 |
| TOTAL SOLIDS | 129.5 | 129.7 | 130.0 | 130.5 | 131.5 | 134.5 | 139.5 |
| WATER | 130 | 130 | 130 | 130 | 130 | 130 | 140 |
| PROPORTION OF SOLIDS (%) | 49.90 | 49.94 | 50.00 | 50.10 | 50.29 | 50.85 | 49.91 |
| VISCOSITY (CP) | 2700 | 2600 | 3000 | 2700 | 2800 | 2800 | 2500 |

TABLE 2

| INGREDIENT MIXTURE NO. | 8 | 9 | 10 | 11 | 12 | 13 | 14 | 15 |
|---|---|---|---|---|---|---|---|---|
| FLOUR | 100 | 100 | 100 | 100 | 100 | 100 | 100 | 100 |
| STARCH | 20 | 20 | 20 | 20 | 20 | 20 | 20 | 20 |
| SALT | 0.5 | 0.5 | 0.5 | 0.5 | 0.5 | 0.5 | 0.5 | 0.5 |

TABLE 2-continued

| INGREDIENT MIXTURE NO. | 8 | 9 | 10 | 11 | 12 | 13 | 14 | 15 |
|---|---|---|---|---|---|---|---|---|
| SUGAR | 5 | 5 | 5 | 5 | 5 | 5 | 5 | 5 |
| FLAVORING | 5 | 5 | 5 | 5 | 5 | 5 | 5 | 5 |
| LEAVENING | 0.5 | 0.5 | 0.5 | 0.5 | 0.5 | 0.5 | 0.5 | 0.5 |
| COLORING | 1 | 1 | 1 | 1 | 1 | 1 | 1 | 1 |
| AROMATIC | 1 | 1 | 1 | 1 | 1 | 1 | 1 | 1 |
| OIL/EMULSIFIER | 2 | 2 | 2 | 2 | 2 | 2 | 2 | 2 |
| TOTAL SOLIDS | 135 | 135 | 135 | 135 | 135 | 135 | 135 | 135 |
| WATER | 70 | 90 | 110 | 140 | 170 | 190 | 210 | 230 |
| PROPORTION OF SOLIDS (%) | 65.85 | 60.00 | 55.10 | 49.09 | 44.26 | 41.54 | 39.13 | 36.99 |
| VISCOSITY (CP) | DOUGH | 11000 | 6000 | 2500 | 1500 | 900 | 600 | 300 |

TABLE 3

| INGREDIENT MIXTURE NO. | 16 | 3 | 17 | 18 | 19 | 20 | 21 |
|---|---|---|---|---|---|---|---|
| FLOUR | 100 | 100 | 100 | 100 | 100 | 100 | 100 |
| STARCH | 10 | 20 | 50 | 100 | 150 | 20 | 20 |
| PULVERIZED PREVIOUSLY MOLDED SNACKS | 0 | 0 | 0 | 0 | 0 | 10 | 20 |
| SALT | 0.5 | 0.5 | 0.5 | 0.5 | 0.5 | 0.5 | 0.5 |
| SUGAR | 5 | 5 | 5 | 5 | 5 | 5 | 5 |
| FLAVORING | 0 | 0 | 0 | 0 | 0 | 0 | 0 |
| LEAVENING | 0.5 | 0.5 | 0.5 | 0.5 | 0.5 | 0.5 | 0.5 |
| COLORING | 1 | 1 | 1 | 1 | 1 | 1 | 1 |
| AROMATIC | 1 | 1 | 1 | 1 | 1 | 1 | 1 |
| OIL/EMULSIFIER | 2 | 2 | 2 | 2 | 2 | 2 | 2 |
| TOTAL SOLIDS | 120 | 130 | 160 | 210 | 260 | 140 | 150 |
| WATER | 120 | 130 | 160 | 210 | 260 | 140 | 150 |
| PROPORTION OF SOLIDS (%) | 50.00 | 50.00 | 50.00 | 50.00 | 50.00 | 50.00 | 50.00 |
| VISCOSITY (CP) | 2700 | 3000 | 2800 | 2800 | 2800 | 4000 | 6500 |

TABLE 4

| INGREDIENT MIXTURE NO. | 22 | 11 | 23 | 24 | 25 | 26 |
|---|---|---|---|---|---|---|
| FLOUR | 100 | 100 | 100 | 100 | 100 | 100 |
| STARCH | 20 | 20 | 20 | 20 | 20 | 20 |
| SALT | 0.5 | 0.5 | 0.5 | 0.5 | 0.5 | 0.5 |
| SUGAR | 2 | 5 | 10 | 20 | 40 | 60 |
| FLAVORING | 5 | 5 | 5 | 5 | 5 | 5 |
| LEAVENING | 0.5 | 0.5 | 0.5 | 0.5 | 0.5 | 0.5 |
| COLORING | 1 | 1 | 1 | 1 | 1 | 1 |
| AROMATIC | 1 | 1 | 1 | 1 | 1 | 1 |
| OIL/EMULSIFIER | 1 | 2 | 2 | 2 | 4 | 4 |
| TOTAL SOLIDS | 131 | 135 | 140 | 150 | 172 | 192 |
| WATER | 130 | 140 | 140 | 150 | 170 | 190 |
| PROPORTION OF SOLIDS (%) | 50.38 | 49.09 | 50.00 | 50.00 | 50.00 | 50.00 |
| VISCOSITY (CP) | 3500 | 2500 | 2700 | 2800 | 3200 | 3300 |

TABLE 5

| INGREDIENT MIXTURE NO. | 27 | 28 | 29 | 24 | 30 |
|---|---|---|---|---|---|
| FLOUR | 100 | 100 | 100 | 100 | 100 |
| STARCH | 20 | 20 | 20 | 20 | 20 |
| SALT | 0.5 | 0.5 | 0.5 | 0.5 | 0.5 |
| SUGAR | 20 | 20 | 20 | 20 | 20 |
| FLAVORING | 5 | 5 | 5 | 5 | 5 |
| LEAVENING | 0.5 | 0.5 | 0.5 | 0.5 | 0.5 |
| COLORING | 1 | 1 | 1 | 1 | 1 |
| AROMATIC | 0.1 | 0.2 | 0.5 | 1 | 2 |
| OIL/EMULSIFIER | 2 | 2 | 2 | 2 | 2 |
| TOTAL SOLIDS | 149.1 | 149.2 | 149.5 | 150 | 151 |
| WATER | 150 | 150 | 150 | 150 | 150 |
| PROPORTION OF SOLIDS (%) | 49.85 | 49.87 | 49.92 | 50.00 | 50.17 |
| VISCOSITY (CP) | 2600 | 2800 | 2600 | 2800 | 3000 |

TABLE 6

| INGREDIENT MIXTURE NO. | 31 | 32 | 33 | 34 | 35 | 36 |
|---|---|---|---|---|---|---|
| FLOUR | 100 | 100 | 100 | 100 | 100 | 100 |
| STARCH | 0 | 0 | 0 | 0 | 0 | 0 |
| SALT | 0.5 | 0.5 | 0.5 | 0.5 | 0.5 | 0.5 |
| SUGAR | 5 | 5 | 5 | 5 | 5 | 5 |

TABLE 6-continued

| INGREDIENT MIXTURE NO. | 31 | 32 | 33 | 34 | 35 | 36 |
|---|---|---|---|---|---|---|
| FLAVORING | 0 | 0 | 0 | 0 | 0 | 0 |
| LEAVENING | 0 | 0.1 | 0.2 | 0.5 | 1 | 2 |
| COLORING | 1 | 1 | 1 | 1 | 1 | 1 |
| AROMATIC | 1 | 1 | 1 | 1 | 1 | 1 |
| OIL/EMULSIFIER | 2 | 2 | 2 | 2 | 2 | 2 |
| TOTAL SOLIDS | 109.5 | 109.6 | 109.7 | 110 | 110.5 | 111.5 |
| WATER | 110 | 110 | 110 | 110 | 110 | 110 |
| PROPORTION OF SOLIDS (%) | 49.89 | 49.91 | 49.93 | 50.00 | 50.11 | 50.34 |
| VISCOSITY (CP) | 3200 | 3300 | 3200 | 3300 | 3500 | 3800 |

By varying the quantity of salt added, as shown in Table 1, the conductivity of the ingredients changes, and this influences molding by internal heating. By changing the quantity and type of salt, conductivity can be controlled. Control of conductivity is definitely necessary in low-frequency heating.

As the proportion of solids increases, as shown in Table 2, the molded baked snack produced tends to be harder, with a harder consistency when eaten. Hardness may be varied in keeping with the shape and use of the target molded and baked snack. Incidentally, the ingredient mixtures shown in Table 2 include various amounts of water, and have a wide range of viscosities, but, if an appropriate depositing (injection) structure is used, each of these ingredient mixtures can be molded in each of the metal molds used in the present invention.

By adjusting the quantity and type of starch, as shown in Table 3, a required expansion, shape, consistency when eaten, etc. can be realized. Incidentally, previously molded snacks which have been defectively molded, and burr portions, may be reused after refining and grinding.

By adjusting the quantity of sugar, as shown in Table 4, a required expansion, shape, consistency when eaten, flavor, etc. can be realized.

In Table 5, a small quantity of aromatic is sufficient in molding by internal heating.

In Table 6, a small quantity of leavening is sufficient in molding by internal heating.

Ingredient mixtures No. 1 through No. 36 set forth in Tables 1 through 6 are used as ingredients in the present invention.

For the flour, strong flour, medium flour, weak flour, or a mixture of these is used.

For the starch, potato starch, wheat starch, rice starch, cornstarch, tapioca starch, sweet potato starch, etc., or a crosslinked starch of these is used.

"Pulverized previously molded snacks" are snacks which have already been molded, and have then been refined and ground, or are burrs protruding from between the mold halves, which have been collected and ground.

For the salt, any edible salt may be used, and thus NaCl (sodium chloride), KCl (potassium chloride), L-sodium tartrate, ammonium chloride, sodium lactate, sodium polyphosphate, sodium metaphosphate, etc. are used.

For the sugar, granulated sugar, powdered sugar, brown sugar, malt syrup, sugar alcohol (sorbitol, glycerin, propylene glycol), etc. are used.

For the flavoring, milk products (butter, whole milk, skim milk), eggs (eggs, powdered whole eggs, powdered egg yolks), cacao, coffee, nuts (almonds, peanuts, coconut), bread crumbs, corn grits, fruit juice, etc. are used.

For the leavening, sodium bicarbonate, alum, any kind of baking powder, etc. are used.

For the coloring, food colorings such as caramel, cochineal, carotene, annatto, etc. are used.

For the aromatic, food aromatics such as vanilla extract, butter flavoring, etc. are used.

For the oil or emulsifier, vegetable oils such as soybean oil, rapeseed oil, corn oil, etc., or emulsifiers such as soy lecithin, fatty acid esters, etc. are used.

For each of the ingredients, one or several of the examples listed above may be used.

PREPARATION OF INGREDIENTS FOR MOLDING

The process of the present invention, from preparation of ingredients through molding, is as follows.
(1) Measuring of ingredients.
(2) Mixing of water and ingredients other than those in (3) and (4) below in a mixer.
(3) Mixing in of flour and starch.
(4) Mixing in of oil.
(5) Ageing.
(6) Depositing (injection).
(7) Placing in mold and molding.

The molded baked snacks are prepared by means of the foregoing steps.

DEVICES

Next, the devices used in the present invention will be explained. Since the mixers, etc. used were equivalent to conventional ones, explanation thereof will be omitted. The molded baked snacks were prepared by placing the foregoing ingredients in a mold to be discussed below, and then heating and expanding in a heating device. For the heating device, a total of four devices were used: three types of electromagnetic wave heating devices (referred to as "HB," "HC," and "HD"), and, for purposes of comparison, an external heating device (referred to as "HA"). The structural details of each of these heating devices are as shown in Table 7 below. Further, the schematic structures of electromagnetic wave heating devices are shown in FIGS. 1 through 4. Incidentally, the frequency used is not limited to that shown in Table 7; an appropriate frequency within a range from 50 Hz through 100 MHz may be used.

TABLE 7

| HEATING DEVICE | | PRIMARY POWER SOURCE | FREQUENCY CONVERTER | OUTPUT REGULATOR |
|---|---|---|---|---|
| | HA: EXTERNAL HEATING | 60 Hz, 200 V | NONE | NONE PROVIDED |
| INTERNAL HEATING | HB: 50 Hz TO 1 MHz | 60 Hz, 200 V | WITHIN 50 Hz TO 10 kHz RANGE | PROVIDED |
| | HC: 1 MHz TO 100 MHz | 60 Hz, 200 V | THREE TYPES WITHIN 1 MHz TO 100 MHz RANGE | PROVIDED IN OSCILLATOR AREA |
| | HD: BOTH HB AND HC USED | 60 Hz, 200 V | WITHIN 50 Hz TO 10 kHz RANGE THREE TYPES WITHIN 1 MHz TO 100 MHz RANGE | PROVIDED IN OSCILLATOR AREA PROVIDED IN OSCILLATOR AREA |

| | HEATING DEVICE | | ELECTRODES | INSULATION | TEMPERATURE ADJUSTMENT |
|---|---|---|---|---|---|
| | HA: EXTERNAL HEATING | | NONE | NONE | 150° C. TO 230° C. |
| INTERNAL HEATING | HB: 50 Hz TO 1 MHz | | METAL MOLD MADE OF A1 | BASICALLY PRESENT | 50° C. TO 230° C. |
| | HC: 1 MHz TO 100 MHz | | METAL MOLD MADE OF A1 | BASICALLY PRESENT | 50° C. TO 230° C. |
| | HD: BOTH HB AND HC USED | | METAL MOLD MADE OF A1 | BASICALLY PRESENT | 50° C. TO 230° C. |

Device HB includes three types: HB1, HB2, and HB3. Device HC also includes three types: HC1, HC2, and HC3.

Here, the power source for the devices HA, HB, HC, and HD is an industrial power source with a voltage of 200V and a frequency of 60 Hz.

The output regulators of devices HB, HC, and HD are devices which regulate output to a desired constant output.

The frequency converters of devices HB, HC, and HD are devices which output frequency converted to a desired frequency within a specified range.

The oscillators of devices HC and HD are devices which oscillate at a specified frequency only. However, in the case of device HB, there is a frequency zone for which an oscillator is unnecessary. In other words, device HB1 uses a frequency of 60 Hz, HB2 a frequency of 200 Hz, and HB3 a frequency of 10.0 kHz, but an oscillator is unnecessary in each of these cases. Using oscillators, device HC1 uses a frequency of 5.0 MHz, HC2 a frequency of 13.56 MHz, and HC3 a frequency of 40.68 MHz. Device HD uses a combination of the foregoing oscillators.

The electrodes of devices HB, HC, and HD are devices for supplying high- or low-frequency current to the ingredients through the mold.

In devices HA, HB, HC, and HD, temperature adjustment refers to adjustment of the temperature of the metal mold, prior to molding, using an electric heater installed in the metal mold, or directly heating the metal mold externally using a gas burner, or using IH (induction heating) to heat the metal mold, etc. Without this kind of temperature adjustment, the temperature of the metal mold is within a range up to 100° C.

The following will explain the individual structures of the foregoing electromagnetic wave heating devices.

As shown in FIG. 1, an electromagnetic wave heating device 1 includes a power section 2 and a heating section 3 (electrode section). Further, although not shown in the drawing, the heating section 3 includes a vacuum pump, a lock section which fixes the upper and lower mold halves, and an external heating section.

When the frequency is 5 MHz, 13.56 MHz, or 40.68 MHz, the power section 2 uses for a power source an oscillator 4 of the vacuum tube type. Energy efficiency is determined by the output of the oscillator 4. Mold halves 8a and 8b (to be discussed below) must not come into direct contact with one another, and thus an insulating section is provided therebetween. An insulating body 8c is used for the insulating section. The insulating section is for preventing the mold halves 8a and 8b from touching one another, and may be provided as a space. In addition, each of the necessary devices should be provided with a ground and an electromagnetic wave shield.

Further, as a regulating circuit, a variable capacitor (referred to as "C component") 5 and a variable coil (referred to as "L component") 6 are provided. By changing the C component 5 and the L component 6 according to the object to be heated, optimum output and tuning can be obtained. As the C component 5, a manual capacitor C1 (referred to as the "C1 component") is provided.

Figure 2:
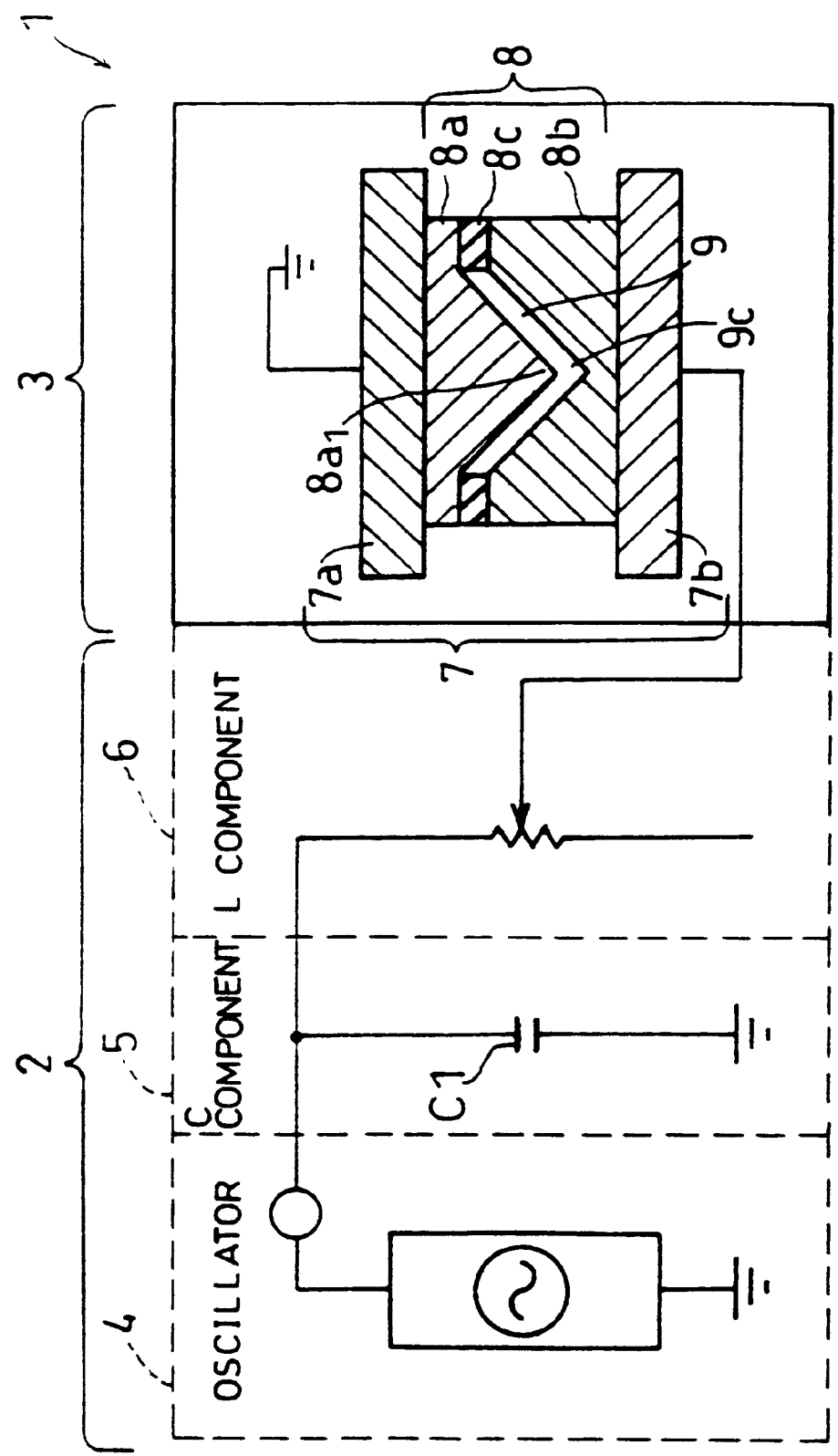
FIG. 2 is an explanatory drawing showing another structural example of a heating device for a method of manufacturing molded baked snacks according to the present invention.

In the device shown in FIG. 2, the side with the mold half 8a, having more pointed areas such as the apex $8a_1$ (in FIG. 2, the upper side), is grounded. When one of the mold halves 8a has pointed areas of this kind, if, as shown in FIG. 1, the mold half 8a is connected to the power source and the other mold half 8b is grounded, energy from the power source tends to concentrate in the pointed area, and thus localized heating of an apex area 9c of the ingredients 9 is likely to occur. For this reason, if a mold half 8a having a pointed area, as shown in FIG. 2, is grounded, energy from the power source can be prevented from concentrating in the pointed area, and it is easier to prevent localized heating than with the device shown in FIG. 1.

Figure 3:
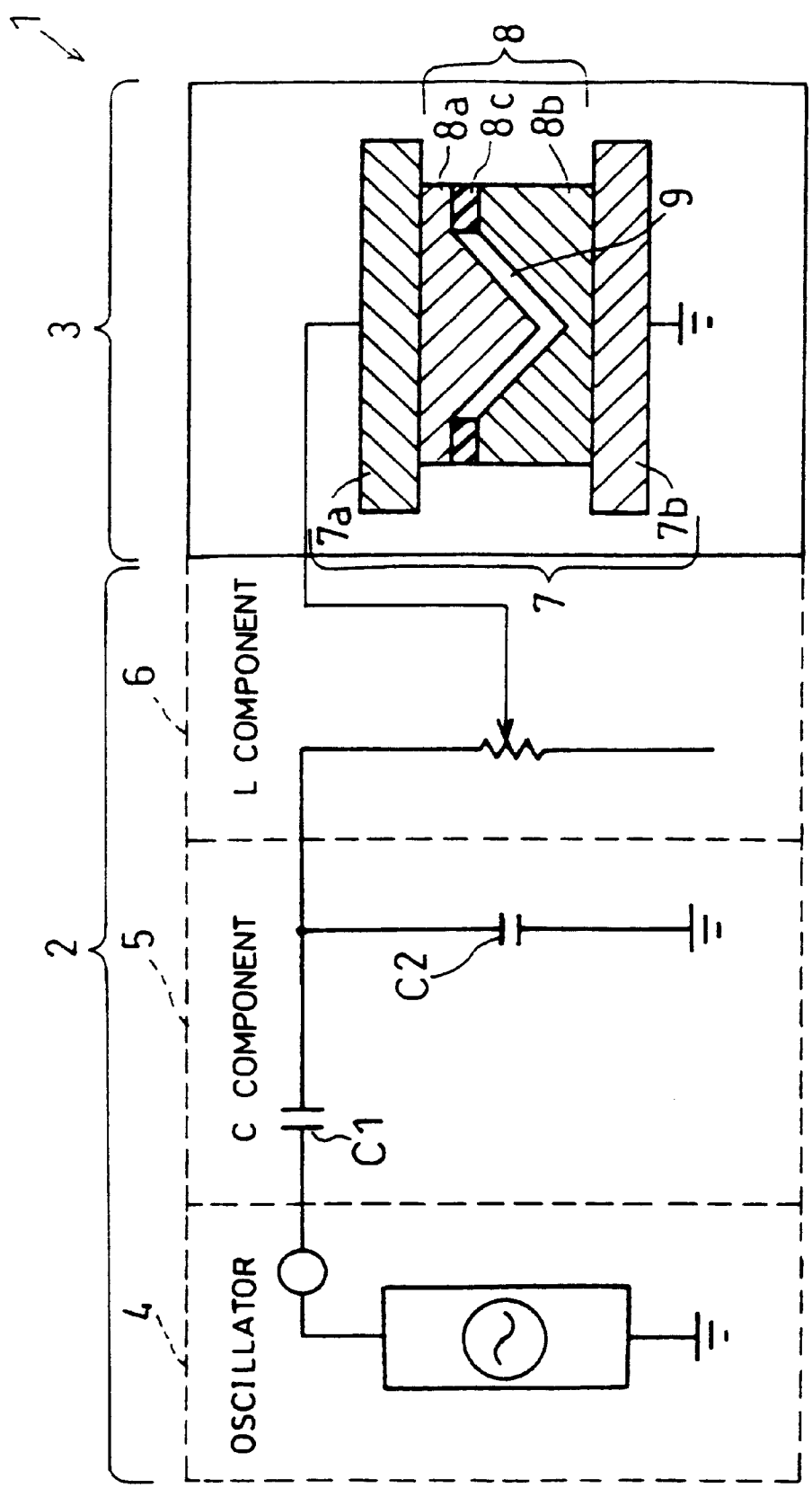
FIG. 3 is an explanatory drawing showing a further structural example of a heating device for a method of manufacturing molded baked snacks according to the present invention.

By providing, as shown in FIG. 3, an automatic capacitor C2 (referred to as the "C2 component") as a variable capacitor for automatic regulation and tuning, anode current in the oscillator vacuum tube can be controlled to a constant value. This anode current is controlled by an automatic tracking circuit. The automatic tracking circuit is a circuit which can automatically change an interval between the plates of an air capacitor using a motor, and which maintains a constant anode amperage in accordance with changes in the dielectric constant across the two electrodes of the heating section 3.

Here, increasing (or decreasing) the interval between the plates of the capacitor making up the C component will be referred to as "widening (or narrowing) the C component,"

and lengthening (or shortening) of the L component resistor length actually used in the circuit will be referred to as "lengthening (or shortening) the L component." The wider the C component, the smaller the output. When the manual capacitor C1 is at its narrowest, C1=100, and when at its widest, C1=0. When the automatic capacitor C2 is at its narrowest, C2=10, and when at its widest, C2=0. The longer the L component, the smaller the output. When L is at its shortest, L=0, and when at its longest, L=15. Here, C component and L component values will be expressed as a proportion of their respective minimum and maximum values.

Figure 5:
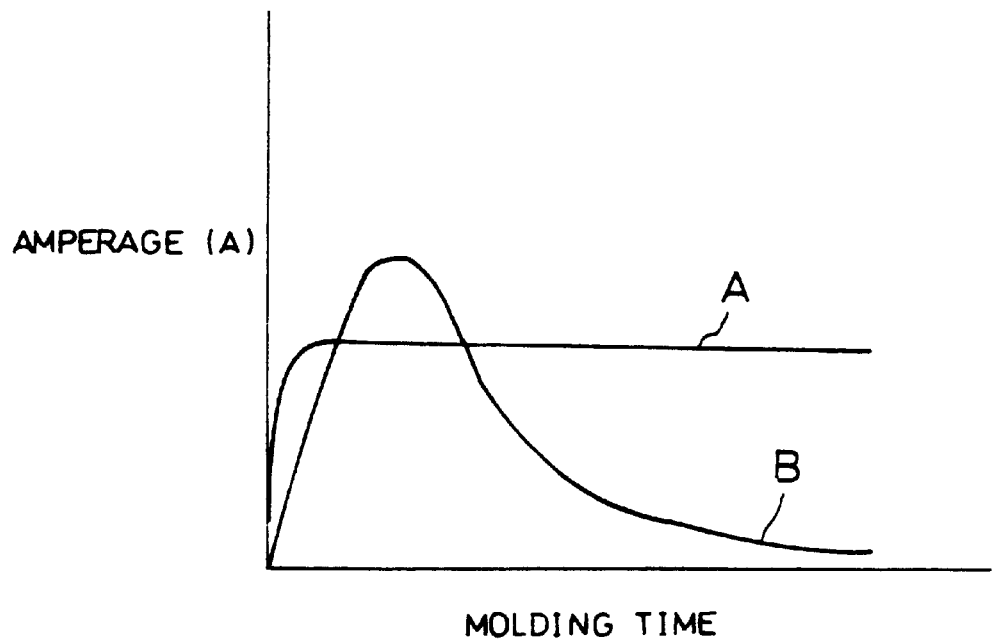
FIG. 5 is a graph showing transition in the anode current of an oscillator during heating.

When the automatic capacitor C2 is in operation, the transition in the anode amperage of the oscillator is as shown at curve A in FIG. 5. In other words, the amperage can be supplied in a constant quantity. The automatic function of the automatic capacitor C2 can also be turned off, and the amperage can be set manually. When the automatic function is turned off, the transition is as shown at curve B in FIG. 5. In other words, the amperage changes according to the conductive and dielectric properties of the object to be heated.

Figure 4:
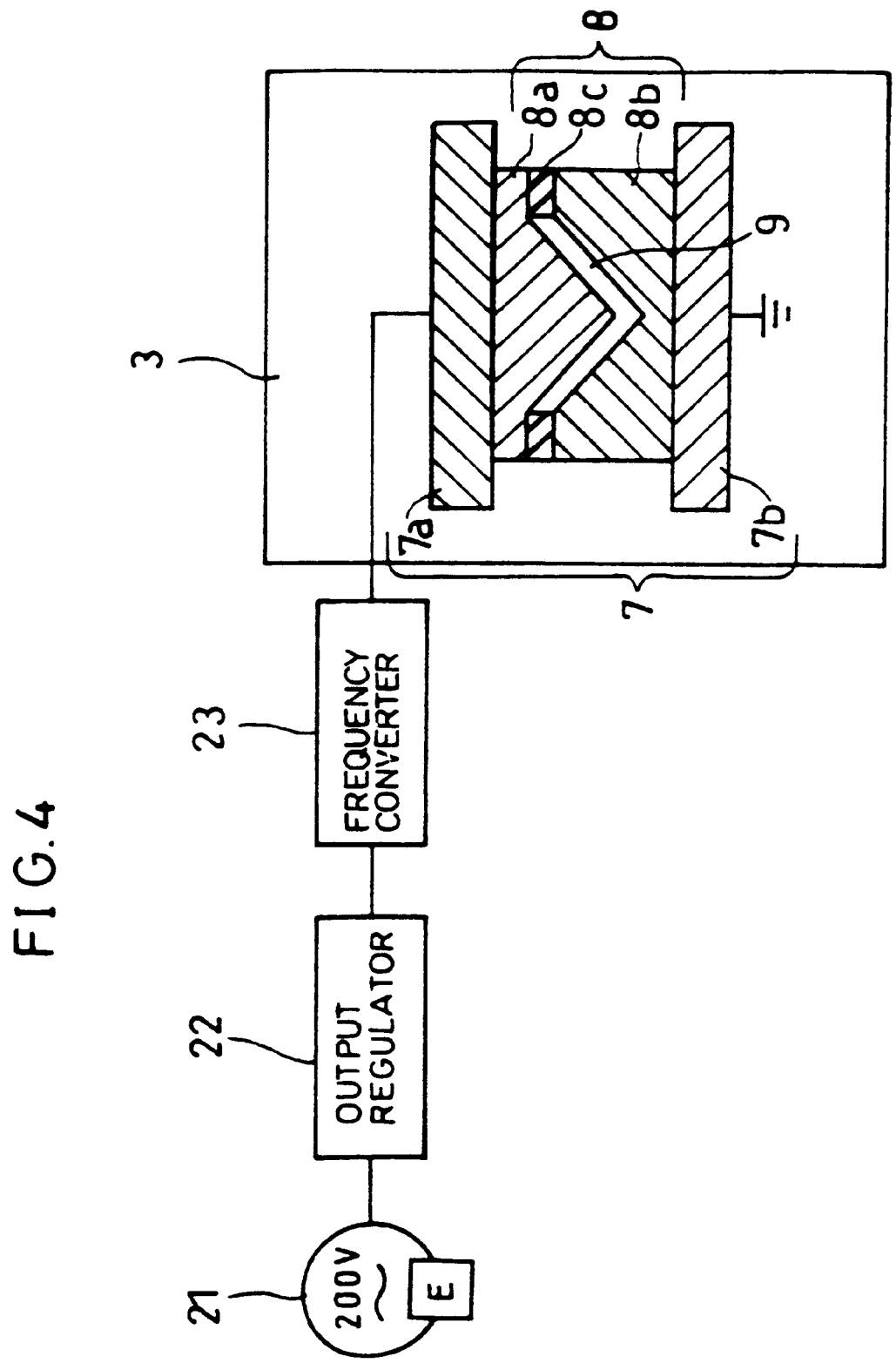
FIG. 4 is an explanatory drawing showing a further structural example of a heating device for a method of manufacturing molded baked snacks according to the present invention.

When the frequency is 60 Hz, 200 Hz, or 10 kHz, as shown in FIG. 4, an output regulator 22 is connected to a power source 21 of 200V, and current is supplied to the heating section 3 at a predetermined frequency by a frequency converter 23. A transformer can be used as the output regulator 22.

As shown in FIG. 1, the heating section 3 includes upper and lower electrodes 7a and 7b. To the electrodes 7a and 7b are connected an upper mold half 8a and a lower mold half 8b, respectively. The mold halves 8a and 8b are pressed together with the insulating body 8c therebetween, and thus do not touch one another. The mold halves 8a and 8b and the insulating body 8c make up a metal mold 8. The metal mold 8 and the ingredients 9 will collectively be referred to as the "object to be heated." The object to be heated is placed between the electrodes 7a and 7b, to which current is supplied.

Figure 6A:
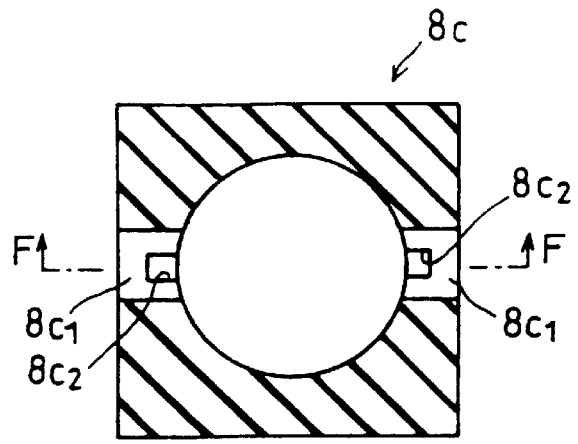
FIGS. 6(a) through 6(c) show one structural example of an insulating body.
Figure 6B:
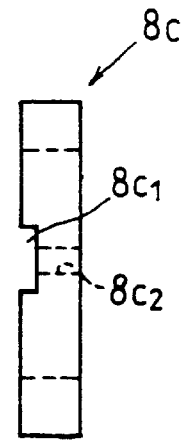
Figure 6C:
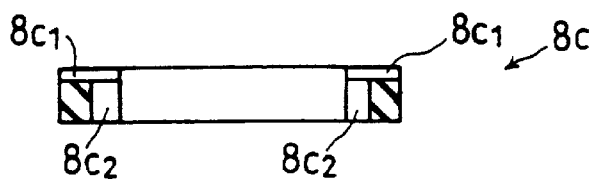

FIG. 6 shows one example of a method of releasing vapor. An insulating body 8c is provided with vapor release sections $8c_1$ and vapor release sections $8c_2$ for releasing vapor produced during heating. Vapor produced by the ingredients 9 (not shown) in the metal mold 8 during heating passes through the vapor release sections $8c_2$ to the vapor release sections $8c_1$, from which it is released to the exterior of the metal mold 8. As an alternative to the structure shown in FIG. 6, a structure like that shown in FIG. 7 may also be used, in which a plurality of vapor release sections $8c_2$ (for example eight) are provided in a circular vapor release section $8c_1$.

Figure 7A:
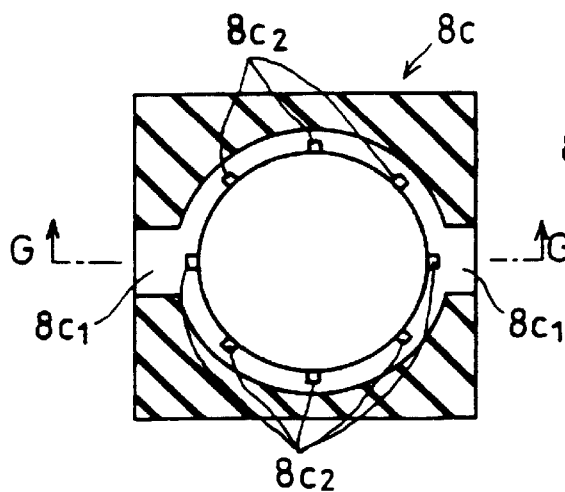
FIGS. 7(a) through 7(c) show another structural example of an insulating body.
Figure 7B:
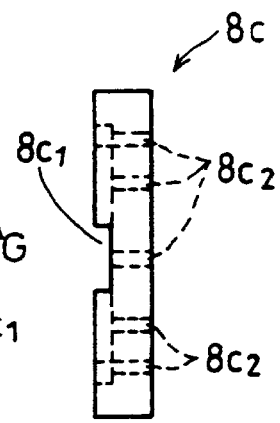
Figure 7C:
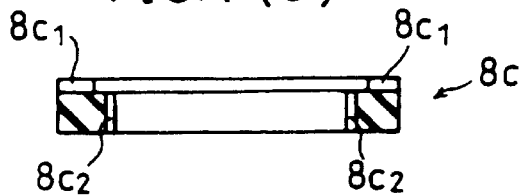

The number of vapor release sections $8c_2$ is usually at least two, for the sake of balance. Further, the size, shape, number, etc. of the vapor release sections $8c_1$ and the vapor release sections $8c_2$ are adjusted to those most suitable to the molded baked snack to be produced. These must be changed as necessary in keeping with changes in the ingredient mixture and the properties of the molded baked snack to be produced. In the present invention, it is satisfactory if the vapor is released from the ingredients 9 to the exterior of the metal mold 8 in a balanced manner, and thus there is no particular limitation on the shape, size, and number of vapor release sections. Incidentally, FIGS. 6 and 7 show structures in which the vapor release sections $8c_1$ and $8c_2$ are provided in the insulating section, but, in order to mold the entirety uniformly and efficiently, vapor release sections may also be provided, as necessary, in places other than the insulating section.

As shown in FIGS. 1 and 2, one of the two electrodes 7a and 7b is a feed electrode, and the other a grounding electrode. In the arrangement shown in FIG. 1, the electrode 7a is the feed electrode, and electrode 7b the grounding electrode. In FIG. 2, the electrodes are connected in the opposite manner.

Although not shown in the drawing, the heating section 3 is provided with an electric heater and a temperature regulator, and thus the metal mold 8 can be heated at a predetermined temperature. Incidentally, when using external heating alone, current is not supplied from the power section 2, and heating and molding are performed by this heater alone.

The entirety of the heating section 3 is a vacuum chamber, and, using the aforementioned vacuum pump, the pressure therein can be reduced.

Figure 8:
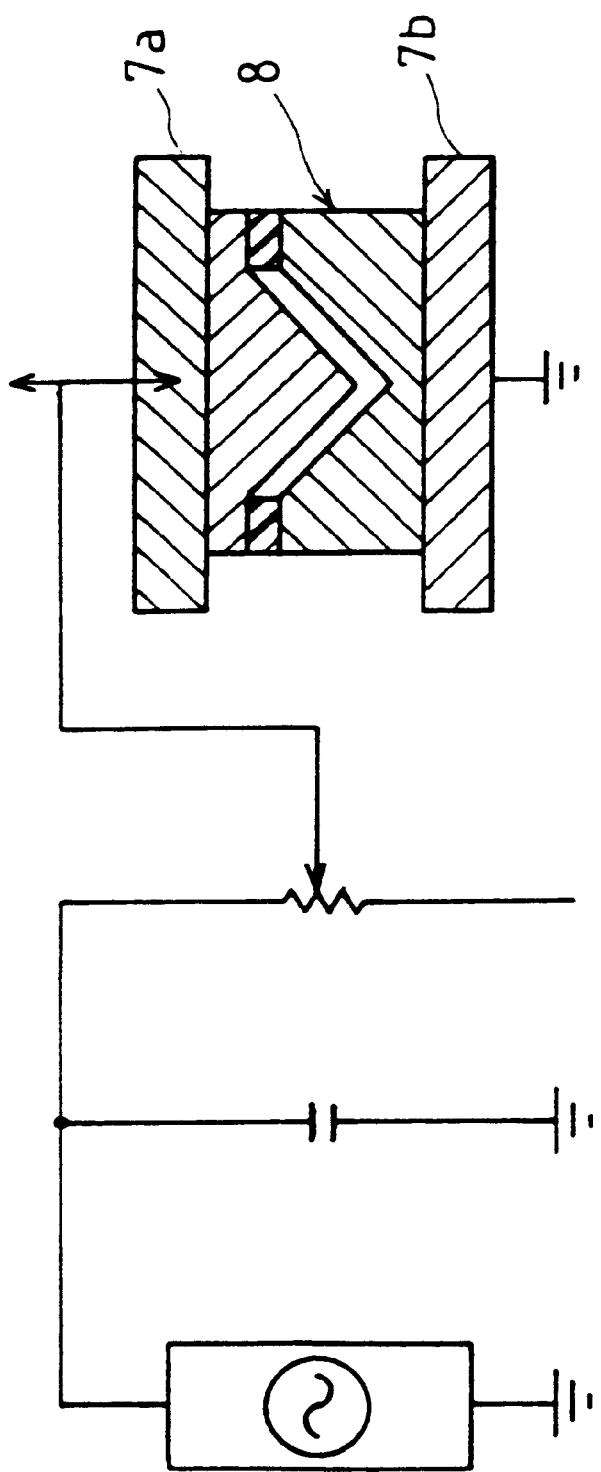
FIG. 8 is an explanatory drawing showing a structural example of a metal mold.
Figure 9:
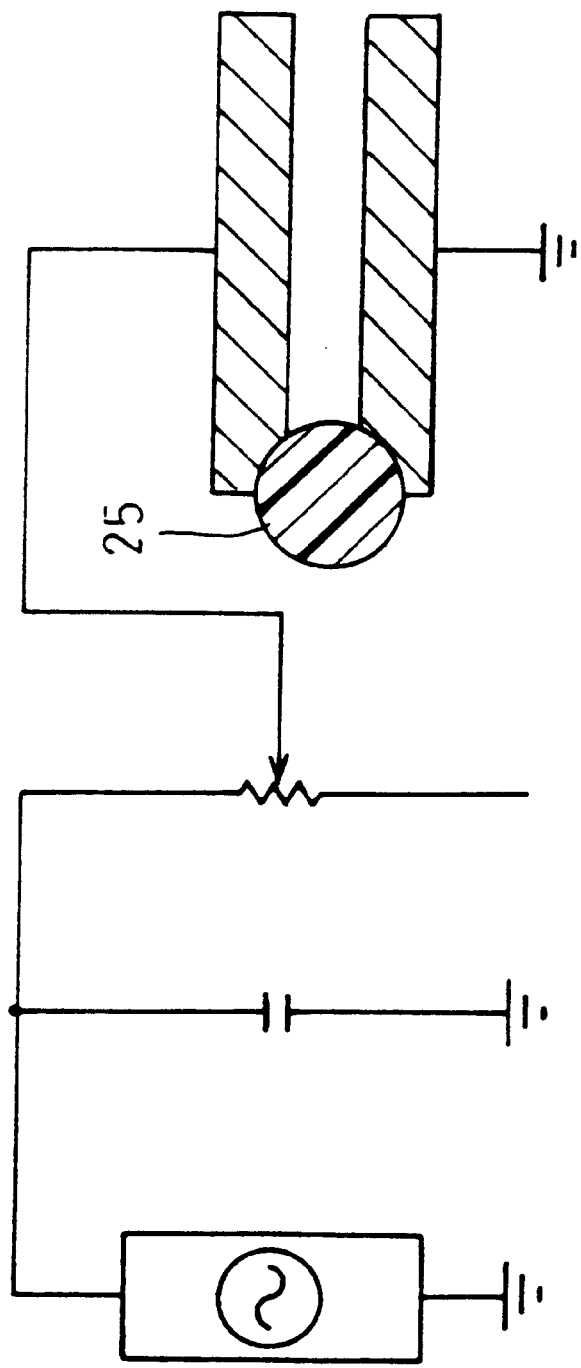
FIG. 9 is an explanatory drawing showing another structural example of a metal mold.

The metal mold 8 is fixed between the electrodes 7a and 7b using the vertical press method shown in FIG. 8. Alternatively, as shown in FIG. 9, a method may be adopted in which a hinge 25 is provided at one end of the mold, and the other end can be locked (fixed).

MOLD

The following will explain the structure of the metal mold 8, which serves as the mold into which the ingredients are placed.

Figure 10A:
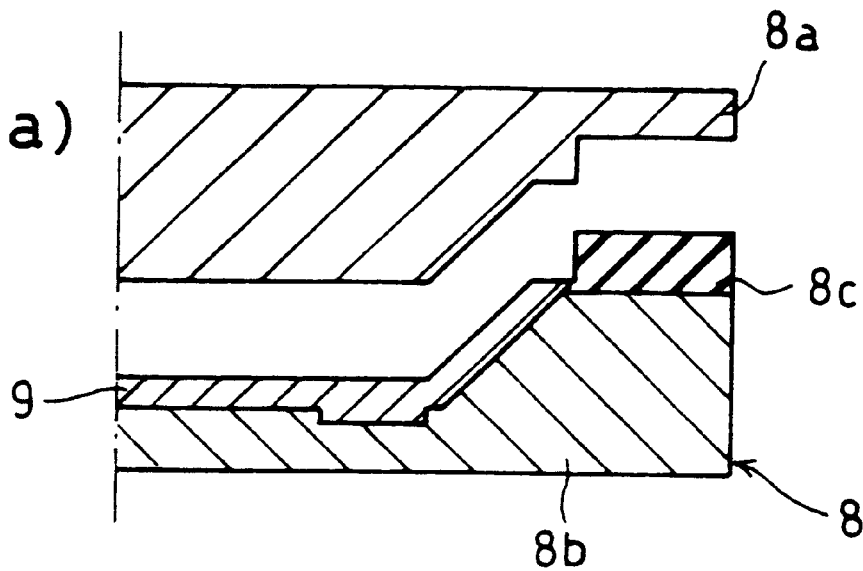
FIG. 10 is a cross-sectional view showing one example of a method of installing an insulating body.
Figure 10B:
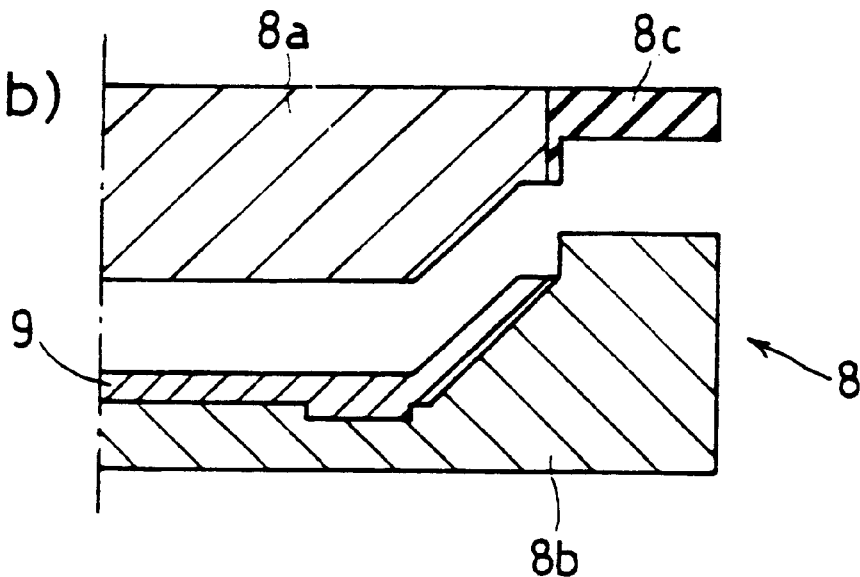

As shown in FIGS. 10(a) and 10(b), the metal mold 8 is basically divided into two blocks. Although not shown in the drawings, depending on the shape of the molded baked snack and the method of removal, a metal mold made up of three or more parts, such as a split mold or one provided with a knockout pin, may be used, but even in these cases, the parts are grouped into two blocks: a feed electrode side and a grounding electrode side.

The parts of each group have sections which fit together closely when the mold is fixed and molding is performed. Between the one block (the mold half 8a side) and the other block (the mold half 8b side), a space for molding of the molded baked snack and an insulating section (here, the insulating body 8c) are provided. As shown in FIGS. 10(a) and 10(b), the insulating body 8c can be attached to either block, or it can be attached to both blocks.

Figure 11A:
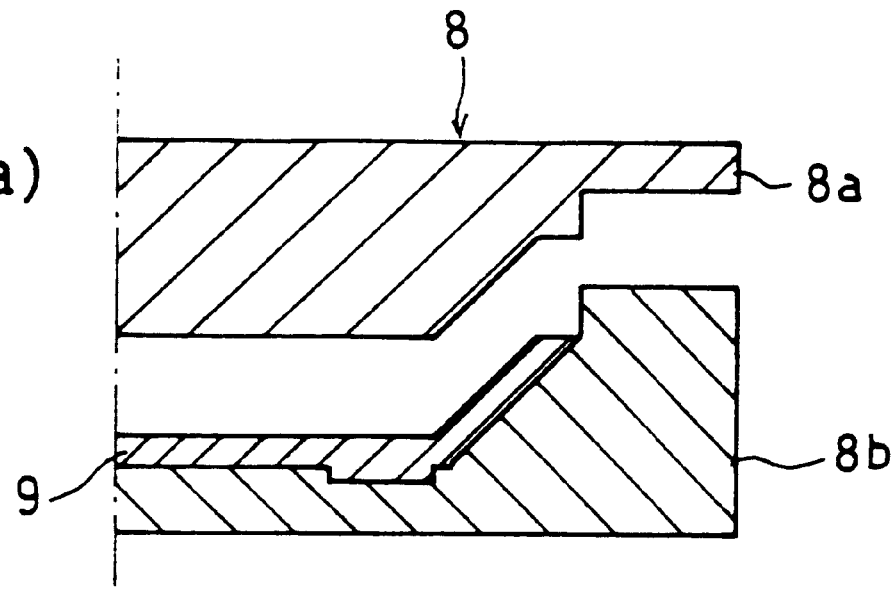
FIG. 11 is a cross-sectional view showing one example of a method of providing an insulating section of air, without installing an insulating body.
Figure 11B:
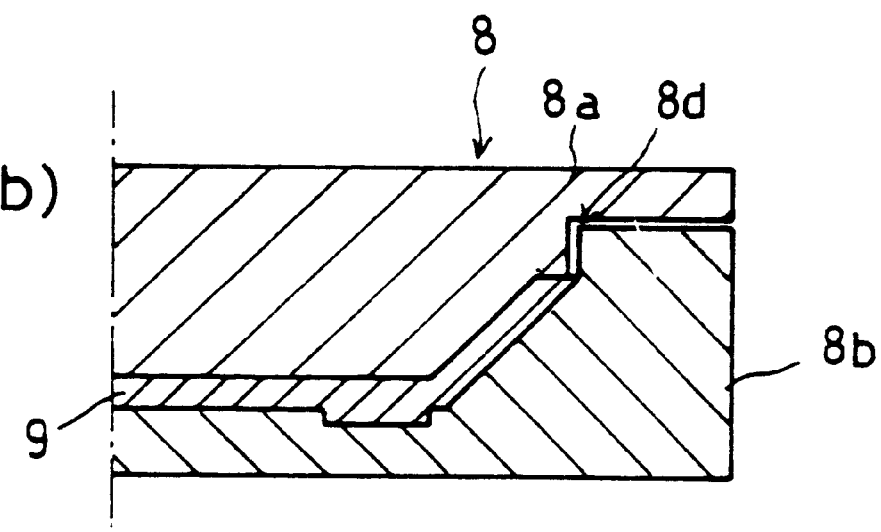

Further, as shown in FIGS. 11(a) and 11(b), the insulating section may be provided by means of a space 8d between the mold halves 8a and 8b, without using an insulating body. In this case, the range of the interval of the space 8d is no less than 0.3 mm and no more than one-half the thickness of the baked molded snack. If the interval is less than 0.3 mm, insulation breakdown is likely, and sparking makes molding impossible. On the other hand, if the interval is more than one-half the thickness of the molded baked snack, the pressure inside the mold is too low, and molding cannot be performed.

Vapor release sections are provided in order to release to the exterior of the mold large amounts of vapor produced during molding. In the case of the examples shown in FIGS. 10(a) and 10(b), these vapor release sections are provided in the insulating body 8c, or in a surface of the mold half 8a or the mold half 8b which is in contact with the insulating body 8c. In the case of the example shown in FIGS. 11(a) and 11(b), the space 8d (insulating section) also serves as the vapor release section.

MOLDED BAKED SNACKS

The following will explain the molded baked snacks prepared using the foregoing ingredients, mold, and heating devices.

Samples shown in Table 8 and in FIGS. 12(a) through 15(b) were baked. In each case, a mold appropriate to the desired shape was used.

tends to remain in the interior, the consistency when eaten is poor, and cracking, etc. makes molding difficult. Using internal heating, on the other hand, snacks with a uniform,

TABLE 8

| SNACK SHAPE | SNACK NAME | SURFACE AREA (cm$^2$) | PROJECTED AREA (cm$^2$) | AVERAGE THICKNESS (mm) | MOLDED WEIGHT (g) | INGREDIENT MIXTURE | MOLDING EXTERNAL HEATING | MOLDING INTERNAL HEATING |
|---|---|---|---|---|---|---|---|---|
| (1) | CAKE CONE | 100 | 20 | 2 | 4.0 ± 0.2 | ALL EXCEPT NO. 25 AND NO. 26 | ⊙ | ⊙ |
| (2) | CAKE CONE (LARGE) | 170 | 40 | 2 | 7.5 ± 0.4 | ALL EXCEPT NO. 25 AND NO. 26 | ⊙ | ⊙ |
| (3) | CAKE CONE (THICK) | 100 | 20 | 5 | 7.0 ± 0.4 | ALL EXCEPT NO. 25 AND NO. 26 | Δ | ⊙ |
| (4) | CAKE CONE (THICK) | 100 | 20 | 10 | 12.5 ± 0.5 | ALL EXCEPT NO. 25 AND NO. 26 | X | ○ |
| (5) | CAKE CONE (W/RIBS) | 110 | 20 | 2 | 4.2 ± 0.2 | ALL EXCEPT NO. 25 AND NO. 26 | ⊙ | ⊙ |
| (6) | SUGAR ROLL CONE WAFER | 125 | 125 | 2.5 | 15.0 ± 1.0 | ALL★ | ⊙ | ⊙ |
| (7) | MONAKA | 85 | 52 | 2 | 5.0 ± 0.3 | ALL EXCEPT NO. 25 AND NO. 26 | ⊙ | ⊙ |

*Even No. 25 and No. 26 can be molded.

Figure 12A:
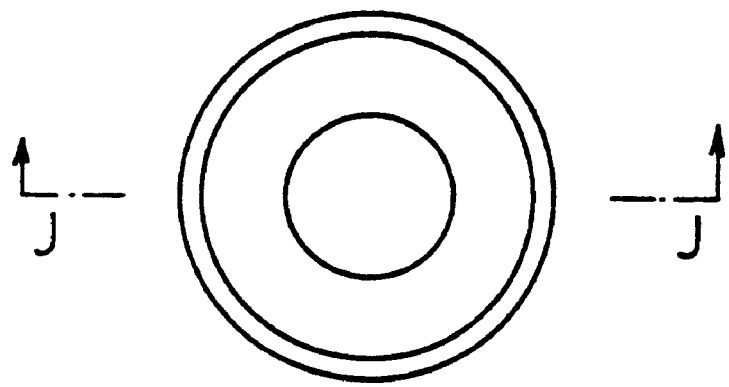
FIGS. 12(a) and 12(b) show one structural example of a molded baked snack.
Figure 12B:
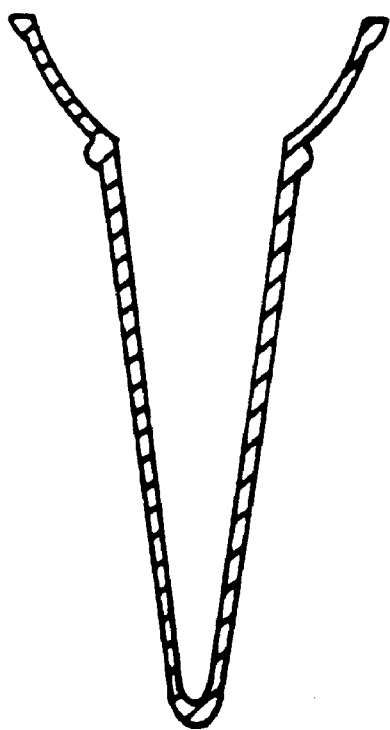
Figure 13A:
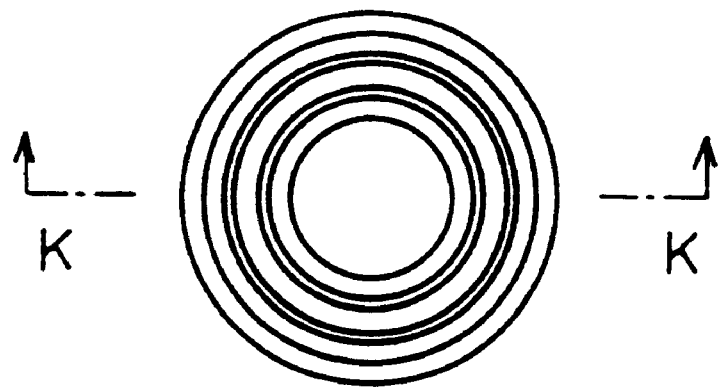
FIGS. 13(a) and 13(b) show another structural example of a molded baked snack.
Figure 13B:
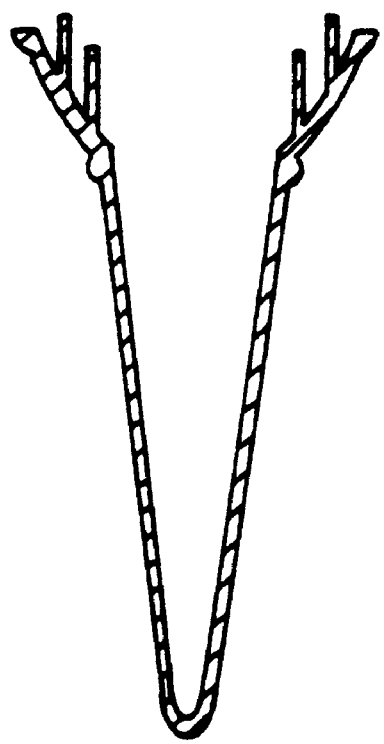
Figure 14:
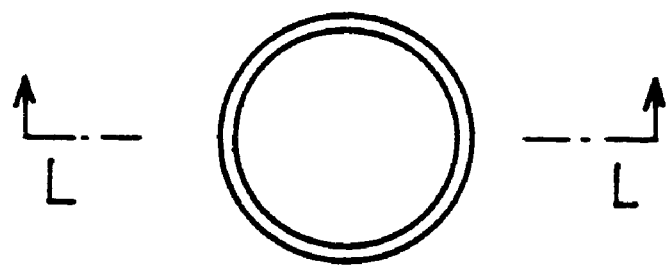
FIGS. 14(a) and 14(b) show a further structural example of a molded baked snack.
Figure 14:
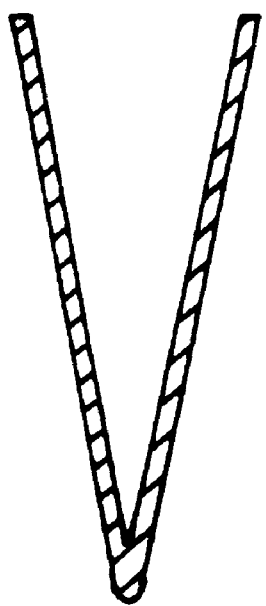
Figure 15A:
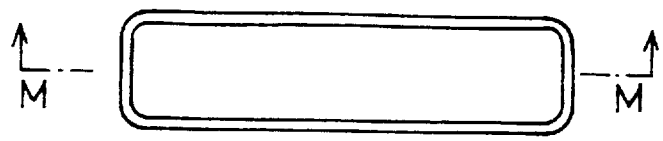
FIGS. 15(a) and 15(b) show a further structural example of a molded baked snack.
Figure 15B:

In Table 8, snack shapes (1) through (4) are shapes like that shown in FIGS. 12(a) and 12(b). For example, a diameter of 54 mm, a height of 120 mm, and thicknesses of 2.0 mm, 5.0 mm, and 10.0 mm may be used. In another example, a diameter of 72 mm, a height of 150 mm, and a thickness of 2.5 mm may be used. The snack shape (5), as shown in FIGS. 13(a) and 13(b), has the shape of snack shape (1), but with ribs added. For example, a diameter of 54 mm, a height of 120 mm, and a thickness of 2.0 mm may be used. The snack shape (7) is a shape like that shown in FIGS. 15(a) and 15(b). For example, a length of 150 mm, a width of 35 mm, a height of 12 mm, and a thickness of 2.0 mm may be used.

Figure 16:
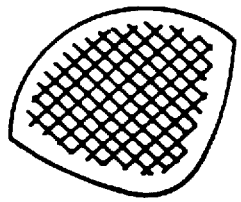
FIG. 16 is a plan view showing a further structural example of a molded baked snack.
Figure 17:
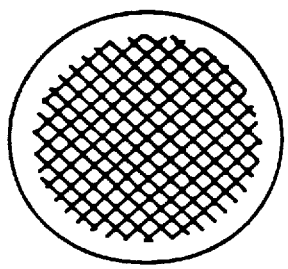
FIG. 17 is a plan view showing a further structural example of a molded baked snack.

In the case of the sugar roll cone shown in FIGS. 14(a) and 14(b), a wafer is first baked in a fan shape like that shown in FIG. 16, or a circular shape like that shown in FIG. 17, i.e., in the shape of snack shape (6) shown in Table 8. Then, as post-molding, the snack in the shape of snack shape (6) is wrapped around a conical form and cooled, thus producing the final shape. In other words, the shape of the mold used in baking is that of a mold for baking the wafer like that shown in FIG. 16 or FIG. 17. Snack shape (6) has, for example, a diameter of 50 mm, a height of 120 mm, and a thickness of 2.5 mm.

Since the manner in which the ingredients expand varies depending on the shape of the molded baked snack, the placement of vapor release sections and mold sections in contact with the ingredient mixture must be changed as necessary, but the method of molding is basically equivalent. Molded baked snacks having snack shapes (1) through (5) and (7) are maintained in that shape after removal from the mold, and are thus completed. With regard to molded baked snacks having snack shape (6), after baking the flat wafer, the aforementioned post-molding is performed, thus giving the wafer its final shape.

When using molding by external heating, with molded baked snacks with thick walls, such as snack shapes (3) and (4), the surface thereof dries during baking, but since liquid fine texture can be prepared not only with thin molded baked snacks, but also with thick molded baked snacks such as snack shapes (3) and (4).

In addition to flat wafers like that of snack shape (6) and other wafers, the present invention can be used in manufacturing many types of baked snacks, and thus variety can be increased.

EVALUATION

Figure 18:
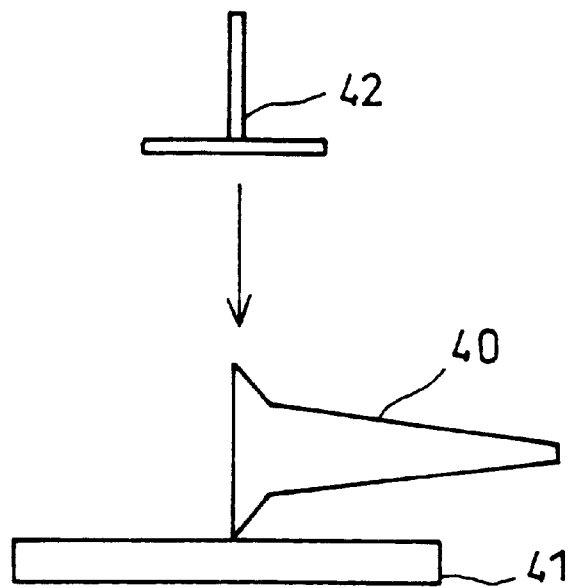
FIG. 18 is an explanatory drawing showing one example of a method of measuring the strength of a molded baked snack.
Figure 19:
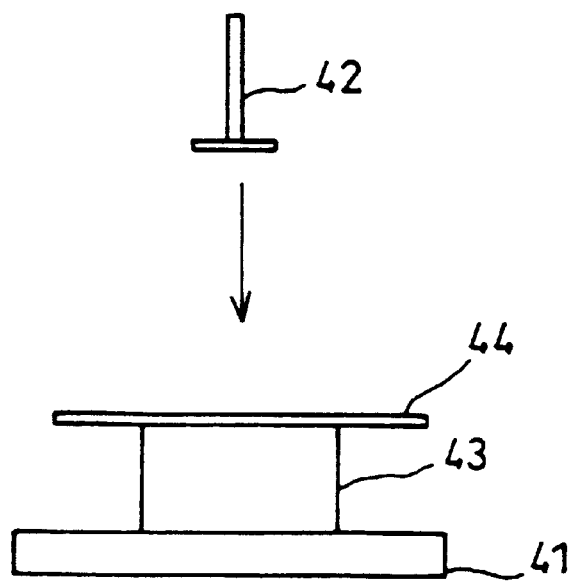
FIG. 19 is an explanatory drawing showing another example of a method of measuring the strength of a molded backed snack.

The strength of the molded baked snacks produced was measured and evaluated using the method shown in Table 9 and in FIGS. 18 and 19. To explain, as shown in FIG. 18, a conical molded baked snack 40 was placed on a stand 41, and strength was measured by lowering a plunger 42 from above. For wafer- and monaka-shaped molded baked snacks with a large flat area, as shown in FIG. 19, a molded baked snack 44 was placed on a hollow stand 43, and strength was measured by lowering a plunger 42 from above.

TABLE 9

MEASUREMENT OF STRENGTH
DEVICE USED: FUDOH RHEO METER NRM-2010J-CW

| MEASUREMENT NO. | MEASUREMENT 1 | MEASUREMENT 2 |
|---|---|---|
| SENSITIVITY | 10 kg | 10 kg |
| MEASURING PLUNGER SPEED | 5 cm/MINUTE | 5 cm/MINUTE |
| PLUNGER | CIRCULAR SUS Ø 40 mm | CIRCULAR SUS Ø 10 mm |
| MEASURED VALUE ADOPTED | GREATEST MEASURED STRENGTH | GREATEST MEASURED STRENGTH |

Figure 20:
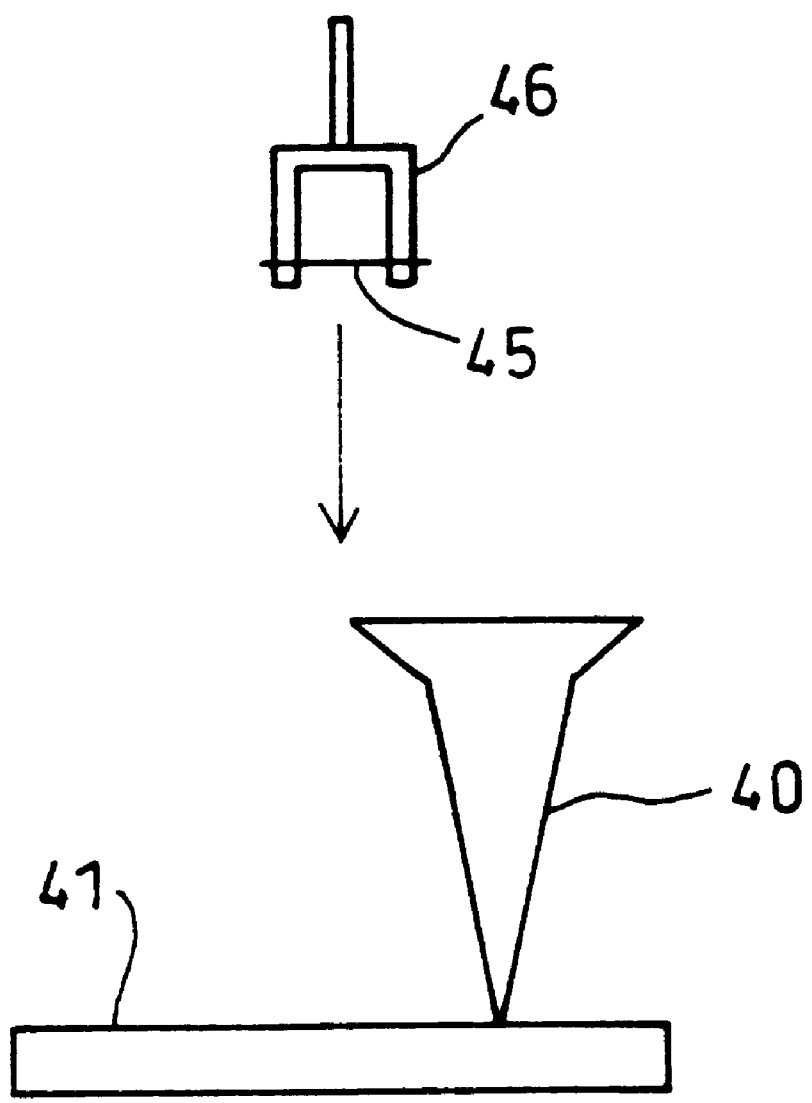
FIG. 20 is an explanatory drawing showing one example of a method of measuring a molded baked snack's consistency when eaten.

The molded baked snacks' consistency when eaten was measured and evaluated using the method shown in Table 10 and in FIG. 20. To explain, a conical molded baked snack 40 was placed on a stand 41, and measurement was made by lowering from above a plunger 46 strung with piano wire 45.

TABLE 10

MEASUREMENT OF CONSISTENCY WHEN EATEN
DEVICE USED: FUDOH RHEO METER NRM-2010J-CW

| | |
|---|---|
| SENSITIVITY | 10 kg |
| MEASURING PLUNGER SPEED | 2 cm/MINUTE |
| PLUNGER | PIANO WIRE |
| MEASURED VALUE ADOPTED | PEAK NUMBER |

Next, the liquid content of the molded baked snacks was measured and evaluated using the method shown in Table 11.

TABLE 11

MEASUREMENT OF LIQUID CONTENT
DEVICE USED: KETT ULTRAVIOLET LIQUID
CONTENT METER FD-220

| | |
|---|---|
| MEASURED MATERIAL | FINELY GROUND SNACKS |
| TEMPERATURE | 135° C. |
| DURATION OF MEASUREMENT | 5 MINUTES |

Next, the extent of coloring of the molded baked snacks was measured and evaluated using the method shown in Table 12.

TABLE 12

MEASUREMENT OF EXTENT OF COLORING
DEVICE USED: MINOLTA COLORIMETER CR-200

| | | |
|---|---|---|
| MEASURED POINTS | THREE TIMES | |
| EVALUATION | L VALUE | BLACK: SMALL; WHITE: LARGE |
| | a VALUE | GREEN: SMALL; RED: LARGE |
| | b VALUE | YELLOW: SMALL; BLUE: LARGE |

Viscosity of the ingredients was measured using the method shown in Table 13.

TABLE 13

MEASUREMENT OF VISCOSITY OF INGREDIENTS
DEVICE USED: TOKYO KEIKI BM-MODEL VISCOMETER

| | |
|---|---|
| ROTOR | NO. 4 |
| REVOLUTIONS | 30 REVOLUTIONS/MINUTE |
| AT TIMES OTHER THAN WHEN IN LIQUID AND SLURRY STATES | NOT MEASURED |

Evaluation of the molding of the molded baked snacks was made as shown in Table 14.

TABLE 14

EVALUATION OF MOLDING OF MOLDED BAKED SNACKS

| | | |
|---|---|---|
| EVALUATION | ⊙ | EXCELLENT |
| | ○ | CAN BE MOLDED WITH ALMOST NO PROBLEMS |
| | Δ | NEEDS IMPROVEMENT IN MOLD RELEASE, MAINTENANCE OF SHAPE, ETC. |
| | X | CANNOT BE MOLDED |

Evaluation of the properties of the molded baked snacks was made as shown in Table 15.

TABLE 15

EVALUATION OF PROPERTIES OF MOLDED BAKED SNACKS

| | | |
|---|---|---|
| PROPERTIES EVALUATED | STRENGTH, TEXTURE, APPEARANCE (SURFACE CONDITION, COLOR) | |
| EVALUATION | ⊙ | EXCELLENT |
| | ○ | GOOD |
| | Δ | FAIR |
| | X | POOR |

Next, several concrete examples will be explained.

EXAMPLE 1

Specifications of the present Example were as follows.

| | |
|---|---|
| Ingredient mixture: | No. 3. |
| Heating method: | As shown in Tables 16 through 19. |
| Snack shapes: | (1) and (5). |

TABLE 16

SNACK SHAPE (1)

| | CONDITIONS | | | RESULTS | | | | | | |
|---|---|---|---|---|---|---|---|---|---|---|
| EXPERIMENT NO. | HEATING DEVICE | PRESSURE REDUCTION | MOLD TEMPERATURE (° C.) | LIQUID CONTENT (%) | | | MOLDING TIME (sec.) | PROPERTIES | MOLDING | NOTE |
| | | | | AFTER 10 SECONDS | AFTER 30 SECONDS | FINAL | | | | |
| 1-1 | HA ONLY | YES | 80 | 40.5 | 37.2 | 33.5 | OVER 120 | x | x | HALF-BAKED |
| 1-2 | HA ONLY | NO | 140 | 22.1 | 15.3 | 6.5 | 75 | x | Δ | HALF-BAKED |
| 1-3 | HA ONLY | NO | 200 | 18.2 | 10.4 | 1.7 | 55 | ○ | ⊙ | |
| 1-4 | HB1 | YES | 80 | 38.5 | 35.3 | 30.0 | OVER 120 | x | x | HALF-BAKED |
| 1-5 | HB1 + HA | NO | 140 | 22.0 | 13.8 | 6.0 | 75 | Δ | Δ | HALF- |

TABLE 16-continued

SNACK SHAPE (1)

| | CONDITIONS | | | RESULTS | | | | | | |
|---|---|---|---|---|---|---|---|---|---|---|
| EXPERI-MENT NO. | HEATING DEVICE | PRESSURE REDUCTION | MOLD TEMPERATURE (° C.) | LIQUID CONTENT (%) | | | MOLDING TIME (sec.) | PROPER-TIES | MOLD-ING | NOTE |
| | | | | AFTER 10 SECONDS | AFTER 30 SECONDS | FINAL | | | | |
| 1-6 | HB1 + HA | NO | 200 | 17.8 | 10.2 | 1.8 | 50 | ○ | ⊙ | BAKED |
| 1-7 | HB2 | YES | 80 | 33.4 | 28.2 | 20.2 | OVER 120 | x | x | HALF-BAKED |
| 1-8 | HB2 + HA | NO | 140 | 20.2 | 12.5 | 4.8 | 70 | Δ | Δ | |
| 1-9 | HB2 + HA | NO | 200 | 16.9 | 9.8 | 1.5 | 50 | ⊙ | ⊙ | |
| 1-10 | HB3 | YES | 80 | 30.2 | 35.3 | 13.2 | 120 | x | Δ | HALF-BAKED |
| 1-11 | HB3 + HA | NO | 140 | 18.0 | 10.2 | 3.0 | 65 | ○ | ○ | |
| 1-12 | HB3 + HA | NO | 200 | 15.1 | 8.3 | 2.0 | 45 | ⊙ | ⊙ | |

TABLE 17

SNACK SHAPE (1)

| | CONDITIONS | | | RESULTS | | | | | | |
|---|---|---|---|---|---|---|---|---|---|---|
| EXPERI-MENT NO. | HEATING DEVICE | PRESSURE REDUCTION | MOLD TEMPERATURE (° C.) | LIQUID CONTENT (%) | | | MOLDING TIME (sec.) | PROPER-TIES | MOLD-ING | NOTE |
| | | | | AFTER 10 SECONDS | AFTER 30 SECONDS | FINAL | | | | |
| 1-13 | HC1 | YES | 80 | 13.2 | 8.2 | 2.5 | 60 | ⊙ | ○ | |
| 1-14 | HC1 + HA | NO | 140 | 10.2 | 5.5 | 3.0 | 50 | ⊙ | ○ | |
| 1-15 | HC1 + HA | NO | 200 | 8.5 | 4.1 | 2.9 | 35 | ⊙ | ⊙ | |
| 1-16 | HC2 | YES | 80 | 6.7 | 4.2 | 2.9 | 40 | ⊙ | ○ | |
| 1-17 | HC2 + HA | NO | 140 | 5.9 | — | 2.9 | 20 | ⊙ | ⊙ | |
| 1-18 | HC2 + HA | NO | 200 | 5.1 | — | 1.8 | 18 | ⊙ | ⊙ | |
| 1-19 | HC3 | YES | 80 | 6.5 | 2.0 | 2.0 | 30 | ⊙ | Δ | SPARKING IS LIKELY |
| 1-20 | HC3 + HA | NO | 140 | 4.8 | — | 2.0 | 15 | ○ | Δ | SPARKING IS LIKELY |
| 1-21 | HC3 + HA | NO | 200 | 3.7 | — | 2.3 | 12 | ○ | Δ | SPARKING IS LIKELY |

TABLE 18

SNACK SHAPE (5)

| | CONDITIONS | | | RESULTS | | | | | | |
|---|---|---|---|---|---|---|---|---|---|---|
| EXPERI-MENT NO. | HEATING DEVICE | PRESSURE REDUCTION | MOLD TEMP. (° C.) | LIQUID CONTENT (%) | | | MOLDING TIME (sec.) | PROPER-TIES | MOLD-ING | NOTE |
| | | | | AFTER 10 SECONDS | AFTER 30 SECONDS | FINAL | | | | |
| 1-22 | HA ONLY | YES | 80 | 41.5 | 37.7 | 33.8 | OVER 120 | x | x | HALF-BAKED |
| 1-23 | HA ONLY | NO | 140 | 23.1 | 15.8 | 6.8 | 75 | x | x | RIBS HALF-BAKED |
| 1-24 | HA ONLY | NO | 200 | 19.2 | 10.9 | 2.0 | 55 | ○ | ⊙ | |
| 1-25 | HB1 | YES | 80 | 39.5 | 35.8 | 30.3 | OVER 120 | x | x | HALF-BAKED |
| 1-26 | HB1 + HA | NO | 140 | 23.0 | 14.3 | 6.3 | 75 | Δ | x | RIBS HALF-BAKED |
| 1-27 | HB1 + HA | NO | 200 | 18.8 | 10.7 | 2.1 | 50 | ○ | ⊙ | |
| 1-28 | HB2 | YES | 80 | 34.4 | 28.7 | 20.5 | OVER 120 | x | x | RIBS HALF-BAKED |

TABLE 18-continued

SNACK SHAPE (5)

| | CONDITIONS | | | | | | RESULTS | | | |
|---|---|---|---|---|---|---|---|---|---|---|
| EXPERI- | | | MOLD | LIQUID CONTENT (%) | | | MOLDING | | | |
| MENT NO. | HEATING DEVICE | PRESSURE REDUCTION | TEMP. (° C.) | AFTER 10 SECONDS | AFTER 30 SECONDS | FINAL | TIME (sec.) | PROPER- TIES | MOLD- ING | NOTE |
| 1-29 | HB2 + HA | NO | 140 | 21.2 | 13.0 | 5.1 | 70 | Δ | Δ | RIBS SLIGHTLY HALF-BAKED |
| 1-30 | HB2 + HA | NO | 200 | 17.9 | 10.3 | 1.8 | 50 | ⊙ | ⊙ | |
| 1-31 | HB3 | YES | 80 | 31.2 | 35.8 | 13.5 | 120 | x | x | RIBS HALF-BAKED |
| 1-32 | HB3 + HA | NO | 140 | 19.0 | 10.7 | 3.3 | 65 | Δ | Δ | RIBS SLIGHTLY HALF-BAKED |
| 1-33 | HB3 + HA | NO | 200 | 16.1 | 8.8 | 2.3 | 45 | ⊙ | ⊙ | |

TABLE 19

SNACK SHAPE (5)

| | CONDITIONS | | | | | | RESULTS | | | |
|---|---|---|---|---|---|---|---|---|---|---|
| EXPERI- | | | MOLD | LIQUID CONTENT (%) | | | MOLDING | | | |
| MENT NO. | HEATING DEVICE | PRESSURE REDUCTION | TEMP. (° C.) | AFTER 10 SECONDS | AFTER 30 SECONDS | FINAL | TIME (sec.) | PROPER- TIES | MOLD- ING | NOTE |
| 1-34 | HC1 | YES | 80 | 14.2 | 8.7 | 2.8 | 60 | x | x | RIBS HALF-BAKED |
| 1-35 | HC1 + HA | NO | 140 | 11.2 | 6.0 | 3.3 | 50 | ○ | Δ | RIBS SLIGHTLY HALF-BAKED |
| 1-36 | HC1 + HA | NO | 200 | 9.5 | 4.6 | 3.2 | 35 | ⊙ | ⊙ | |
| 1-37 | HC2 | YES | 80 | 7.7 | 4.7 | 3.2 | 40 | x | x | RIBS HALF-BAKED |
| 1-38 | HC2 + HA | NO | 140 | 6.9 | — | 3.2 | 20 | ○ | ○ | |
| 1-39 | HC2 + HA | NO | 200 | 6.1 | — | 2.1 | 18 | ⊙ | ⊙ | |
| 1-40 | HC3 | YES | 80 | 7.5 | 2.5 | 2.3 | 30 | x | x | RIBS HALF-BAKED |
| 1-41 | HC3 + HA | NO | 140 | 5.8 | — | 2.3 | 15 | ○ | ○ | |
| 1-42 | HC3 + HA | NO | 200 | 4.7 | — | 2.6 | 12 | ○ | Δ | |

The results of the foregoing evaluations are as follows. Tables 17 and 19 are continuations of Tables 16 and 18, respectively.

The higher the frequency is set, the shorter the molding time, and the properties and molding of the molded baked snacks tend to improve. However, if the frequency is set too high, sparking is likely to occur, and it becomes difficult to control sparking.

If molding time is shortened, the ingredients expand quickly, and the properties of the molded baked snack tend to be weakened. Accordingly, in this case, it is necessary to select an ingredient mixture which does not easily expand and is not likely to form keloids on its surface.

When a combination of external and internal heating is used, duration of molding is markedly shortened.

Comparing Tables 16 and 17 with Tables 18 and 19, it is evident that the difficulty of applying voltage to the rib portions makes it difficult to induce internal heating, and the rib portions may be only half-baked. This naturally impairs the properties and molding of the molded baked snack. Since the rib portions are enclosed in the interior of one of the mold halves, when a voltage is applied to the metal mold, it is difficult to apply voltage to the ribs, and internal heating is difficult to induce. In a case like this, when a shape has portions which do not heat internally, external heating is generally also used. Further, it is also necessary to ensure that heating in these portions is equal to that in the internally heated portions by designing the metal mold so that its thickness at the portions which do not heat internally is thinner than elsewhere. In addition, another effective measure is to make it easier to apply voltage to the rib portions by adjusting the arrangement of the insulating section and the conductive body in the vicinity of the rib portions of the ingredients.

EXAMPLE 2

Specifications of the present Example were as follows.

| | |
|---|---|
| Ingredient mixtures: | No. 1 through No. 7. |
| Snack shape: | (1). |
| Heating method: | Shown in Tables 20 through 22 for ingredient mixture Nos. 1, 3 and 6. |

TABLE 20

INGREDIENT MIXTURE NO. 1

| HEATING DEVICE | | HC2 OUTPUT CONVERSION | | | | LIQUID CONTENT | MOLDING TIME (sec.) | | | SPARKING | |
|---|---|---|---|---|---|---|---|---|---|---|---|
| EXTERNAL | INTERNAL | | | | | EXTERNAL | | | | FIRST | SECOND |
| HA | HB2 | HC2 | L | C1 | C2 OFF | (%) | HA | HB2 | HC2 | HALF | HALF |
| ○ | x | x | / | / | / | UNDER 3 | 65 | / | / | / | / |
| ○ | ○ | x | / | / | / | UNDER 3 | / | 65 | / | / | / |
| ○ | ○ | x | / | / | / | UNDER 3 | / | 65 | / | / | / |
| ○ | ○ | x | / | / | / | UNDER 3 | / | 65 | / | / | / |
| ○ | x | ○ | 15 | 40 | 9 | UNDER 3 | / | / | 28 | / | / |
| ○ | x | ○ | 15 | 60 | 9 | UNDER 3 | / | / | 23 | / | / |
| ○ | x | ○ | 13 | 40 | 9 | UNDER 3 | / | / | 23 | / | / |
| ○ | x | ○ | 13 | 60 | 9 | UNDER 3 | / | / | 18 | / | / |
| ○ | x | ○ | 11 | 40 | 9 | UNDER 3 | / | / | 18 | / | / |
| ○ | x | ○ | 11 | 60 | 9 | UNDER 3 | / | / | 17 | / | / |
| ○ | x | ○ | 9 | 40 | 9 | UNDER 3 | / | / | 13 | / | / |
| ○ | x | ○ | 9 | 60 | 9 | UNDER 3 | / | / | 18 | / | / |
| ○ | ○ | ○ | 15 | 40 | 9 | UNDER 3 | / | 5 | 28 | / | / |
| ○ | ○ | ○ | 15 | 60 | 9 | UNDER 3 | / | 5 | 23 | / | / |
| ○ | ○ | ○ | 13 | 40 | 9 | UNDER 3 | / | 5 | 23 | / | / |
| ○ | ○ | ○ | 13 | 60 | 9 | UNDER 3 | / | 5 | 18 | / | / |
| ○ | ○ | ○ | 11 | 40 | 9 | UNDER 3 | / | 5 | 18 | / | / |
| ○ | ○ | ○ | 11 | 60 | 9 | UNDER 3 | / | 5 | 16 | / | / |
| ○ | ○ | ○ | 9 | 40 | 9 | UNDER 3 | / | 5 | 13 | / | / |
| ○ | ○ | ○ | 9 | 60 | 9 | UNDER 3 | / | 5 | 18 | / | / |

| PROPERTIES | | | | | |
|---|---|---|---|---|---|
| CONSISTENCY WHEN EATEN | APPEARANCE | TEXTURE | EVALUATION | MOLDING | NOTE |
| HARD | POOR | COARSE | Δ | ⊙ | NO CURRENT FROM HB2 |
| HARD | POOR | COARSE | Δ | ⊙ | NO CURRENT FROM HB2 |
| HARD | POOR | COARSE | Δ | ⊙ | NO CURRENT FROM HB2 |
| HARD | POOR | COARSE | Δ | ⊙ | NO CURRENT FROM HB2 |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | FAIR | FINE | ○ | ○ | |
| SOFT | FAIR | SLIGHTLY BURNED | Δ | ○ | |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | GOOD | FINE | ⊙ | ⊙ | |
| SOFT | FAIR | SLIGHTLY BURNED | Δ | ○ | |

TABLE 21

INGREDIENT MIXTURE NO. 3

| HEATING DEVICE | | HC2 OUTPUT CONVERSION | | | | LIQUID CONTENT | MOLDING TIME (sec.) | | | SPARKING | |
|---|---|---|---|---|---|---|---|---|---|---|---|
| EXTERNAL | INTERNAL | | | | | EXTERNAL | | | | FIRST | SECOND |
| HA | HB2 | HC2 | L | C1 | C2 OFF | (%) | HA | HB2 | HC2 | HALF | HALF |
| ○ | x | x | / | / | / | UNDER 3 | 65 | / | / | / | / |
| ○ | ○ | x | / | / | / | UNDER 3 | / | 65 | / | / | / |
| ○ | ○ | x | / | / | / | UNDER 3 | / | 60 | / | / | / |
| ○ | ○ | x | / | / | / | UNDER 3 | / | 55 | / | / | / |
| ○ | x | ○ | 15 | 40 | 9 | UNDER 3 | / | / | 30 | / | / |

TABLE 21-continued

INGREDIENT MIXTURE NO. 3

| EXTERNAL HA | INTERNAL HB2 | INTERNAL HC2 | HC2 OUTPUT L | HC2 OUTPUT C1 | HC2 OUTPUT C2 OFF | LIQUID CONTENT (%) | MOLDING TIME HA | MOLDING TIME HB2 | MOLDING TIME HC2 | SPARKING FIRST HALF | SPARKING SECOND HALF |
|---|---|---|---|---|---|---|---|---|---|---|---|
| ○ | x | ○ | 15 | 60 | 9 | UNDER 3 | / | / | 25 | / | / |
| ○ | x | ○ | 13 | 40 | 9 | UNDER 3 | / | / | 25 | / | / |
| ○ | x | ○ | 13 | 60 | 9 | UNDER 3 | / | / | 20 | / | / |
| ○ | x | ○ | 11 | 40 | 9 | UNDER 3 | / | / | 20 | / | / |
| ○ | x | ○ | 11 | 60 | 9 | UNDER 3 | / | / | 18 | / | / |
| ○ | x | ○ | 9 | 40 | 9 | UNDER 3 | / | / | 15 | / | / |
| ○ | x | ○ | 9 | 60 | 9 | UNDER 3 | / | / | — | YES | — |
| ○ | ○ | ○ | 15 | 40 | 9 | UNDER 3 | / | 5 | 28 | / | / |
| ○ | ○ | ○ | 15 | 60 | 9 | UNDER 3 | / | 5 | 23 | / | / |
| ○ | ○ | ○ | 13 | 40 | 9 | UNDER 3 | / | 5 | 23 | / | / |
| ○ | ○ | ○ | 13 | 60 | 9 | UNDER 3 | / | 5 | 18 | / | / |
| ○ | ○ | ○ | 11 | 40 | 9 | UNDER 3 | / | 5 | 18 | / | / |
| ○ | ○ | ○ | 11 | 60 | 9 | UNDER 3 | / | 5 | 16 | / | / |
| ○ | ○ | ○ | 9 | 40 | 9 | UNDER 3 | / | 5 | 13 | / | / |
| ○ | ○ | ○ | 9 | 60 | 9 | UNDER 3 | / | 5 | 18 | / | / |

| PROPERTIES | | | | | |
|---|---|---|---|---|---|
| CONSISTENCY WHEN EATEN | APPEARANCE | TEXTURE | EVALUATION | MOLDING | NOTE |
| HARD | POOR | COARSE | Δ | ⊙ | |
| HARD | POOR | COARSE | Δ | ⊙ | |
| HARD | FAIR | COARSE | ○ | ⊙ | |
| FAIRLY SOFT | FAIR | FAIRLY FINE | ○ | ⊙ | |
| SOFT | GOOD | FINE | ⊙ | ○ | |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | FAIR | SLIGHTLY BURNED | Δ | ○ | |
| SOFT | FAIR | FINE | ○ | ○ | |
| — | BURNED | VERY BURNED | x | x | MATCHING UNSTABLE |
| SOFT | GOOD | FINE | ⊙ | ○ | |
| SOFT | GOOD | FINE | ⊙ | ○ | |
| SOFT | GOOD | FINE | ⊙ | ⊙ | |
| SOFT | GOOD | FINE | ⊙ | ⊙ | |
| SOFT | GOOD | FINE | ⊙ | ○ | |
| SOFT | GOOD | FINE | ⊙ | ○ | |
| SOFT | FAIR | SLIGHTLY BURNED | Δ | ○ | MATCHING UNSTABLE |

TABLE 22

INGREDIENT MIXTURE NO. 6

| HEATING DEVICE EXTERNAL HA | HEATING DEVICE INTERNAL HB2 | HEATING DEVICE INTERNAL HC2 | HC2 OUTPUT L | HC2 OUTPUT C1 | HC2 OUTPUT C2 OFF | LIQUID CONTENT (%) | MOLDING TIME EXTERNAL HA | MOLDING TIME HB2 | MOLDING TIME HC2 | SPARKING FIRST HALF | SPARKING SECOND HALF |
|---|---|---|---|---|---|---|---|---|---|---|---|
| ○ | x | x | / | / | / | UNDER 3 | 65 | / | / | / | / |
| ○ | ○ | x | / | / | / | UNDER 3 | / | 62 | / | / | / |
| ○ | ○ | x | / | / | / | UNDER 3 | / | 55 | / | / | / |
| ○ | ○ | x | / | / | / | UNDER 3 | / | 50 | / | / | / |
| ○ | x | ○ | 15 | 40 | 9 | UNDER 3 | / | / | 35 | / | / |
| ○ | x | ○ | 15 | 60 | 9 | UNDER 3 | / | / | 30 | / | / |
| ○ | x | ○ | 13 | 40 | 9 | UNDER 3 | / | / | 30 | / | / |
| ○ | x | ○ | 13 | 60 | 9 | UNDER 3 | / | / | 25 | / | / |
| ○ | x | ○ | 11 | 40 | 9 | UNDER 3 | / | / | — | YES | — |
| ○ | x | ○ | 11 | 60 | 9 | UNDER 3 | / | / | — | YES | — |
| ○ | x | ○ | 9 | 40 | 9 | UNDER 3 | / | / | — | YES | — |
| ○ | x | ○ | 9 | 60 | 9 | UNDER 3 | / | / | — | YES | — |
| ○ | ○ | ○ | 15 | 40 | 9 | UNDER 3 | / | 5 | 32 | / | / |
| ○ | ○ | ○ | 15 | 60 | 9 | UNDER 3 | / | 5 | 27 | / | / |
| ○ | ○ | ○ | 13 | 40 | 9 | UNDER 3 | / | 5 | 27 | / | / |
| ○ | ○ | ○ | 13 | 60 | 9 | UNDER 3 | / | 5 | 21 | / | / |

TABLE 22-continued

INGREDIENT MIXTURE NO. 6

| | | | | | | | | | | | |
|---|---|---|---|---|---|---|---|---|---|---|---|
| ○ | ○ | ○ | 11 | 40 | 9 | UNDER 3 | / | 5 | 21 | / | / |
| ○ | ○ | ○ | 11 | 60 | 9 | UNDER 3 | / | 5 | — | YES | — |
| ○ | ○ | ○ | 9 | 40 | 9 | UNDER 3 | / | 5 | — | YES | — |
| ○ | ○ | ○ | 9 | 60 | 9 | UNDER 3 | / | 5 | — | YES | — |

PROPERTIES

| CONSISTENCY WHEN EATEN | APPEARANCE | TEXTURE | EVALUATION | MOLDING | NOTE |
|---|---|---|---|---|---|
| HARD | POOR | COARSE | Δ | ⊚ | |
| HARD | POOR | COARSE | Δ | ⊚ | |
| FAIRLY SOFT | FAIR | FAIRLY FINE | ○ | ⊚ | |
| FAIRLY SOFT | FAIR | FAIRLY FINE | ○ | ⊚ | |
| SOFT | GOOD | FINE | ⊚ | ○ | |
| SOFT | GOOD | FINE | ⊚ | ⊚ | |
| SOFT | FAIR | FINE | ⊚ | ⊚ | |
| SOFT | FAIR | SLIGHTLY BURNED | ○ | ○ | |
| — | BURNED | VERY BURNED | x | x | MATCHING UNSTABLE |
| — | BURNED | VERY BURNED | x | x | MATCHING UNSTABLE |
| — | BURNED | VERY BURNED | x | x | MATCHING UNSTABLE |
| — | BURNED | VERY BURNED | x | x | MATCHING UNSTABLE |
| SOFT | GOOD | FINE | ⊚ | ○ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | FAIR | SLIGHTLY BURNED | ○ | ○ | |
| — | BURNED | VERY BURNED | x | x | MATCHING UNSTABLE |
| — | BURNED | VERY BURNED | x | x | MATCHING UNSTABLE |
| — | BURNED | VERY BURNED | x | x | MATCHING UNSTABLE |

In each of the Tables, the values under the headings "L," "C1," and "C2 OFF" are values for the L component, the C1 component, and the C2 component, respectively, set in order to adjust output during heating by internal heating at a predetermined frequency. "C2 OFF" indicates that, although the automatic capacitor C2 usually functions as an automatic capacitor, that function has been turned off here, and the value set manually. These matters are also true for each of the following Examples.

The results of the foregoing evaluations were as follows.

At 200 Hz, ingredient mixture No. 1, which contained no salt, i.e., electrolyte, did not heat internally, and there was no difference from heating with external heating alone.

At 13.56 MHz, heating was possible at each of the different salt concentrations, but with higher concentrations, increased conductivity led to marked sparking, and with ingredient mixtures No. 6 and No. 7, it was impossible to control molding so as to prevent sparking. Even with the same concentration, sparking was more likely the higher the frequency. It was also found that sparking could be controlled by decreasing the electric field between the electrodes by holding down output.

With ingredient mixture No. 6, because of the difficulty of controlling sparking, output had to be decreased substantially, and thus molding time was increased. When processing was first performed at 200 Hz, however, subsequent processing at 13.56 MHz went successfully.

EXAMPLES 3

Specifications of the present Example were as follows.

| | |
|---|---|
| Ingredient mixture: | No. 3. |
| Heating method: | As shown in Tables 23 and 24. |
| Snack shape: | (1). |

TABLE 23

| HEATING DEVICE | | | MOLD PRESSURE REDUCTION | TEMP. (° C.) | LIQUID CONTENT (%) | MOLDING TIME (sec.) | PROPERTIES | | | |
|---|---|---|---|---|---|---|---|---|---|---|
| | | | | | | | STRENGTH (Kg.) | CONSISTENCY WHEN EATEN (TIME/MIN.) | COLORING (L VALUE) | |
| EXTERNAL | INTERNAL | | | | | | | | DEPOSITED AREAS | EXPANDED AREAS |
| HA | HB2 | HC2 | | | | | | | | |
| ○ | x | x | YES | 50 | — | OVER 120 | * | * | — | — |
| ○ | x | x | NO | 50 | — | OVER 120 | * | * | — | — |
| ○ | x | x | YES | 110 | 18.2 | OVER 120 | * | * | 62 | 65 |

TABLE 23-continued

| | | | | | | | | | | |
|---|---|---|---|---|---|---|---|---|---|---|
| o | x | x | NO | 110 | 20.2 | OVER 120 | * | * | 62 | 65 |
| o | x | x | NO | 170 | 2.8 | 65 | 1.2 | 48 | 58 | 61 |
| o | x | x | NO | 230 | 1.2 | 50 | 0.9 | 40 | 55 | 58 |
| x | o | x | YES | 50 | 33.5 | OVER 120 | * | * | 63 | 65 |
| x | o | x | NO | 50 | 35.2 | OVER 120 | * | * | 63 | 65 |
| o | o | x | YES | 110 | 14 | 85 | 0.5 | 58 | 62 | 63 |
| o | o | x | NO | 110 | 15 | OVER 120 | 0.5 | 58 | 62 | 63 |
| o | o | x | NO | 170 | 1.7 | 60 | 0.9 | 60 | 58 | 60 |
| o | o | x | NO | 230 | 1.2 | 45 | 0.9 | 53 | 55 | 57 |

| PROPERTIES | | EVALU- | MOLDING SHAPE | | NOTE |
|---|---|---|---|---|---|
| APPEARANCE | TEXTURE | ATION | MAINTEN-ANCE | MOLD RELEASE | |
| VERY WRINKLED/DEFORMED | RAW INSIDE | x | x | x | NO CHANGE |
| VERY WRINKLED/DEFORMED | RAW INSIDE | x | x | x | NO CHANGE |
| VERY WRINKLED/DEFORMED | RAW INSIDE | x | x | x | SURFACE α-TYPE |
| VERY WRINKLED/DEFORMED | RAW INSIDE | x | x | x | SURFACE α-TYPE |
| GOOD | COARSE | o | ⊚ | ⊚ | |
| GOOD | COARSE | o | o | o | SLIGHTLY BRITTLE |
| VERY WRINKLED/DEFORMED | RAW INSIDE | x | x | x | NO CHANGE |
| VERY WRINKLED/DEFORMED | RAW INSIDE | x | x | x | NO CHANGE |
| VERY WRINKLED/DEFORMED | RAW INSIDE | Δ | Δ | Δ | ENTIRETY α-TYPE |
| VERY WRINKLED/DEFORMED | RAW INSIDE | Δ | x | Δ | ENTIRETY α-TYPE |
| GOOD | SLIGHTLY COARSE | o | ⊚ | ⊚ | |
| GOOD | SLIGHTLY COARSE | o | o | o | SLIGHTLY BRITTLE |

*UNMEASURABLE

TABLE 24

| HEATING DEVICE | | | MOLD | LIQUID | MOLDING | PROPERTIES | | | |
|---|---|---|---|---|---|---|---|---|---|
| EXTERNAL | INTERNAL | | PRESSURE | TEMP. | CONTENT | TIME | STRENGTH | CONSISTENCY WHEN EATEN | COLORING (L VALUE) | |
| HA | HB2 | HC2 | REDUCTION | (° C.) | (%) | (sec.) | (Kg.) | (TIMES/MIN.) | DEPOSITED AREAS | EXPANDED AREAS |
| x | x | o | YES | 50 | 2.9 | 45 | 1 | 70 | 65 | 66 |
| x | x | o | NO | 50 | 2.9 | 45 | 1 | 70 | 65 | 66 |
| o | x | o | YES | 110 | 3.3 | 30 | 0.9 | 72 | 63 | 64 |
| o | x | o | NO | 110 | 3.4 | 35 | 0.9 | 72 | 63 | 64 |
| o | x | o | NO | 170 | 2.3 | 20 | 0.9 | 75 | 60 | 60 |
| o | x | o | NO | 230 | 1.8 | 12 | 0.8 | 71 | 60 | 59 |
| x | o | o | YES | 50 | 2.6 | 50 | 1 | 70 | 65 | 66 |
| x | o | o | NO | 50 | 2.6 | 50 | 1 | 70 | 65 | 66 |
| o | o | o | YES | 110 | 3.4 | 35 | 0.9 | 72 | 63 | 64 |
| o | o | o | NO | 110 | 3.3 | 40 | 0.9 | 72 | 63 | 64 |
| o | o | o | NO | 170 | 1.9 | 23 | 0.9 | 79 | 60 | 60 |
| o | o | o | NO | 230 | 2.1 | 15 | 0.8 | 72 | 60 | 59 |

TABLE 24-continued

| | PROPERTIES | | | MOLDING SHAPE | | |
|---|---|---|---|---|---|---|
| | APPEARANCE | TEXTURE | EVALU-ATION | MAINTEN-ANCE | MOLD RELEASE | NOTE |
| | GOOD | FINE | ○ | ⊙ | ○ | |
| | VERY WRINKLED/ DEFORMED | FINE | × | × | × | SPARKING |
| | EXCELLENT | FINE | ⊙ | ⊙ | ⊙ | |
| | GOOD | FINE | ○ | ⊙ | ⊙ | |
| | EXCELLENT | FINE | ⊙ | ⊙ | ⊙ | |
| | EXCELLENT | FINE | ⊙ | ⊙ | ⊙ | |
| | GOOD | FINE | ○ | ⊙ | ○ | |
| | VERY WRINKLED/ DEFORMED | FINE | × | × | × | SPARKING |
| | EXCELLENT | FINE | ⊙ | ⊙ | ⊙ | |
| | GOOD | FINE | ○ | ⊙ | ⊙ | |
| | EXCELLENT | FINE | ⊙ | ⊙ | ⊙ | |
| | EXCELLENT | FINE | ⊙ | ⊙ | ⊙ | |

*UNMEASURABLE

The results of the foregoing investigations are as follows. Table 24 is a continuation of Table 23.

When molding using external heating or in the low frequency range, molding could not be performed unless the mold temperature was at least 140° C. to 150° C. Further, whether molding was successful or unsuccessful had little to do with reduction of pressure, etc., but depended almost entirely on mold temperature.

With molding in the low frequency range, drying as a result of internal heating progressed somewhat more than with external heating alone, but the difference was small.

With molding in the high frequency range, when the temperature of the metal mold and the vapor release sections was 100° C. or less, reduction of pressure was definitely necessary. Without reduction of pressure, water vapor condensed, especially around the vapor release sections, and molding was impossible due to sparking. If the temperature was over 100° C., water vapor produced from the ingredients exited from the metal mold, and did not condense. Under these conditions, reduction of pressure was unnecessary, and good molded baked snacks could be manufactured.

Figure 21A:
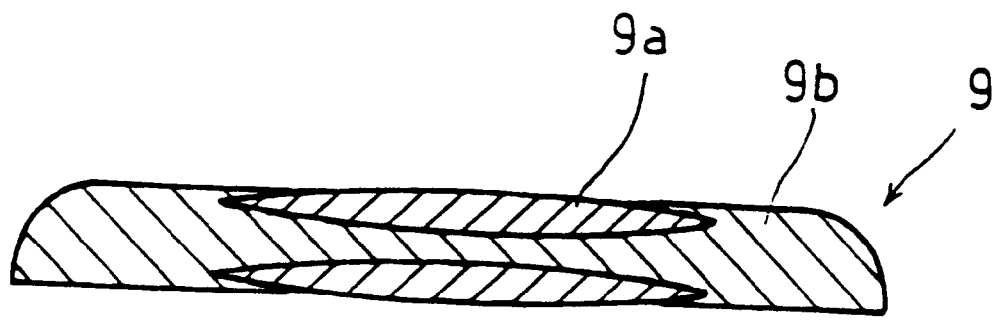
FIGS. 21(a) and 21(b) show one structural example of a molded baked snack.
Figure 21B:
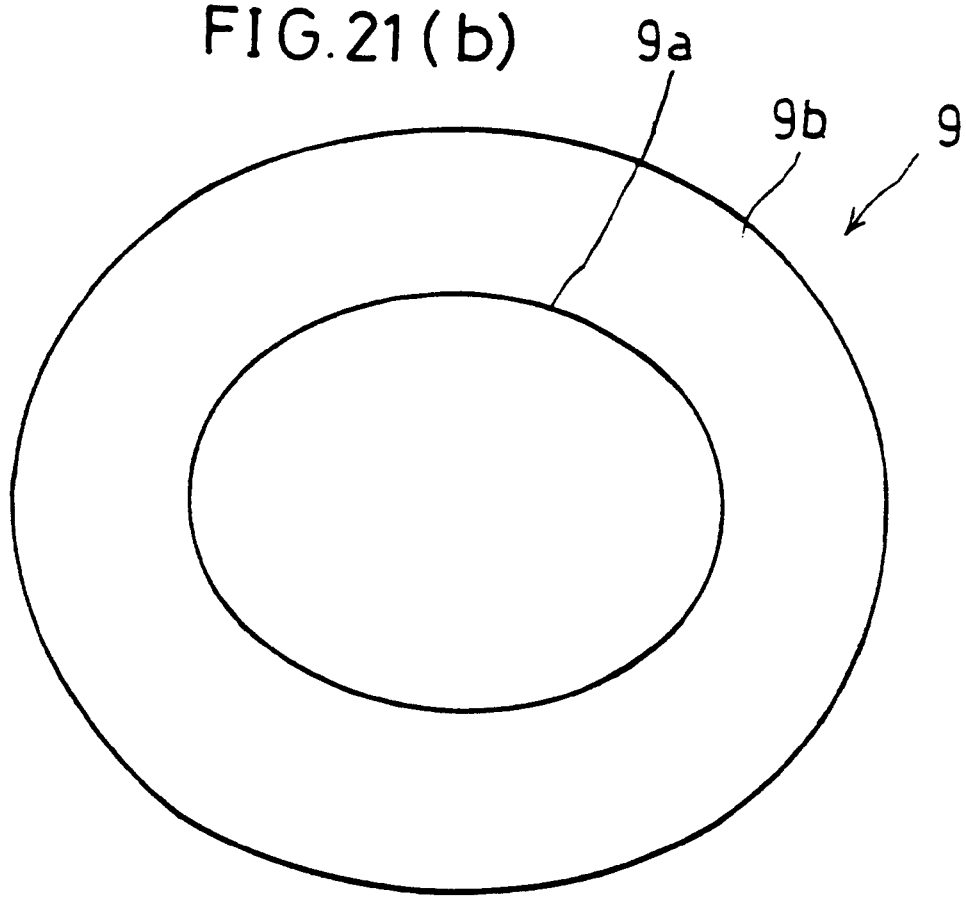

FIGS. 21(a) and 21(b) show the appearance of the ingredients 9 during molding. As shown in these Figures, there are deposited areas 9a, where the ingredients 9 touch the mold at the time of depositing (injection), surrounded by an expanded area 9b, into which the ingredients expand due to foaming. Under the conditions shown in Table 24, the difference in the L values of the deposited areas 9a and the expanded area 9b was only 0 to 1, but with external heating alone, as shown in the first six rows of Table 23, this difference in L values was 3, i.e., the deposited areas 9a and the expanded area 9b had a marked color difference. In other words, with molding by external heating, the appearance of the deposited areas 9a was poor. With molding by internal heating, the deposited areas 9a had an excellent appearance.

Figure 23:
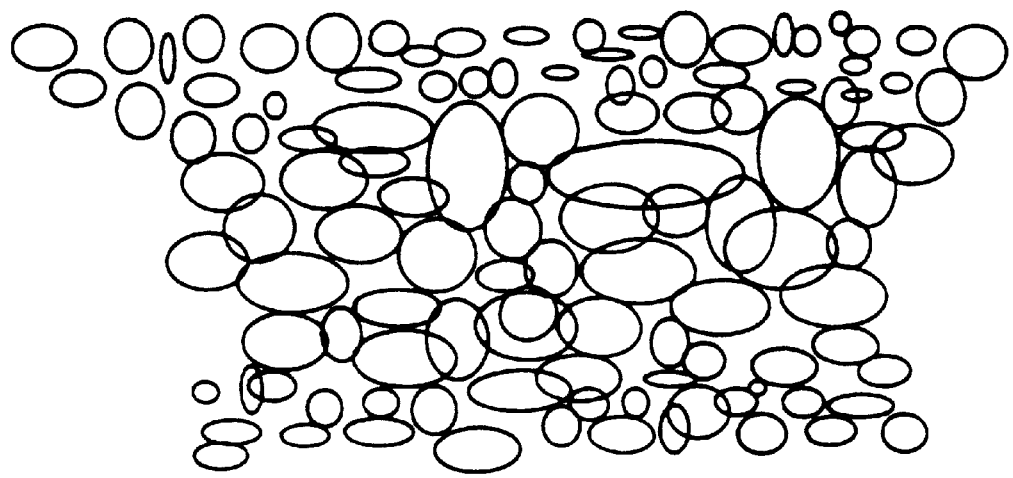
FIG. 23 is an explanatory drawing showing the state of a cross-section of a molded baked snack manufactured by external heating.

With external heating alone, the molded baked snack is likely to be non-uniform, with an uneven surface in the deposited areas 9a, and a coarse internal texture. FIG. 23 shows the internal texture of a molded baked snack manufactured using external heating. With external heating, only the particles at the surface have small diameters, and those in the interior are coarse.

With molding in the low frequency range, in contrast, the properties obtained were somewhat better than with external heating alone.

Figure 22:
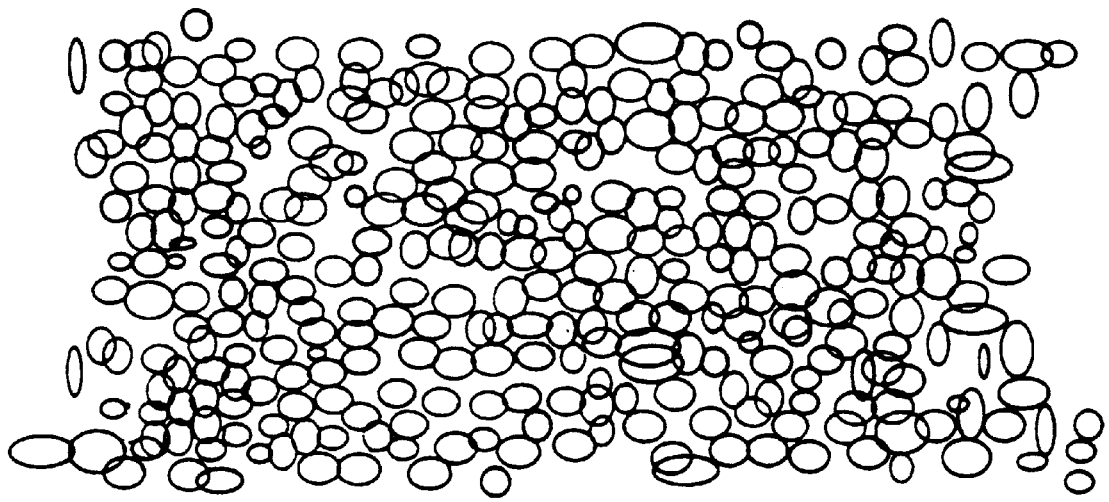
FIG. 22 is an explanatory drawing showing the state of a cross-section of a molded baked snack manufactured by internal heating.

With molding in the high frequency range, properties of the molded baked snacks tended to be excellent. Color difference between the deposited areas 9a and the expanded area 9b was small, there was little surface unevenness or difference in strength, and a molded baked snack with fine, uniform texture could be manufactured. FIG. 22 shows the internal texture of a molded baked snack manufactured using internal heating. With internal heating, particle diameters both on the surface and in the interior are sufficiently small.

EXAMPLE 4

In the present Example, the influence of liquid content was investigated. Specifications were as follows.

| | |
|---|---|
| Experiment Nos.: | No. 4-1 through No. 4-8. |
| Ingredient Mixtures: | No. 8 through No. 15. |
| Snack shape: | (1). |

The heating method was heating with heating device HC2 at a mold temperature of 170° C. The results were as shown below.

TABLE 25

| EXPERI-MENT NO. | INGREDIENT MIXTURE NO. | HEATING DEVICE | PRO-PER-TIES | MOLDING | NOTE |
|---|---|---|---|---|---|
| 4-1 | 8 | HC2 | ○ | ⊙ | |
| 4-2 | 9 | | ⊙ | ⊙ | |
| 4-3 | 10 | | ⊙ | ⊙ | |
| 4-4 | 11 | | ⊙ | ⊙ | |
| 4-5 | 12 | | ⊙ | ⊙ | |
| 4-6 | 13 | | ⊙ | ⊙ | |
| 4-7 | 14 | | ○ | ⊙ | |
| 4-8 | 15 | | ○ | ⊙ | |

Varying the liquid content of the ingredients influenced the properties of the molded baked snacks, but good molding was obtained in each case.

With regard to the properties of the molded baked snacks, the lower the original liquid content, the harder the consistency when eaten, and the harder the molded baked snack obtained. Applying this principle, it can be seen that the properties of the molded baked snack can be adjusted by varying the liquid content of the ingredients. However, since the ingredients after mixing may be in a dough state, or, even if in a slurry state, may have varying viscosities, the method of depositing the ingredients into the metal mold should make use of a structure in keeping with the ingredient mixture used.

The liquid content of the ingredients was varied widely, but it was sufficient merely to provide a deposit (injection) structure in keeping with the properties of the ingredients; there were no problems with molding or with properties after molding. However, with lower liquid content and more solids, molded baked snacks with a hard consistency when eaten tended to be produced. Consequently, it was shown that the liquid content may be set in keeping with the desired shape and use of the molded baked snack.

EXAMPLE 5

In the present Example, the influence of starch was investigated. Specifications were as follows.

| Experiment Nos. | No. 5-1 through No. 5-15. |
| --- | --- |
| Ingredient mixtures: | No. 3 and No. 16 through No. 19. |
| Starches used: | Potato, rice, wheat, corn, tapioca, sweet potato. |
| Snack shapes: | (1), (4), and (7). |

The heating method was heating with heating device HC2 at a mold temperature of 170° C. The results were as shown below.

TABLE 26

| EXPERIMENT NO. | INGREDIENT MIXTURE NO. | SHAPE | HEATING DEVICE | PROPERTIES | MOLDING | NOTE |
| --- | --- | --- | --- | --- | --- | --- |
| 5-1 | 3 | (1) | HC2 | ◎ | ◎ | |
| 5-2 | 16 | | | ◎ | ◎ | |
| 5-3 | 17 | | | ◎ | ◎ | |
| 5-4 | 18 | | | ◎ | ◎ | |
| 5-5 | 19 | | | ○ | ◎ | |
| 5-6 | 3 | (4) | HC2 | ○ | ○ | |
| 5-7 | 16 | | | ◎ | ○ | |
| 5-8 | 17 | | | ◎ | ◎ | |
| 5-9 | 18 | | | ◎ | ◎ | |
| 5-10 | 19 | | | ◎ | ◎ | |
| 5-11 | 3 | (7) | HC2 | ○ | ○ | |
| 5-12 | 16 | | | ◎ | ○ | |
| 5-13 | 17 | | | ◎ | ◎ | |
| 5-14 | 18 | | | ◎ | ◎ | |
| 5-15 | 19 | | | ◎ | ◎ | |

Varying the quantity and type of starch in the ingredients influenced the properties of the molded baked snacks, but good molding was obtained in each case. The properties of the molded baked snacks varied greatly, especially according to the type of starch used, and since expansion, consistency when eaten, etc. could be varied, it was possible to make adjustments, by changing the type and quantity of starch, in order to obtain necessary expansion (shape), consistency when eaten, etc.

Snack shapes (1) through (5) are long in the direction of the axis of the cone, and thus expansion in this direction, i.e., longitudinal expansion, is important. Snack shapes (6) and (7) are long in an in-plane direction, like wafers or monaka, and for these shapes, it is preferable to use a starch suited to expansion in this direction, i.e., in-plane expansion. With thick shapes such as snack shapes (3) and (4), a molded baked snack with better properties can be molded by using a starch able to impart a soft consistency when eaten, and by using ingredients containing more starch, such as ingredient mixture Nos. 17 through 19.

EXAMPLE 6

In the present Example, re-use of molded baked snacks was investigated. Specifications were as follows.

| Experiment Nos.: | No. 6-1 and No. 6-2. |
| --- | --- |
| Ingredient mixtures: | No. 20 and No. 21. |
| Snack shapes: | (1), (4), and (7). |

The heating method was heating with heating device HC2 at a mold temperature of 170° C. The results were as shown below.

TABLE 27

| EXPERIMENT NO. | INGREDIENT MIXTURE NO. | HEATING DEVICE | PROPERTIES | MOLDING | NOTE |
| --- | --- | --- | --- | --- | --- |
| 6-1 | 20 | HC2 | ◎ | ◎ | |
| 6-2 | 21 | HC2 | ◎ | ◎ | |

Previously molded snacks and burrs protruding from between the mold halves were gathered, impurities were removed therefrom, and they were ground and added to the mixer with flour, starch, etc., and stirred and mixed together.

Good molding and good properties were obtained, and in this way burrs and defective molded snacks can be re-used, and loss reduced.

Further, it was proven that burrs produced during molding, and defective molded snacks, can be re-used by mixing with the original ingredients after purification and grinding.

Viscosity of the ingredient mixture was also increased by the addition of the ground matter. However, in comparison with ingredient mixture No. 3, there was almost no significant difference in properties and molding, and both of these were good.

EXAMPLE 7

In the present Example, the influence of sugar was investigated. Specifications were as follows.

| | |
|---|---|
| Experiment Nos. | No. 7-1 through No. 7-16. |
| Ingredient mixtures: | No. 11 and Nos. 22 through 25 for snack shapes (1) and (3); No. 11 and No. 22 through No. 26 for snack shape (6). |
| Snack shapes: | (1), (3), and (6). |

The heating method was heating with heating device HC2 at a mold temperature of 170° C. The results were as shown below.

TABLE 28

| EXPERIMENT NO. | INGREDIENT MIXTURE NO. | SHAPE | HEATING DEVICE | PROPERTIES | MOLDING | NOTE |
|---|---|---|---|---|---|---|
| 7-1 | 11 | (1) | HC2 | ⊚ | ⊚ | |
| 7-2 | 22 | | | ⊚ | ⊚ | |
| 7-3 | 23 | | | ⊚ | ⊚ | |
| 7-4 | 24 | | | ⊚ | ⊚ | |
| 7-5 | 25 | | | X | X | POOR MOLD RELEASE |
| 7-6 | 11 | (3) | HC2 | ⊚ | ⊚ | |
| 7-7 | 22 | | | ⊚ | ⊚ | |
| 7-8 | 23 | | | ⊚ | ⊚ | |
| 7-9 | 24 | | | ⊚ | ⊚ | |
| 7-10 | 25 | | | Δ | Δ | POOR MOLD RELEASE BECAUSE OF LACK OF FLEXIBILITY AFTER BAKING, COULD NOT BE FORMED INTO CONE, BUT COULD BE MOLDED AS WAFER |
| 7-11 | 11 | (6) | HC2 | ⊚ | ○ | |
| 7-12 | 22 | | | ⊚ | ○ | |
| 7-13 | 23 | | | ⊚ | ○ | |
| 7-14 | 24 | | | ⊚ | ○ | |
| 7-15 | 25 | | | ⊚ | ⊚ | |
| 7-16 | 26 | | | ⊚ | ⊚ | |

Varying the quantity of sugar added to the ingredients influenced the molding of the molded baked snacks, but good molding was obtained in each case.

Properties of the molded baked snacks varied greatly according to the quantity of sugar added, and thus expansion during molding, consistency when eaten, and flavor can be varied.

When using ingredient mixture No. 25, which included a large quantity of sugar, molded baked snacks having snack shape (6) showed flexible properties in a high-temperature state immediately after baking. For this reason, these molded baked snacks are initially baked in a wafer shape using two iron plates. Thereafter, the wafer may be wrapped around a conical form, and cooled and formed. With snack shapes (1) and (3), because of a low rate of shrinkage when the mold was opened after molding, and because the molded baked snack was too flexible, mold release was poor. This made molding difficult.

EXAMPLE 8

In the present Example, addition of aromatics was investigated. Specifications were as follows.

| | |
|---|---|
| Experiment Nos. | No. 8-1 through No. 8-5. |
| Ingredient mixtures: | No. 24 and No. 27 through No. 30. |
| Snack shape: | (3). |

The heating method was heating with heating device HC2 at a temperature of 170° C. The results are shown below.

TABLE 29

| EXPERIMENT NO. | INGREDIENT MIXTURE NO. | HEATING DEVICE | PROPERTIES | MOLDING | NOTE |
|---|---|---|---|---|---|
| 8-1 | 24 | HC2 | ⊚ | ⊚ | |
| 8-2 | 27 | | ⊚ | ⊚ | |
| 8-3 | 28 | | ⊚ | ⊚ | |
| 8-4 | 29 | | ⊚ | ⊚ | |
| 8-5 | 30 | | ⊚ | ⊚ | |

More of the aromatics were dispersed with heating methods with long molding times, but with molded baked snacks able to be baked in a short time, it was shown that only a small amount of aromatic was necessary.

A functional test found that, in comparison with external heating of the same ingredient mixture, internal heating was able to obtain an equivalent aroma using one-half the quantity of aromatic.

EXAMPLE 9

In the present Example, addition of leavening was investigated. Specifications were as follows.

| | |
|---|---|
| Experiment Nos.: | No. 9-1 through No. 9-6. |
| Ingredient mixtures: | No. 31 through 36. |
| Snack shape: | (1) |

The heating method was heating with heating device HC2 at a temperature of 170° C. The results are shown below.

TABLE 30

| EXPERI-MENT NO. | INGREDIENT MIXTURE NO. | HEATING DEVICE | PRO-PER-TIES | MOLD-ING | NOTE |
|---|---|---|---|---|---|
| 9-1 | 31 | HC2 | ⊚ | ⊚ | |
| 9-2 | 32 | | ⊚ | ⊚ | |
| 9-3 | 33 | | ⊚ | ⊚ | |
| 9-4 | 34 | | ⊚ | ⊚ | |
| 9-5 | 35 | | ○ | ⊚ | |
| 9-6 | 36 | | Δ | ○ | |

When performing internal heating using the same quantity of leavening, it was found that, in comparison with external heating alone, internal heating was able to obtain an equivalent expansion with a smaller amount of leavening. In other words, in consideration of the weight of the ingredients to be molded, and of the stability of expansion, it was found that it was sufficient to use approximately one-half of the quantity of leavening used with external heating. Conversely, when too much leavening was added, defective molding tended to occur.

EXAMPLE 10

First, using FIGS. 24 through 30, the following will explain setting of a good oscillator vacuum tube anode current for molding by internal heating (high frequency range).

Figure 24:
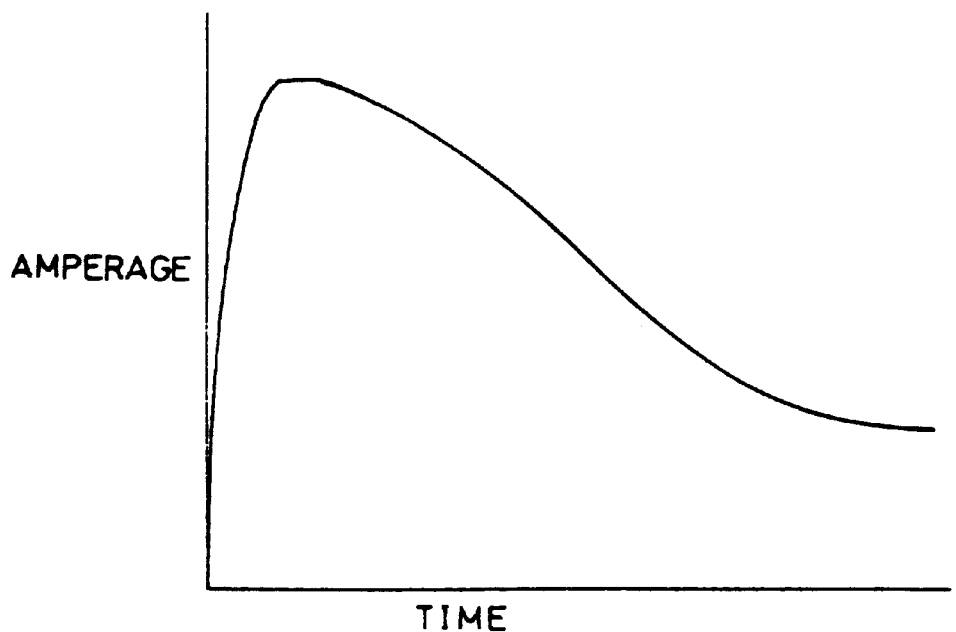
FIG. 24 is a graph showing the relationship between amperage and heating time of molded baked snacks.
Figure 25:
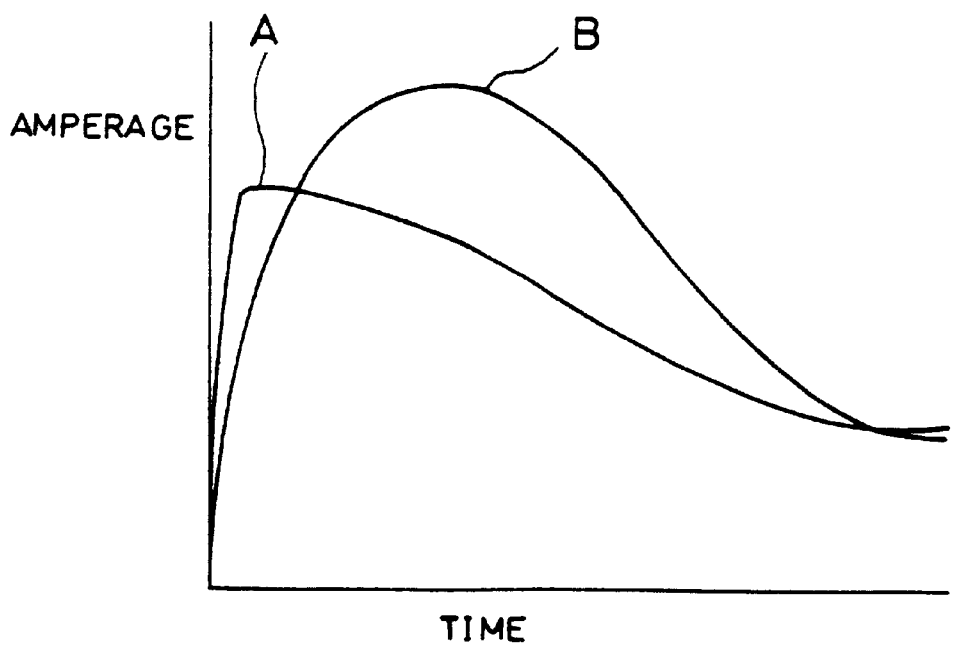
FIG. 25 is a graph showing the relationship between amperage and heating time of molded baked snacks.

If a graph is prepared of the relationship between heating time (horizontal axis) and the oscillator vacuum tube anode amperage flowing through the metal mold (vertical axis), as shown in FIG. 24, at the commencement of heating, there are cases in which too much current flows, and this excessive current (output) can lead to sparking, burning of the molded baked snack, etc. Possible reasons for this include:
(1) The maximum amperage is too high (output is too large);
(2) The ingredients in the metal mold are in an unstable state;
(3) The quantity of salt contained is too large; and
(4) Pressure inside the metal mold is too high.

Figure 26:
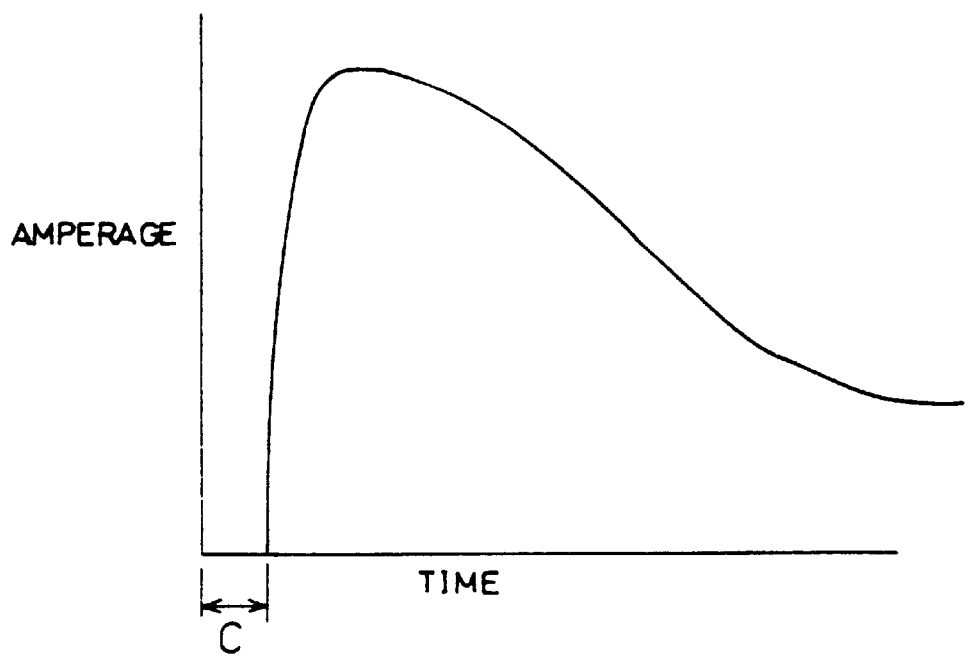
FIG. 26 is a graph showing the relationship between amperage and heating time of molded baked snacks.

In such cases, measures are taken such as decreasing the output (as shown by curve A in FIG. 25), making the slope of the increase in current more gradual (as shown by curve B in FIG. 25), etc. Alternatively, as shown in FIG. 26, measures may be taken to stabilize the state of the ingredients in the initial stage of heating by adding an ingredient stabilization step C in the initial stage of heating. By means of these measures, excessive increase of the anode amperage can be controlled.

Figure 27:
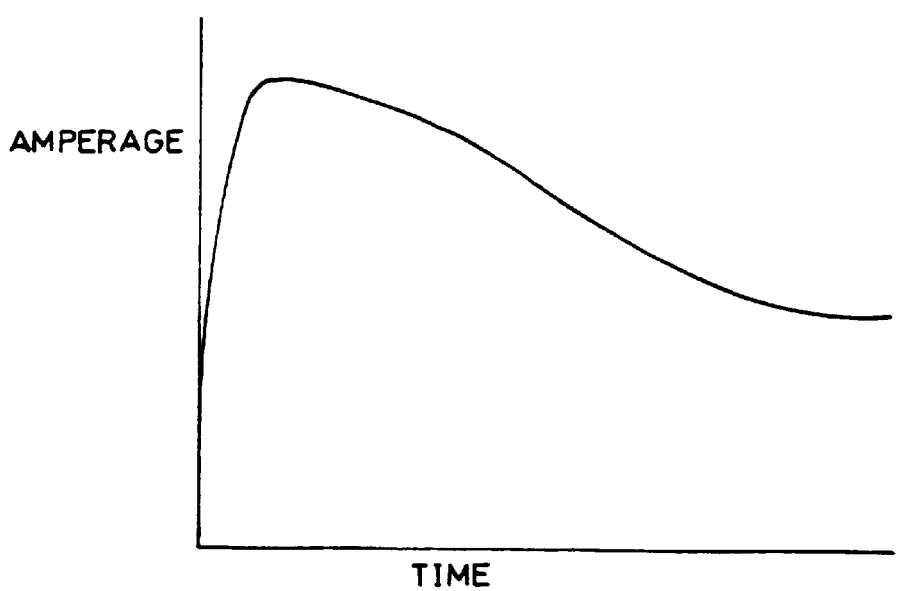
FIG. 27 is a graph showing the relationship between amperage and heating time of molded baked snacks.

As shown in FIG. 27, in the latter half of heating, there are cases in which the current remains at an unnecessarily high level, and since the amperage during the drying stage is too high, sparking, burning of the molded baked snack, etc. may occur. Possible reasons for this include:
(1) The quantity of salt contained is too large;
(2) The ingredients contain a large quantity of ingredients which easily burn; and
(3) The quantity of ingredients is insufficient.

Figure 28:
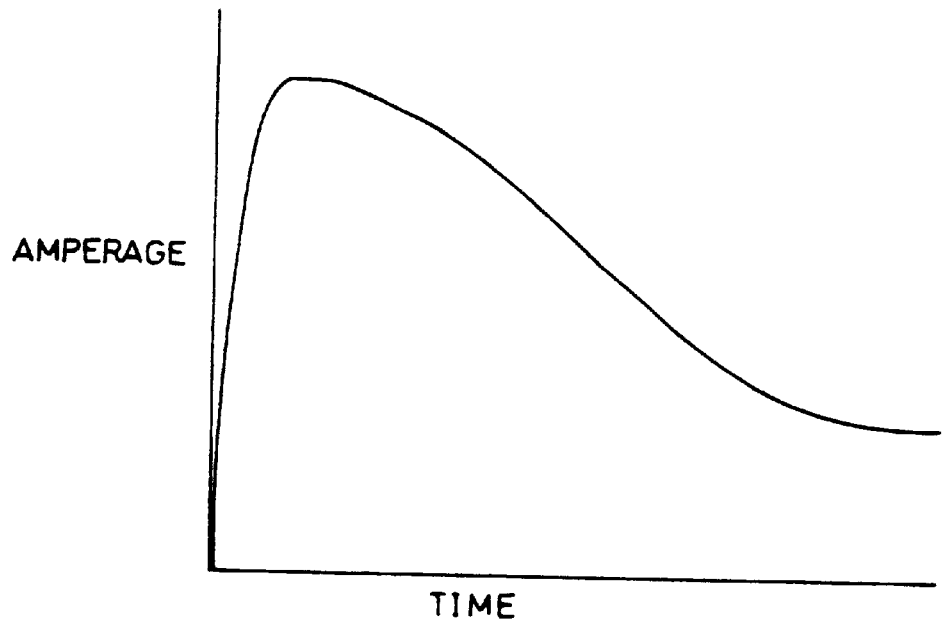
FIG. 28 is a graph showing the relationship between amperage and heating time of molded baked snacks.
Figure 29:
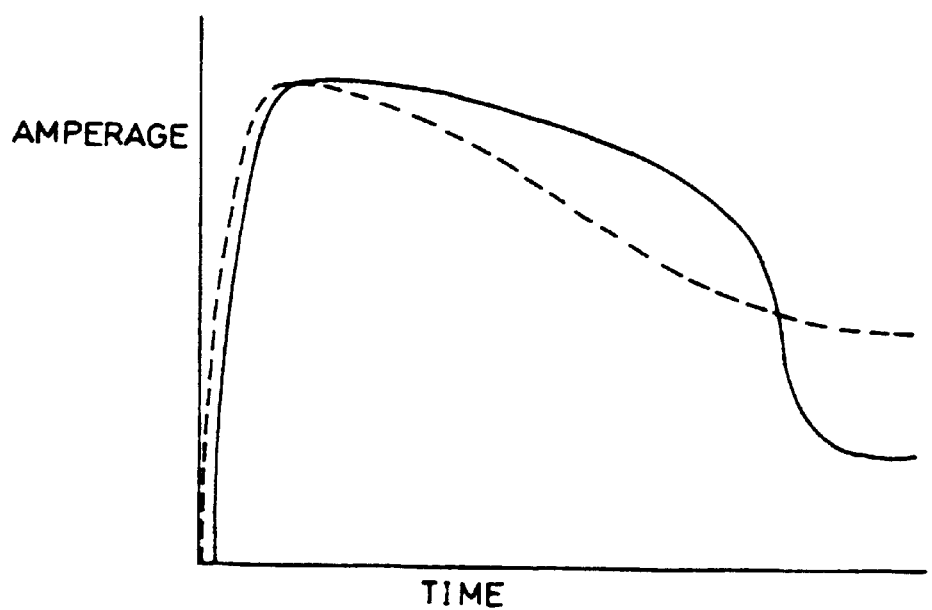
FIG. 29 is a graph showing the relationship between amperage and heating time of molded baked snacks.

In such cases, as shown in FIG. 28, measures are taken to reduce output. Alternatively, as shown by the solid line in FIG. 29, measures may be taken to prolong the time the maximum amperage is maintained. By means of these measures, excessive anode amperage in the latter half of heating can be controlled.

Figure 30:
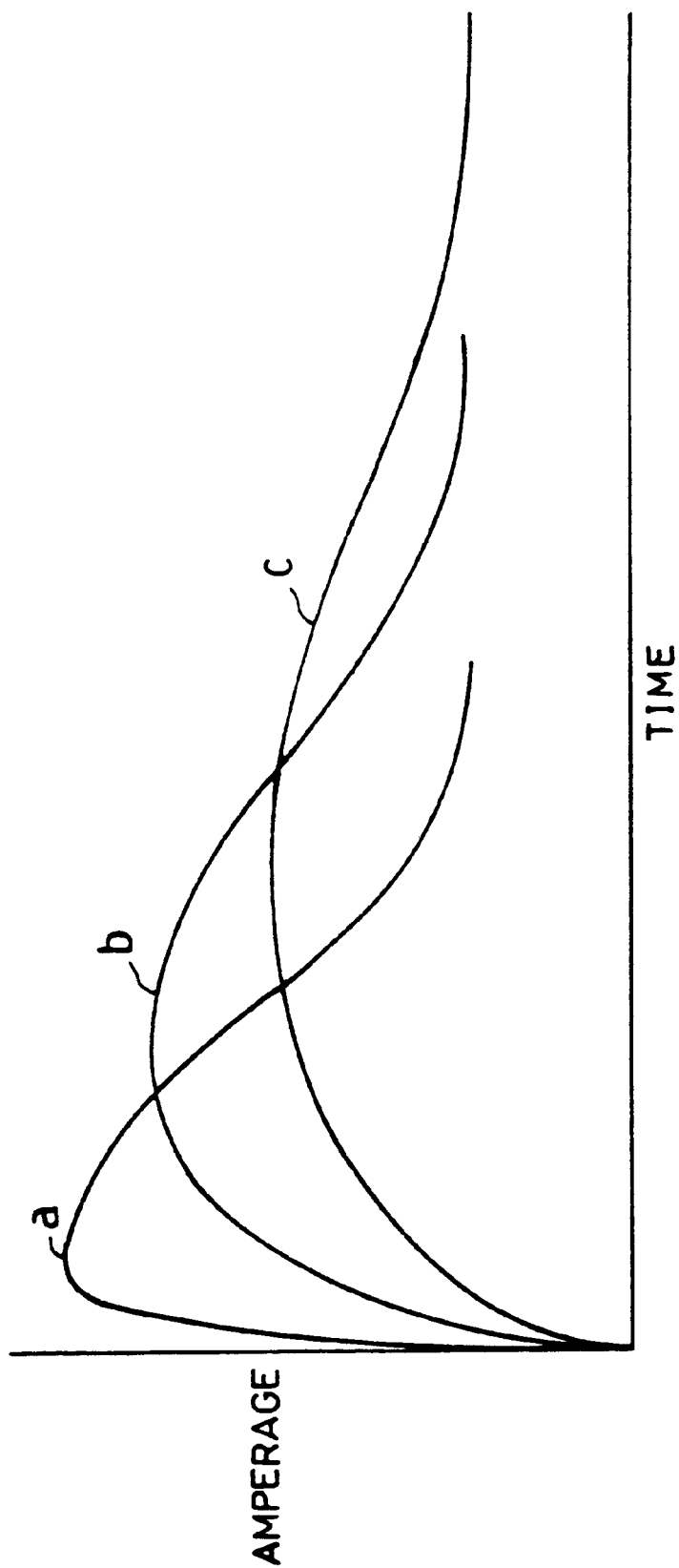
FIG. 30 is a graph showing the relationship between amperage and heating time of molded baked snacks.
Figure 31:
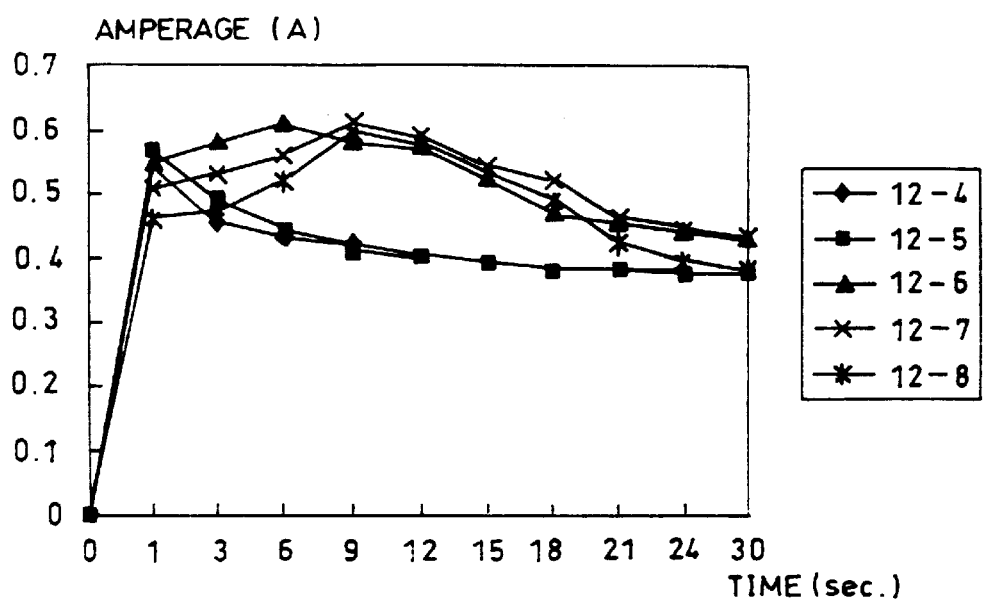
FIG. 31 is a graph showing the relationship between amperage and heating time of molded baked snacks.
Figure 32:
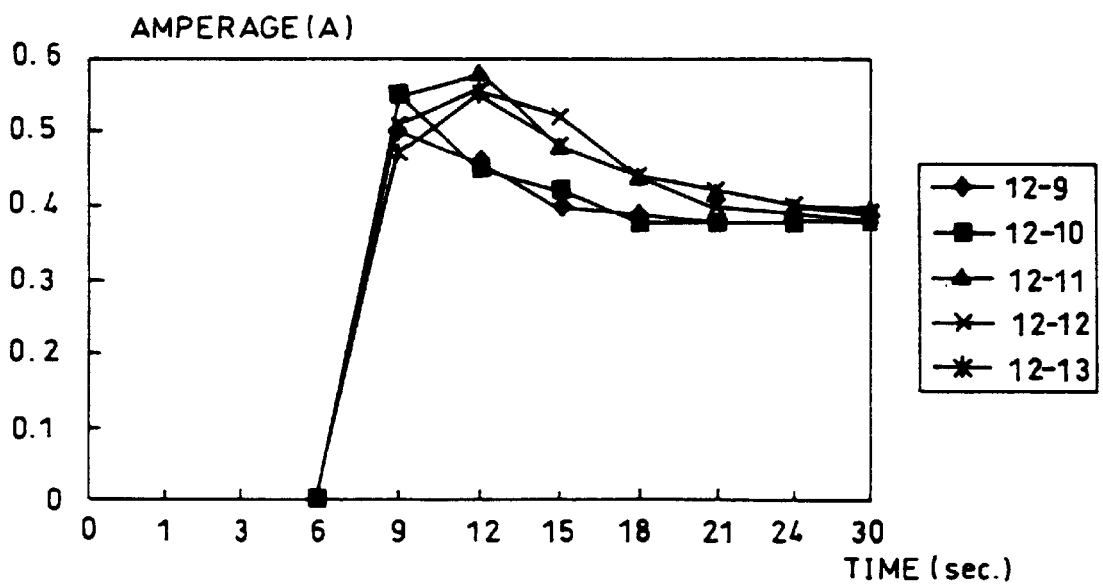
FIG. 32 is a graph showing the relationship between amperage and heating time of molded baked snacks.
Figure 33:
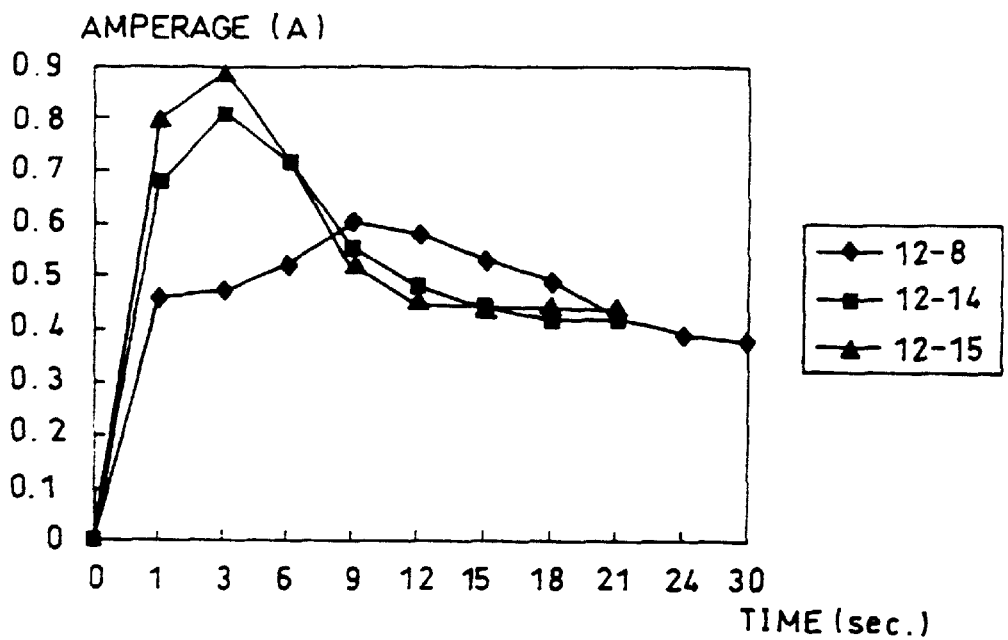
FIG. 33 is a graph showing the relationship between amperage and heating time of molded baked snacks.

For example, as shown in FIG. 30, output can be changed by changing the L component and the C component. Curve a is a case in which the L component is short, and the C component is narrow. Curve c is a case in which the L component is long, and the C component is wide. Curve b is a case in which the values of the L component and the C component are intermediate between their respective values in curves a and c. If the L component and the C component are changed, heating conditions can be changed by altering the shape of this graph, and the aforementioned control of amperage can be performed.

If suitable control of output is used in this way to control at least sparking and burning, the molded baked snacks will be superior, with soft consistency when eaten, uniform, fine texture, and good appearance. Accordingly, the key is to find optimum settings for mold structure, ingredient mixture, and internal heating conditions.

In order to find such optimum conditions, the following experiments were carried out.

| | |
|---|---|
| Ingredient mixture: | No. 3 |
| Snack shape: | (1) |

The heating method was heating performed according to the molding conditions shown in Tables 31 through 34. The results are shown in Tables 31 through 34.

In Tables 33 and 34, "C2 ON" indicates that the automatic capacitor C2 is functioning as an automatic capacitor, and "AUTOMATIC" indicates that it actually functioned automatically. These matters are also true for each of the following Examples.

TABLE 31

| HEATING DEVICE | | | HC2 OUTPUT | | | LIQUID | MOLDING TIME (sec.) | | | SPARKING | |
|---|---|---|---|---|---|---|---|---|---|---|---|
| EXTERNAL | INTERNAL | | CONVERSION | | | CONTENT | EXTERNAL | | | FIRST | SECOND |
| HA | HB2 | HC2 | L | C1 | C2 OFF | (%) | HA | HB2 | HC2 | HALF | HALF |
| ○ | x | x | / | / | / | UNDER 3 | 65 | / | / | / | / |
| ○ | ○ | x | / | / | / | UNDER 3 | / | 65 | / | / | / |
| ○ | ○ | x | / | / | / | UNDER 3 | / | 60 | / | / | / |
| ○ | ○ | x | / | / | / | UNDER 3 | / | 55 | / | / | / |
| ○ | x | ○ | 15 | 40 | 9 | UNDER 3 | / | / | 30 | / | / |
| ○ | x | ○ | 15 | 60 | 9 | UNDER 3 | / | / | 25 | / | / |

TABLE 31-continued

| HA | HB2 | HC2 | L | C1 | C2 | OFF | HA | HB2 | HC2 | FIRST HALF | SECOND HALF |
|---|---|---|---|---|---|---|---|---|---|---|---|
| o | x | o | 13 | 40 | 9 | UNDER 3 | / | / | 25 | / | / |
| o | x | o | 13 | 60 | 9 | UNDER 3 | / | / | 20 | / | / |
| o | x | o | 11 | 40 | 9 | UNDER 3 | / | / | 20 | / | / |
| o | x | o | 11 | 60 | 9 | UNDER 3 | / | / | 18 | / | / |
| o | x | o | 9 | 40 | 9 | UNDER 3 | / | / | 15 | / | / |
| o | x | o | 9 | 60 | 9 | UNDER 3 | / | / | — | YES | — |
| o | o | o | 15 | 40 | 9 | UNDER 3 | / | 5 | 28 | / | / |
| o | o | o | 15 | 60 | 9 | UNDER 3 | / | 5 | 23 | / | / |
| o | o | o | 13 | 40 | 9 | UNDER 3 | / | 5 | 23 | / | / |
| o | o | o | 13 | 60 | 9 | UNDER 3 | / | 5 | 18 | / | / |
| o | o | o | 11 | 40 | 9 | UNDER 3 | / | 5 | 18 | / | / |
| o | o | o | 11 | 60 | 9 | UNDER 3 | / | 5 | 16 | / | / |
| o | o | o | 9 | 40 | 9 | UNDER 3 | / | 5 | 13 | / | / |
| o | o | o | 9 | 60 | 9 | UNDER 3 | / | 5 | 18 | / | / |

| PROPERTIES | | | | | |
|---|---|---|---|---|---|
| CONSISTENCY WHEN EATEN | APPEARANCE | TEXTURE | EVALUATION | MOLDING | NOTE |
| HARD | POOR | COARSE | Δ | ⊙ | |
| HARD | POOR | COARSE | Δ | ⊙ | |
| HARD | FAIR | COARSE | o | ⊙ | |
| FAIRLY SOFT | FAIR | FAIRLY FINE | o | ⊙ | |
| SOFT | GOOD | FINE | ⊙ | o | |
| SOFT | GOOD | FINE | ⊙ | o | |
| SOFT | GOOD | FINE | ⊙ | o | |
| SOFT | GOOD | FINE | ⊙ | ⊙ | |
| SOFT | GOOD | FINE | ⊙ | ⊙ | |
| SOFT | FAIR | SLIGHTLY BURNED | Δ | o | |
| SOFT | FAIR | FINE | o | o | |
| — | BURNED | VERY BURNED | x | x | MATCHING UNSTABLE |
| SOFT | GOOD | FINE | ⊙ | o | |
| SOFT | GOOD | FINE | ⊙ | o | |
| SOFT | GOOD | FINE | ⊙ | o | |
| SOFT | GOOD | FINE | ⊙ | ⊙ | |
| SOFT | GOOD | FINE | ⊙ | ⊙ | |
| SOFT | GOOD | FINE | ⊙ | o | |
| SOFT | GOOD | FINE | ⊙ | o | |
| SOFT | FAIR | SLIGHTLY BURNED | Δ | o | MATCHING UNSTABLE |

TABLE 32

| HEATING DEVICE | | | HC2 OUTPUT | | | | LIQUID CONTENT | MOLDING TIME (sec.) | | | SPARKING | |
|---|---|---|---|---|---|---|---|---|---|---|---|---|
| EXTERNAL | INTERNAL | | CONVERSION | | | | | EXTERNAL | | | FIRST | SECOND |
| HA | HB2 | HC2 | L | C1 | C2 | OFF | (%) | HA | HB2 | HC2 | HALF | HALF |
| o | x | o | 15 | 40 | 7 | UNDER 3 | | / | / | 45 | / | / |
| o | x | o | 15 | 60 | 7 | UNDER 3 | | / | / | 40 | / | / |
| o | x | o | 13 | 40 | 7 | UNDER 3 | | / | / | 40 | / | / |
| o | x | o | 13 | 60 | 7 | UNDER 3 | | / | / | 30 | / | / |
| o | x | o | 11 | 40 | 7 | UNDER 3 | | / | / | 30 | / | / |
| o | x | o | 11 | 60 | 7 | UNDER 3 | | / | / | 25 | / | / |
| o | x | o | 9 | 40 | 7 | UNDER 3 | | / | / | 25 | / | / |
| o | x | o | 9 | 60 | 7 | UNDER 3 | | / | / | 30 | / | / |
| o | o | o | 15 | 40 | 7 | UNDER 3 | | / | 5 | 43 | / | / |
| o | o | o | 15 | 60 | 7 | UNDER 3 | | / | 5 | 38 | / | / |
| o | o | o | 13 | 40 | 7 | UNDER 3 | | / | 5 | 38 | / | / |
| o | o | o | 13 | 60 | 7 | UNDER 3 | | / | 5 | 28 | / | / |
| o | o | o | 11 | 40 | 7 | UNDER 3 | | / | 5 | 28 | / | / |
| o | o | o | 11 | 60 | 7 | UNDER 3 | | / | 5 | 23 | / | / |
| o | o | o | 9 | 40 | 7 | UNDER 3 | | / | 5 | 23 | / | / |
| o | o | o | 9 | 60 | 7 | UNDER 3 | | / | 5 | 28 | / | / |

TABLE 32-continued

| PROPERTIES | | | | | |
|---|---|---|---|---|---|
| CONSISTENCY WHEN EATEN | APPEARANCE | TEXTURE | EVALUATION | MOLDING | NOTE |
| SOFT | FAIR | FINE | ⊚ | ⊚ | |
| SOFT | FAIR | FINE | ⊚ | ⊚ | |
| SOFT | FAIR | FINE | ⊚ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | FAIR | SLIGHTLY BURNED | Δ | ○ | |
| SOFT | FAIR | FINE | ○ | ○ | |
| SOFT | FAIR | FINE | ○ | ○ | |
| SOFT | FAIR | FINE | ○ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |
| SOFT | GOOD | FINE | ⊚ | ⊚ | |

TABLE 33

| HEATING DEVICE | | | HC2 OUTPUT | | | AMPERAGE (A) | LIQUID CONTENT (%) | MOLDING TIME (sec.) | | |
|---|---|---|---|---|---|---|---|---|---|---|
| EXTERNAL | INTERNAL | | CONVERSION | | | | | EXTERNAL | | |
| HA | HB2 | HC2 | L | C1 | C2 ON | | | HA | HB2 | HC2 |
| ○ | x | ○ | 15 | 60 | AUTOMATIC | 1 | UNDER 3 | / | / | 20 |
| ○ | x | ○ | 15 | 80 | AUTOMATIC | 1 | UNDER 3 | / | / | 15 |
| ○ | x | ○ | 13 | 60 | AUTOMATIC | 1 | UNDER 3 | / | / | 15 |
| ○ | x | ○ | 13 | 80 | AUTOMATIC | 1 | UNDER 3 | / | / | — |
| ○ | x | ○ | 11 | 60 | AUTOMATIC | 1 | UNDER 3 | / | / | — |
| ○ | x | ○ | 11 | 80 | AUTOMATIC | 1 | UNDER 3 | / | / | — |
| ○ | x | ○ | 9 | 60 | AUTOMATIC | 1 | UNDER 3 | / | / | — |
| ○ | x | ○ | 9 | 80 | AUTOMATIC | 1 | UNDER 3 | / | / | — |
| ○ | ○ | ○ | 15 | 60 | AUTOMATIC | 1 | UNDER 3 | / | 5 | 18 |
| ○ | ○ | ○ | 15 | 80 | AUTOMATIC | 1 | UNDER 3 | / | 5 | 14 |
| ○ | ○ | ○ | 13 | 60 | AUTOMATIC | 1 | UNDER 3 | / | 5 | 14 |
| ○ | ○ | ○ | 13 | 80 | AUTOMATIC | 1 | UNDER 3 | / | 5 | 10 |
| ○ | ○ | ○ | 11 | 60 | AUTOMATIC | 1 | UNDER 3 | / | 5 | 12 |
| ○ | ○ | ○ | 11 | 80 | AUTOMATIC | 1 | UNDER 3 | / | 5 | — |
| ○ | ○ | ○ | 9 | 60 | AUTOMATIC | 1 | UNDER 3 | / | 5 | — |
| ○ | ○ | ○ | 9 | 80 | AUTOMATIC | 1 | UNDER 3 | / | 5 | — |

| SPARKING | | PROPERTIES | | | | | |
|---|---|---|---|---|---|---|---|
| FIRST HALF | SECOND HALF | CONSISTENCY WHEN EATEN | APPEARANCE | TEXTURE | EVALUATION | MOLDING | NOTE |
| / | / | SOFT | GOOD | FINE | ⊚ | ○ | |
| / | / | SOFT | FAIR | SLIGHTLY BURNED | Δ | ○ | |
| / | / | SOFT | GOOD | FINE | ⊚ | ⊚ | |
| / | YES | SOFT | BURNED | SLIGHTLY BURNED | Δ | x | * |
| / | YES | SOFT | BURNED | SLIGHTLY BURNED | x | x | * |
| YES | — | — | BURNED | VERY BURNED | x | x | * |
| YES | — | — | BURNED | VERY BURNED | x | x | * |
| YES | — | — | BURNED | VERY BURNED | x | x | * |
| / | / | SOFT | GOOD | FINE | ⊚ | ○ | |
| / | / | SOFT | GOOD | FINE | ⊚ | ○ | |
| / | / | SOFT | GOOD | FINE | ⊚ | ⊚ | |
| / | / | SOFT | GOOD | FINE | ⊚ | ⊚ | |
| / | / | SOFT | GOOD | FINE | ⊚ | ○ | |
| / | YES | SOFT | BURNED | SLIGHTLY BURNED | x | x | * |
| YES | — | — | BURNED | VERY BURNED | x | x | * |
| YES | — | — | BURNED | VERY BURNED | x | x | * |

*MATCHING UNSTABLE

TABLE 34

| HEATING DEVICE | | | HC2 OUTPUT | | | AMPERAGE | LIQUID CONTENT | MOLDING TIME (sec.) | | |
|---|---|---|---|---|---|---|---|---|---|---|
| EXTERNAL | INTERNAL | | CONVERSION | | | | | EXTERNAL | | |
| HA | HB2 | HC2 | L | C1 | C2 ON | (A) | (%) | HA | HB2 | HC2 |
| o | x | o | 15 | 60 | AUTOMATIC | 0.6 | UNDER 3 | / | / | 35 |
| o | x | o | 15 | 80 | AUTOMATIC | 0.6 | UNDER 3 | / | / | 30 |
| o | x | o | 13 | 60 | AUTOMATIC | 0.6 | UNDER 3 | / | / | 30 |
| o | x | o | 13 | 80 | AUTOMATIC | 0.6 | UNDER 3 | / | / | 25 |
| o | x | o | 11 | 60 | AUTOMATIC | 0.6 | UNDER 3 | / | / | 25 |
| o | x | o | 11 | 80 | AUTOMATIC | 0.6 | UNDER 3 | / | / | 30 |
| o | x | o | 9 | 60 | AUTOMATIC | 0.6 | UNDER 3 | / | / | — |
| o | x | o | 9 | 80 | AUTOMATIC | 0.6 | UNDER 3 | / | / | — |
| o | o | o | 15 | 60 | AUTOMATIC | 0.6 | UNDER 3 | / | 5 | 32 |
| o | o | o | 15 | 80 | AUTOMATIC | 0.6 | UNDER 3 | / | 5 | 27 |
| o | o | o | 13 | 60 | AUTOMATIC | 0.6 | UNDER 3 | / | 5 | 27 |
| o | o | o | 13 | 80 | AUTOMATIC | 0.6 | UNDER 3 | / | 5 | 22 |
| o | o | o | 11 | 60 | AUTOMATIC | 0.6 | UNDER 3 | / | 5 | 22 |
| o | o | o | 11 | 80 | AUTOMATIC | 0.6 | UNDER 3 | / | 5 | 27 |
| o | o | o | 9 | 60 | AUTOMATIC | 0.6 | UNDER 3 | / | 5 | — |
| o | o | o | 9 | 80 | AUTOMATIC | 0.6 | UNDER 3 | / | 5 | — |

| SPARKING | | PROPERTIES | | | EVALU- | MOLD- | NOTE |
|---|---|---|---|---|---|---|---|
| FIRST HALF | SECOND HALF | CONSISTENCY WHEN EATEN | APPEARANCE | TEXTURE | ATION | ING | |
| / | / | SOFT | GOOD | FINE | ◎ | o | |
| / | / | SOFT | GOOD | FINE | ◎ | o | |
| / | / | SOFT | GOOD | FINE | ◎ | ◎ | |
| / | / | SOFT | GOOD | FINE | ◎ | ◎ | |
| / | / | SOFT | GOOD | FINE | ◎ | ◎ | |
| / | / | SOFT | GOOD | FINE | ◎ | △ | * |
| / | YES | SOFT | FAIR | SLIGHTLY BURNED | △ | x | * |
| YES | — | — | BURNED | VERY BURNED | x | x | * |
| / | / | SOFT | GOOD | FINE | ◎ | o | |
| / | / | SOFT | GOOD | FINE | ◎ | ◎ | |
| / | / | SOFT | GOOD | FINE | ◎ | ◎ | |
| / | / | SOFT | GOOD | FINE | ◎ | ◎ | |
| / | / | SOFT | GOOD | FINE | ◎ | ◎ | |
| / | / | SOFT | GOOD | FINE | ◎ | o | |
| / | YES | SOFT | FAIR | SLIGHTLY BURNED | △ | △ | * |
| YES | — | — | BURNED | VERY BURNED | x | x | * |

*MATCHING UNSTABLE

With internal heating, expansion and drying of the ingredients are rapid, and the properties of the molded baked snack are much better than with external heating.

With heating at 200 Hz, effects in the initial stage of expansion are great, and the greater the output, the shorter the molding time and the better the properties of the molded baked snack.

With heating at 13.56 MHz, change of the L and C components greatly alters molding time. Making conditions too strict is likely to cause sparking, and to lead to a state in which the molded baked snack is burned on the inside, but is not yet dry.

The range within which both L and C components are optimum varies according to ingredient mixture and shape. For this reason, internal heating conditions must be set in accordance with each ingredient mixture and snack shape. If conditions are set too strictly, the ingredients in the metal mold are sometimes difficult to heat, and loss is great. Accordingly, setting of conditions is important. If, using strict conditions, the ingredients are expanded too rapidly, holes may form in the molded baked snack, pressure inside the mold may rise excessively, and sparking and defective molding may result. For this reason, adjustment of the ingredient mixture and the structure of the metal mold (vapor release sections) are necessary. By making such adjustments, sparking can be controlled.

When heating using both 200 Hz and 13.56 MHz, if a low frequency range is used initially, expansion is more stable, burning and sparking are less likely, and the properties of the molded baked snack are also more stable. Consequently, the useable high frequency range is extended.

In Table 32, since output is controlled with the interval between the plates of the capacitor set wider than in Table 31, the range of control of the L component is extended, and more stable molded baked snacks can be obtained.

In Tables 33 and 34, the anode amperage is held constant by automatic control of one of the capacitors, i.e., of the automatic capacitor C2. Consequently, molding time was able to be shortened.

Further, burning and sparking are likely to occur in the latter stage of drying when the L component is lengthened, and are likely to occur at the moment of commencement of heating when the L component is shortened.

Under the heating conditions shown in Table 33, the amperage is 1A. As can be seen from the Table, the range of control of the L component and the C component is narrow, and since the constant amperage is high, sparking is likely to occur. Under the conditions shown in Table 34, on the other hand, the amperage is 0.6A. As can be seen from the Table, the range of control of the L component and the C component is wider than in Table 33, and burning and sparking are less likely.

EXAMPLE 11

Specifications of the present Example were as follows.

| Ingredient mixture: | No. 3 |
|---|---|
| Snack shape: | (1) |

The heating method was as shown in Tables 35 through 37. In the Tables, "AMPERAGE: SETTING 1" and "SETTING 2" indicate that the amperage was set at setting 1 during the initial stage of heating, and was then switched to setting 2 later during heating.

TABLE 35

| HEATING DEVICE | | | | | | | | |
|---|---|---|---|---|---|---|---|---|
| EXTERNAL | INTERNAL | | HC2 OUTPUT CONVERSION | | | AMPERAGE (A) | | MOLD TEMP. |
| HA | HB2 | HC2 | L | C1 | C2 ON | SETTING 1 | SETTING 2 | (° C.) |
| ○ | x | x | / | / | / | / | / | 170 |
| ○ | ○ | x | / | / | / | / | / | 170 |
| ○ | ○ | x | / | / | / | / | 170 | |
| ○ | ○ | x | / | / | / | / | / | 170 |
| ○ | x | ○ | 15 | 60 | AUTOMATIC | 1 | 0.6 | 170 |
| ○ | x | ○ | 15 | 80 | AUTOMATIC | 1 | 0.6 | 170 |
| ○ | x | ○ | 13 | 60 | AUTOMATIC | 1 | 0.6 | 170 |
| ○ | x | ○ | 13 | 80 | AUTOMATIC | 1 | 0.6 | 170 |
| ○ | x | ○ | 11 | 60 | AUTOMATIC | 1 | 0.6 | 170 |
| ○ | x | ○ | 11 | 80 | AUTOMATIC | 1 | 0.6 | 170 |
| ○ | x | ○ | 9 | 60 | AUTOMATIC | 1 | 0.6 | 170 |
| ○ | x | ○ | 9 | 80 | AUTOMATIC | 1 | 0.6 | 170 |
| ○ | ○ | ○ | 15 | 60 | AUTOMATIC | 1 | 0.6 | 170 |
| ○ | ○ | ○ | 15 | 80 | AUTOMATIC | 1 | 0.6 | 170 |
| ○ | ○ | ○ | 13 | 60 | AUTOMATIC | 1 | 0.6 | 170 |
| ○ | ○ | ○ | 13 | 80 | AUTOMATIC | 1 | 0.6 | 170 |
| ○ | ○ | ○ | 11 | 60 | AUTOMATIC | 1 | 0.6 | 170 |
| ○ | ○ | ○ | 11 | 80 | AUTOMATIC | 1 | 0.6 | 170 |
| ○ | ○ | ○ | 9 | 60 | AUTOMATIC | 1 | 0.6 | 170 |
| ○ | ○ | ○ | 9 | 80 | AUTOMATIC | 1 | 0.6 | 170 |

| LIQUID | | MOLDING TIME (sec.) | | | | | |
|---|---|---|---|---|---|---|---|
| CONTENT | EXTERNAL | | HC2 | | PROP- | | |
| (%) | HA | HB2 | SETTING 1 | SETTING 2 | ERTIES | MOLDING | NOTE |
| UNDER 3 | 65 | / | / | / | Δ | ⊙ | |
| UNDER 3 | / | 65 | / | / | Δ | ⊙ | |
| UNDER 3 | / | 60 | / | / | ○ | ⊙ | |
| UNDER 3 | / | 55 | / | / | ○ | ⊙ | |
| UNDER 3 | / | / | 17 | 10 | ⊙ | ○ | |
| UNDER 3 | / | / | 13 | 8 | ⊙ | ○ | |
| UNDER 3 | / | / | 13 | 8 | ⊙ | ⊙ | |
| UNDER 3 | / | / | 10 | 5 | ⊙ | ⊙ | |
| UNDER 3 | / | / | 10 | 5 | ⊙ | ⊙ | |
| UNDER 3 | / | / | 7 | 5 | ⊙ | ○ | |
| UNDER 3 | / | / | 7 | 5 | Δ | x | * |
| UNDER 3 | / | / | 7 | 10 | x | x | * |
| UNDER 3 | / | 5 | 17 | 10 | ⊙ | ○ | |
| UNDER 3 | / | 5 | 13 | 8 | ⊙ | ⊙ | |
| UNDER 3 | / | 5 | 13 | 8 | ⊙ | ⊙ | |
| UNDER 3 | / | 5 | 10 | 5 | ⊙ | ⊙ | |
| UNDER 3 | / | 5 | 10 | 5 | ⊙ | ⊙ | |
| UNDER 3 | / | 5 | 7 | 5 | ⊙ | ○ | |
| UNDER 3 | / | 5 | 7 | 5 | Δ | Δ | * |
| UNDER 3 | / | 5 | 7 | 10 | x | x | * |

*MATCHING UNSTABLE

TABLE 36

| HEATING DEVICE | | | HC2 OUTPUT CONVERSION | | | AMPERAGE (A) | | MOLD TEMP. |
| --- | --- | --- | --- | --- | --- | --- | --- | --- |
| EXTERNAL | INTERNAL | | | | | | | |
| HA | HB2 | HC2 | L | C1 | C2 ON | SETTING 1 | SETTING 2 | (° C.) |
| ○ | x | ○ | 15 | 60 | AUTOMATIC | 0.7 | 0.4 | 170 |
| ○ | x | ○ | 15 | 80 | AUTOMATIC | 0.7 | 0.4 | 170 |
| ○ | x | ○ | 13 | 60 | AUTOMATIC | 0.7 | 0.4 | 170 |
| ○ | x | ○ | 13 | 80 | AUTOMATIC | 0.7 | 0.4 | 170 |
| ○ | x | ○ | 11 | 60 | AUTOMATIC | 0.7 | 0.4 | 170 |
| ○ | x | ○ | 11 | 80 | AUTOMATIC | 0.7 | 0.4 | 170 |
| ○ | x | ○ | 9 | 60 | AUTOMATIC | 0.7 | 0.4 | 170 |
| ○ | x | ○ | 9 | 80 | AUTOMATIC | 0.7 | 0.4 | 170 |
| ○ | ○ | ○ | 15 | 60 | AUTOMATIC | 0.7 | 0.4 | 170 |
| ○ | ○ | ○ | 15 | 80 | AUTOMATIC | 0.7 | 0.4 | 170 |
| ○ | ○ | ○ | 13 | 60 | AUTOMATIC | 0.7 | 0.4 | 170 |
| ○ | ○ | ○ | 13 | 80 | AUTOMATIC | 0.7 | 0.4 | 170 |
| ○ | ○ | ○ | 11 | 60 | AUTOMATIC | 0.7 | 0.4 | 170 |
| ○ | ○ | ○ | 11 | 80 | AUTOMATIC | 0.7 | 0.4 | 170 |
| ○ | ○ | ○ | 5 | 60 | AUTOMATIC | 0.7 | 0.4 | 170 |
| ○ | ○ | ○ | 9 | 80 | AUTOMATIC | 0.7 | 0.4 | 170 |

| LIQUID CONTENT (%) | EXTERNAL HA | HB2 | MOLDING TIME (sec.) HC2 SETTING 1 | SETTING 2 | PROPERTIES | MOLDING | NOTE |
| --- | --- | --- | --- | --- | --- | --- | --- |
| UNDER 3 | / | / | 30 | 15 | ⊙ | ○ | |
| UNDER 3 | / | / | 25 | 12 | ⊙ | ⊙ | |
| UNDER 7 | / | / | 25 | 12 | ⊙ | ⊙ | |
| UNDER 3 | / | / | 20 | 10 | ⊙ | ⊙ | |
| UNDER 3 | / | / | 20 | 10 | ⊙ | ⊙ | |
| UNDER 3 | / | / | 15 | 10 | ⊙ | ⊙ | |
| UNDER 3 | / | / | 15 | 10 | ⊙ | ⊙ | |
| UNDER 3 | / | / | 15 | 8 | ⊙ | ○ | |
| UNDER 3 | / | 5 | 30 | 15 | ⊙ | ○ | |
| UNDER 3 | / | 5 | 25 | 12 | ⊙ | ⊙ | |
| UNDER 3 | / | 5 | 25 | 12 | ⊙ | ⊙ | |
| UNDER 3 | / | 5 | 20 | 10 | ⊙ | ⊙ | |
| UNDER 3 | / | 5 | 20 | 10 | ⊙ | ⊙ | |
| UNDER 3 | / | 5 | 15 | 10 | ⊙ | ⊙ | |
| UNDER 3 | / | 5 | 15 | 10 | ⊙ | ⊙ | |
| UNDER 3 | / | 5 | 15 | 8 | ⊙ | ○ | |

TABLE 37

| HEATING DEVICE | | | HC2 OUTPUT CONVERSION | | | AMPERAGE (A) | | MOLD TEMP. |
| --- | --- | --- | --- | --- | --- | --- | --- | --- |
| EXTERNAL | INTERNAL | | | | | | | |
| HA | HB2 | HC2 | L | C1 | C2 ON | SETTING 1 | SETTING 2 | (° C.) |
| ○ | x | ○ | 15 | 60 | AUTOMATIC | 1 | 0.4 | 170 |
| ○ | x | ○ | 15 | 80 | AUTOMATIC | 1 | 0.4 | 170 |
| ○ | x | ○ | 13 | 60 | AUTOMATIC | 1 | 0.4 | 170 |
| ○ | x | ○ | 13 | 80 | AUTOMATIC | 1 | 0.4 | 170 |
| ○ | x | ○ | 11 | 60 | AUTOMATIC | 1 | 0.4 | 170 |
| ○ | x | ○ | 11 | 80 | AUTOMATIC | 1 | 0.4 | 170 |
| ○ | x | ○ | 9 | 60 | AUTOMATIC | 1 | 0.4 | 170 |
| ○ | x | ○ | 9 | 80 | AUTOMATIC | 1 | 0.4 | 170 |
| ○ | ○ | ○ | 15 | 60 | AUTOMATIC | 1 | 0.4 | 170 |
| ○ | ○ | ○ | 15 | 80 | AUTOMATIC | 1 | 0.4 | 170 |
| ○ | ○ | ○ | 13 | 80 | AUTOMATIC | 1 | 0.4 | 170 |
| ○ | ○ | ○ | 13 | 80 | AUTOMATIC | 1 | 0.4 | 170 |
| ○ | ○ | ○ | 11 | 60 | AUTOMATIC | 1 | 0.4 | 170 |
| ○ | ○ | ○ | 11 | 80 | AUTOMATIC | 1 | 0.4 | 170 |
| ○ | ○ | ○ | 9 | 60 | AUTOMATIC | 1 | 0.4 | 170 |
| ○ | ○ | ○ | 9 | 80 | AUTOMATIC | 1 | 0.4 | 170 |

TABLE 37-continued

| LIQUID CONTENT (%) | MOLDING TIME (sec.) | | | PROP- ERTIES | MOLDING | NOTE |
|---|---|---|---|---|---|---|
| | EXTERNAL HA | HB2 | HC2 SETTING 1 | SETTING 2 | | |
| UNDER 3 | / | / | 17 | 15 | ⊚ | ⊚ |
| UNDER 3 | / | / | 13 | 12 | ⊚ | ⊚ |
| UNDER 3 | / | / | 13 | 12 | ⊚ | ⊚ |
| UNDER 3 | / | / | 10 | 10 | ⊚ | ⊚ |
| UNDER 3 | / | / | 10 | 10 | ⊚ | ⊚ |
| UNDER 3 | / | / | 7 | 10 | ⊚ | ⊚ |
| UNDER 3 | / | / | 7 | 10 | ⊚ | ⊚ |
| UNDER 3 | / | / | 7 | 8 | ○ | ○ |
| UNDER 3 | / | 5 | 17 | 15 | ⊚ | ⊚ |
| UNDER 3 | / | 5 | 13 | 12 | ⊚ | ⊚ |
| UNDER 3 | / | 5 | 13 | 12 | ⊚ | ⊚ |
| UNDER 3 | / | 5 | 10 | 10 | ⊚ | ⊚ |
| UNDER 3 | / | 5 | 10 | 10 | ⊚ | ⊚ |
| UNDER 3 | / | 5 | 7 | 10 | ⊚ | ⊚ |
| UNDER 3 | / | 5 | 7 | 10 | ⊚ | ⊚ |
| UNDER 3 | / | 5 | 7 | 8 | ⊚ | ⊚ |

As was clear from Example 10, when a constant output is applied, shortening molding time leads to instability such as sparking, etc., but stabilizing molding makes molding time comparatively longer. Accordingly, in the present Example, molding conditions were switched from a high output in the initial stage of heating, when the liquid content remaining in the ingredients is high, to a low output in the latter stage of heating (drying period), when the remaining liquid content is low. As a result, molded baked snacks with good properties could be manufactured stably and more efficiently. In other words, in Tables 35, 36, and 37, stable molded baked snacks were able to be manufactured more efficiently than in Tables 33 and 34 of Example 10. In Table 36, in which the outputs of both settings 1 and 2 are lower than in Table 35, molding time is lengthened, but the range of control is wider, and good molded baked snacks were obtained. Further, in Table 37, only the output of setting 2 was lower than that of Table 35, but molding time was shorter than in Table 36, and molding could be performed with a wider range of control than in Table 35. In this way, it was proven that providing a large difference in output between the initial stage and latter stage of molding made it possible to perform stable molding in a short time.

EXAMPLE 12

Specifications of the present Example were as follows.

| Ingredient mixture: | No. 3 |
|---|---|
| Snack shape: | (1) |

The heating method was as shown in Table 38. Control of the output of the oscillator was performed by adjusting the L component and the C component. Drying was ended when the anode amperage reached a constant level. The results are shown in Tables 38 and 39 and in FIGS. 31 through 33. Table 39 shows the anode amperage (A) when heating at 13.56 MHz (Experiments No. 12-4 through No. 12-15).

TABLE 38

| EXPERIMENT NO. | HEATING DEVICE | | | NUMBER OF MOLDS | 200 Hz OUTPUT (W) | HC2 | |
|---|---|---|---|---|---|---|---|
| | EXTERNAL HA | INTERNAL HB2 | HC2 | | | OSCILLATOR OUTPUT (KW) | ANODE CURRENT (A) |
| 12-1 | ○ | x | x | 1 | / | / | / |
| 12-2 | ○ | x | x | 5 | / | / | / |
| 12-3 | ○ | x | x | 20 | / | / | / |
| 12-4 | ○ | x | ○ | 1 | / | 7 | 0.6 ± 0.05 |
| 12-5 | ○ | x | ○ | 2 | / | 7 | 0.6 ± 0.05 |
| 12-6 | ○ | x | ○ | 5 | / | 7 | 0.6 ± 0.05 |
| 12-7 | ○ | x | ○ | 10 | / | 7 | 0.6 ± 0.05 |
| 12-8 | ○ | x | ○ | 20 | / | 15 | 0.6 ± 0.05 |
| 12-9 | ○ | ○ | ○ | 1 | 200 | 7 | 0.6 ± 0.05 |
| 12-10 | ○ | ○ | ○ | 2 | 200 | 7 | 0.6 ± 0.05 |
| 12-11 | ○ | ○ | ○ | 5 | 200 | 7 | 0.6 ± 0.05 |
| 12-12 | ○ | ○ | ○ | 10 | 200 | 7 | 0.6 ± 0.05 |
| 12-13 | ○ | ○ | ○ | 20 | 200 | 15 | 0.6 ± 0.05 |
| 12-14 | ○ | x | ○ | 20 | / | 15 | 0.8 ± 0.05 |
| 12-15 | ○ | x | ○ | 20 | / | 15 | 0.9 ± 0.05 |

MOLDING

TABLE 38-continued

| EXPERIMENT NO. | HC2 CONDITIONS | | | TIME (sec.) | PROPERTIES | MOLDING |
|---|---|---|---|---|---|---|
| | L | C1 | C2 | | | |
| 12-1 | / | / | / | 65 | ○ | ⊚ |
| 12-2 | / | / | / | 65 | ○ | ⊚ |
| 12-3 | / | / | / | 65 | ○ | ⊚ |
| 12-4 | 13 | 60 | 9 | 15 | ⊚ | ⊚ |
| 12-5 | 7 | 60 | 9 | 15 | ⊚ | ⊚ |
| 12-6 | 2 | 60 | 9 | 21 | ⊚ | ⊚ |
| 12-7 | 1 | 60 | 9 | 24 | ⊚ | ⊚ |
| 12-8 | 2 | 60 | 9 | 24 | ⊚ | ⊚ |
| 12-9 | 13 | 60 | 9 | 5-13 | ⊚ | ⊚ |
| 12-10 | 7 | 60 | 9 | 5-13 | ⊚ | ⊚ |
| 12-11 | 2 | 60 | 9 | 5-15 | ⊚ | ⊚ |
| 12-12 | 1 | 60 | 9 | 5-20 | ⊚ | ⊚ |
| 12-13 | 2 | 60 | 9 | 5-20 | ⊚ | ⊚ |
| 12-14 | 2 | 70 | 9 | 18 | ⊚ | ⊚ |
| 12-15 | 2 | 80 | 9 | 15 | ⊚ | ⊚ |

TABLE 39

| EXPERIMENT NO. | MOLDING TIME (sec.) | | | | | | | | | | |
|---|---|---|---|---|---|---|---|---|---|---|---|
| | 0 | 1 | 3 | 6 | 9 | 12 | 15 | 18 | 21 | 24 | 30 |
| 12-4 | 0 | 0.54 | 0.45 | 0.43 | 0.42 | 0.40 | 0.39 | 0.38 | 0.38 | 0.38 | 0.38 |
| 12-5 | 0 | 0.57 | 0.49 | 0.44 | 0.41 | 0.40 | 0.39 | 0.38 | 0.38 | 0.37 | 0.37 |
| 12-6 | 0 | 0.55 | 0.58 | 0.61 | 0.58 | 0.57 | 0.52 | 0.47 | 0.45 | 0.44 | 0.43 |
| 12-7 | 0 | 0.51 | 0.53 | 0.56 | 0.61 | 0.59 | 0.54 | 0.52 | 0.46 | 0.44 | 0.43 |
| 12-8 | 0 | 0.46 | 0.47 | 0.52 | 0.60 | 0.58 | 0.53 | 0.49 | 0.42 | 0.39 | 0.38 |
| 12-9 | | | | 0 | 0.50 | 0.46 | 0.40 | 0.39 | 0.38 | 0.38 | 0.38 |
| 12-10 | | | | 0 | 0.55 | 0.45 | 0.42 | 0.38 | 0.38 | 0.38 | 0.38 |
| 12-11 | | | | 0 | 0.55 | 0.58 | 0.48 | 0.44 | 0.42 | 0.40 | 0.40 |
| 12-12 | | | | 0 | 0.51 | 0.56 | 0.52 | 0.44 | 0.40 | 0.39 | 0.38 |
| 12-13 | | | | 0 | 0.47 | 0.55 | 0.48 | 0.44 | 0.42 | 0.40 | 0.39 |
| 12-14 | 0 | 0.68 | 0.81 | 0.72 | 0.55 | 0.48 | 0.44 | 0.42 | 0.42 | | |
| 12-15 | 0 | 0.80 | 0.89 | 0.72 | 0.52 | 0.45 | 0.44 | 0.44 | 0.44 | | |

Even when the number of molds was increased, there was no change in the properties and molding of the molded baked snacks, which were excellent. By setting output higher and slightly increasing the anode amperage the greater the number of molds added, molding could be performed with little change in molding time.

Localized heating was more likely the greater the number of molds, but by switching from the heating device shown in FIG. 1 to that shown in FIG. 2, sparking was less likely, and stable molding was obtained.

EXAMPLE 13

Specifications of the present Example were as follows.

| | |
|---|---|
| Ingredient mixtures: | No. 11, No. 24, No. 25. |
| Snack shapes: | (1) through (7). |

The heating method was heating using heating device HC2 under the conditions below. The results are shown in Tables 40 and 41, and in FIGS. 34 and 35.

Figure 34:
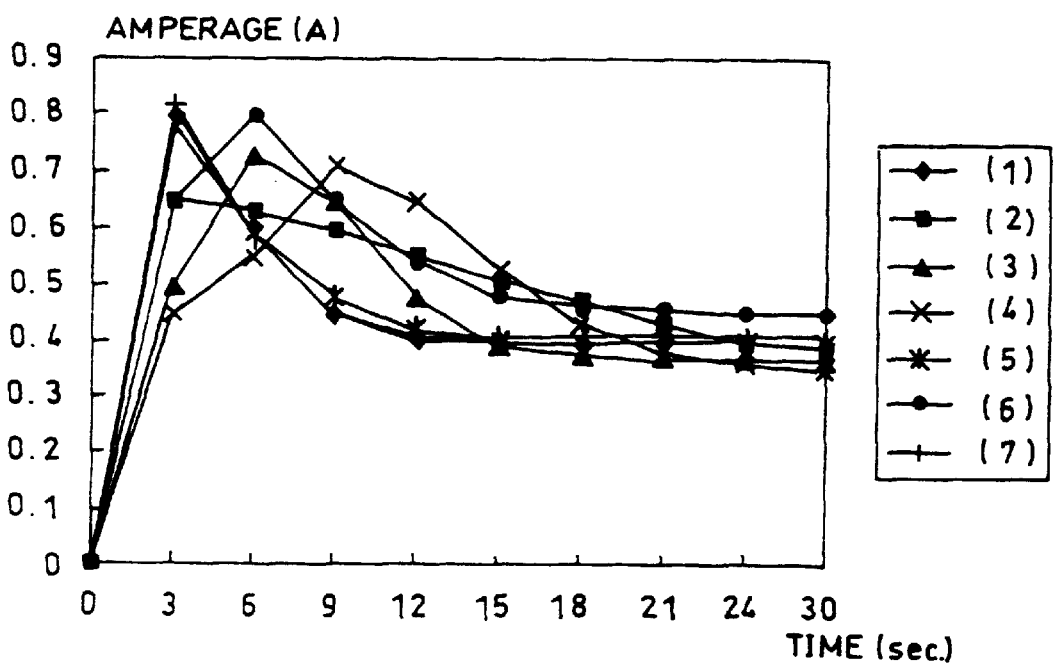
FIG. 34 is a graph showing the relationship between amperage and heating time of molded baked snacks.

Table 40 shows the transition in anode amperage (A) for molding of various snack shapes with a mold temperature of 170° C., C1=60, C2=9, and L=13. FIG. 34 is a graph of the same information.

Figure 35:
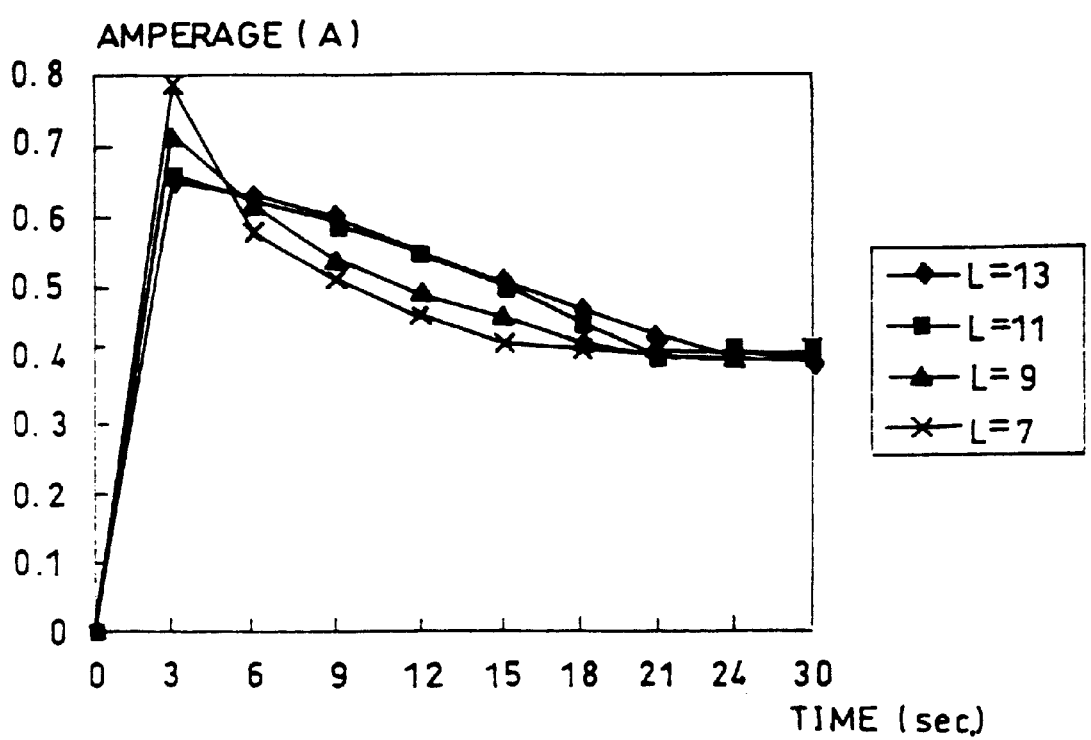
FIG. 35 is a graph showing the relationship between amperage and heating time of molded baked snacks.

Table 41 shows the transition in anode amperage (A) for molding of snack shape (2) with a mold temperature of 170° C., C1=60, C2=9, and various values of L in addition to 13. FIG. 35 is a graph of the same information.

TABLE 40

ANODE AMPERAGE (A)

| SNACK SHAPE | MOLDING TIME (sec.) | | | | | | | | |
|---|---|---|---|---|---|---|---|---|---|
| | 0 | 3 | 6 | 9 | 12 | 15 | 18 | 21 | 24 | 30 |
| (1) | 0 | 0.80 | 0.60 | 0.45 | 0.40 | 0.40 | 0.40 | 0.40 | 0.40 | 0.40 |
| (2) | 0 | 0.65 | 0.63 | 0.60 | 0.55 | 0.51 | 0.47 | 0.43 | 0.40 | 0.39 |
| (3) | 0 | 0.50 | 0.73 | 0.65 | 0.48 | 0.39 | 0.38 | 0.37 | 0.37 | 0.37 |
| (4) | 0 | 0.45 | 0.55 | 0.71 | 0.65 | 0.53 | 0.43 | 0.38 | 0.36 | 0.35 |
| (5) | 0 | 0.78 | 0.60 | 0.48 | 0.42 | 0.40 | 0.40 | 0.40 | 0.40 | 0.40 |
| (6) | 0 | 0.65 | 0.80 | 0.65 | 0.54 | 0.48 | 0.46 | 0.46 | 0.45 | 0.45 |
| (7) | 0 | 0.82 | 0.58 | 0.45 | 0.41 | 0.41 | 0.41 | 0.41 | 0.41 | 0.41 |

TABLE 41

ANODE AMPERAGE (A)

| L | MOLDING TIME (sec.) | | | | | | | | |
|---|---|---|---|---|---|---|---|---|---|
| | 0 | 3 | 6 | 9 | 12 | 15 | 18 | 21 | 24 | 30 |
| 13 | 0 | 0.65 | 0.63 | 0.60 | 0.55 | 0.51 | 0.47 | 0.43 | 0.40 | 0.39 |
| 11 | 0 | 0.66 | 0.62 | 0.59 | 0.55 | 0.50 | 0.45 | 0.41 | 0.41 | 0.40 |
| 9 | 0 | 0.72 | 0.62 | 0.54 | 0.49 | 0.46 | 0.42 | 0.40 | 0.40 | 0.40 |
| 7 | 0 | 0.79 | 0.58 | 0.51 | 0.46 | 0.42 | 0.41 | 0.41 | 0.41 | 0.41 |

As can be seen from Table 40 and the graph in FIG. 34, since snack shape (2) has a greater surface area than snack shape (1), the anode amperage is more difficult to increase using the same output, and a longer molding time is required. However, the pattern of the amperage for snack shape (1) in the graph in FIG. 34 is similar to the pattern of the amperage for snack shape (2) shown in Table 41 and FIG. 35. From this it can be seen that, with snack shape (2), if output is increased by shortening the L component, a good molded baked snack can be obtained with approximately the same molding time as with snack shape (1).

As can be seen from Table 40 and the graph in FIG. 34, the peak anode amperage for snack shapes (3) and (4) is approximately equal to that with snack shape (1), but since these shapes are thicker than snack shape (1), the rise in anode amperage is slower. Thus molding time for these shapes takes that much longer than for snack shape (1). However, the properties and molding of the molded baked snacks are good, and molded baked snacks can be obtained whose consistency when eaten, chewiness, and flavor are completely different from snack shape (1).

As discussed above, the first method of manufacturing molded baked snacks according to the present invention is a method of manufacturing molded baked snacks by placing ingredients in a mold made up of first and second conductive mold halves and an insulating section therebetween, and applying across both mold halves alternating current from an alternating current power source, thus heating and expanding the ingredients by means of resistance heating and/or dielectric heating, in which the insulating section of the mold is provided with a vapor release section, pressure is reduced outside the mold, and the heating is performed while releasing vapor produced thereby through the vapor release section.

During heating and molding of the molded baked snacks, a large amount of vapor is produced, and this vapor condenses in the vapor release section provided in the insulating section, causing insulation breakdown. However, with the foregoing method, by reducing pressure, condensation of the vapor is prevented. Consequently, insulation breakdown can be prevented.

The second method of manufacturing molded baked snacks is a method of manufacturing molded baked snacks by placing ingredients in a mold made up of first and second conductive mold halves and an insulating section therebetween, and applying across both mold halves alternating current from an alternating current power source, thus heating and expanding the ingredients by means of resistance heating and/or dielectric heating, in which the insulating section of the mold is provided with vapor release sections, the vapor release section is heated during heating of the ingredients, and the heating of the ingredients is performed while releasing vapor produced thereby through the vapor release section.

During heating and molding of the molded baked snacks, a large amount of vapor is produced, and this vapor condenses in the vapor release section provided in the insulating section, causing insulation breakdown. However, with the foregoing method, by heating the vapor release section, condensation of the vapor is prevented. Consequently, insulation breakdown can be prevented.

The third method of manufacturing molded baked snacks is either the first or second method above, in which external heating is also used to heat the ingredients.

By also using external heating, molding time can be further shortened, and a roasted flavor can be imparted.

With the foregoing method, heating can be performed even when it is difficult to heat using the other heating methods mentioned above because of complicated structures, such as ribs, which make it difficult to provide electrodes opposite one another, and to which, accordingly, it is difficult to apply a voltage. In such a case, it is sufficient to externally heat only those portions which are difficult to heat using the other heating methods mentioned above, and accordingly the structure of the external heating device can be made simpler than when molding by external heating alone. Further, the temperature control conditions for external heating may be more relaxed than when molding by external heating alone. Thus it is possible to obtain a desired final molded baked snack within a wide external heating temperature range such as "from 100° C. through 230° C." Consequently, the structure of the external heating device can be further simplified in comparison with molding by external heating alone.

The fourth method of manufacturing molded baked snacks is any one of the first through third methods above, in which the ingredients have a composition with a weight ratio of 100 flour, 10 to 150 starch, 0.5 to 10 salt, 2 to 60 sugar, and 70 to 260 water, and water makes up 30% to 70% by weight of the whole.

Incidentally, it is preferable if water makes up 40% to 60% by weight. Further, additional ingredients selected, as necessary, from among flavoring, leavening, coloring, aromatics, oil, emulsifier, etc., may be added with a weight ratio of 3 to 12 parts to the foregoing ingredients.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

INDUSTRIAL APPLICABILITY

The present method of manufacturing molded baked snacks is capable of preventing insulation breakdown caused by condensation of large amounts of vapor produced by ingredients during heating and molding of molded baked snacks by means of resistance heating or dielectric heating.

What is claimed is:

1. A method of manufacturing molded baked snacks by placing ingredients in a mold having first and second conductive mold halves and an insulating section therebetween, and applying across both said mold halves alternating current from an alternating current power source, thus heating and expanding said ingredients by means of resistance heating and/or dielectric heating, wherein:

said insulating section of said mold is provided with a vapor release section; and pressure is reduced outside said mold, and said heating is performed while releasing vapor produced thereby through said vapor release section.

2. A method of manufacturing molded baked snacks by placing ingredients in a mold having first and second conductive mold halves and an insulating section therebetween, and applying across both said mold halves alternating current from an alternating current power source, thus heating and expanding the ingredients by means of resistance heating and/or dielectric heating, wherein:

said insulating section of said mold is provided with a vapor release section; and said vapor release section is heated during heating of said ingredients, and heating of said ingredients is performed while releasing vapor produced thereby through said vapor release section.

3. The method of manufacturing molded baked snacks set forth in either claim 1 or claim 2, wherein:

external heating is also used to heat said ingredients.

4. The method of manufacturing molded baked snacks set forth in claim 3, wherein:

heating of said ingredients is performed using for said mold a mold whose thickness in areas corresponding to portions of said ingredients which do not heat internally due to resistance heating and/or dielectric heating is thinner than in areas corresponding to portions of said ingredients which heat internally.

5. The method of manufacturing molded baked snacks set forth in either claim 1 or claim 2, wherein:

heating of said ingredients is performed by maintaining constant an amperage of said alternating current.

6. The method of manufacturing molded baked snacks set forth in either claim 1 or claim 2, wherein:

heating of said ingredients is performed using an amperage of said alternating current which is smaller during a latter stage of heating, when a quantity of liquid in said ingredients is small, than during an initial stage of heating, when the quantity of liquid in said ingredients is large.

7. The method of manufacturing molded baked snacks set forth in either claim 1 or claim 2, wherein:

heating of said ingredients is performed using as a grounded side one of said first and second mold halves which has more pointed areas than the other of said first and second mold halves.

8. The method of manufacturing molded baked snacks set forth in either claim 1 or claim 2, wherein:

said ingredients have a composition with a weight ratio of 100 flour, 10 to 150 starch, 0.5 to 10 salt, 2 to 60 sugar, and 70 to 260 water, and water makes up 30% to 70% by weight of the whole.

9. The method of manufacturing molded baked snacks set forth in claim 8, wherein:

in the composition of said ingredients, water makes up 40% to 60% by weight of the whole.

10. The method of manufacturing molded baked snacks set forth in either claim 1 or claim 2, wherein:

said molded baked snacks have a thickness of from 2 mm through 10 mm.

* * * * *